US00RE40695E

(19) United States
(12) Reissued Patent
Iwamatsu et al.

(10) Patent Number: US RE40,695 E
(45) Date of Reissued Patent: Apr. 7, 2009

(54) CLOCK PHASE DETECTING CIRCUIT AND CLOCK REGENERATING CIRCUIT EACH ARRANGED IN RECEIVING UNIT OF MULTIPLEX RADIO EQUIPMENT

(75) Inventors: Takanori Iwamatsu, Kawasaki (JP); Hiroyuki Kiyanagi, Sendai (JP)

(73) Assignee: Fujitsu Limited, Kawasaki (JP)

(21) Appl. No.: 09/771,229

(22) Filed: Jan. 26, 2001

Related U.S. Patent Documents

Reissue of:
(64) Patent No.: 5,867,542
Issued: Feb. 2, 1999
Appl. No.: 08/552,543
Filed: Nov. 3, 1995

(30) Foreign Application Priority Data

Mar. 17, 1995 (JP) ..... 7-059377

(51) Int. Cl.
*H04L 7/02* (2006.01)
*H04L 27/22* (2006.01)

(52) U.S. Cl. ..... 375/354; 375/326; 375/332; 375/344; 329/304

(58) Field of Classification Search ..... 375/279–281, 375/326–327, 329, 332, 344, 354, 371, 373, 375/376; 329/304, 307, 308
See application file for complete search history.

(56) References Cited

U.S. PATENT DOCUMENTS 4,012,591 A 3/1977 Sailer et al.

(Continued)

FOREIGN PATENT DOCUMENTS

| | | |
|---|---|---|
| DE | 3124329 | 4/1983 |
| EP | 0 173 298 | 3/1986 |
| EP | 0 184 805 | 6/1986 |
| EP | 0 249 931 | 12/1987 |
| EP | 0 368 307 | 5/1990 |
| JP | 63-215235 | 9/1988 |
| JP | 2-84834 | 3/1990 |
| JP | 6-311193 | 11/1994 |
| JP | 9-98198 | 4/1997 |

OTHER PUBLICATIONS

Sailer, "Timing Recovery in Data Transmissions Systems Using Multilevel Partial Responese Signaling" International Conference on Communications Conference Record ICC '92, Jun. 14–18, 1992: vol. 2, Jun. 1975, pp. 24–27, XP000579359.

"Offset Binary Simplifies Timing Control In a Priv Communication Channel" IBM Technical Disclosure Bulleting, vol. 33, No. 12 May 1, 1991, pp. 5–8, XP000121439.

*Primary Examiner*—Young T. Tse
(74) *Attorney, Agent, or Firm*—Katten Muchin Rosenman LLP

(57) ABSTRACT

The present invention relates to a clock phase detecting circuit and a clock regenerating circuit each arranged in a receiving unit of multiplex radio equipment. The receiving unit of the multiplex radio equipment includes an identifying circuit for identifying a signal obtained by demodulating a multilevel orthogonal modulation signal; a clock regenerating circuit for regenerating a signal identification clock for the identifying circuit to supply the clock to the identifying circuit; an equalizing circuit for subjecting the signal obtained by demodulating a multilevel orthogonal modulation signal to an equalizing process. A clock phase detecting unit detects the phase component of the signal identification clock based on signals input to or output from the equalizing circuit and then supplies the phase component to the clock regenerating circuit. The phase component of a signal identification clock can be certainly detected and accurately adjusted so that the signal identification clock can be regenerated with high accuracy.

13 Claims, 61 Drawing Sheets

U.S. PATENT DOCUMENTS 4,320,517 A * 3/1982 Godard et al. ..... 375/231
4,692,931 A * 9/1987 Ohsawa ..... 375/355
4,815,103 A * 3/1989 Cupo et al. ..... 375/234
5,090,027 A * 2/1992 Ohsawa ..... 375/325
5,216,554 A * 6/1993 Schneider ..... 360/51
5,255,289 A 10/1993 Tomita
5,283,780 A * 2/1994 Schuchman et al. ..... 370/312
5,317,602 A * 5/1994 Onoda et al. ..... 375/371
5,363,408 A * 11/1994 Paik et al. ..... 375/261
5,400,366 A * 3/1995 Iwamatsu ..... 375/344
5,423,085 A * 6/1995 Lim ..... 455/182.2
5,438,591 A * 8/1995 Oie et al. ..... 375/261
5,471,508 A * 11/1995 Koslov ..... 375/344
5,535,252 A * 7/1996 Kobayashi ..... 375/371
5,557,335 A * 9/1996 Oh ..... 348/512
5,579,346 A * 11/1996 Kanzaki ..... 375/344
5,612,975 A * 3/1997 Becker et al. ..... 375/319
5,656,971 A * 8/1997 Gotoh ..... 329/308
5,661,761 A * 8/1997 Iwamatsu ..... 375/344
5,796,535 A * 8/1998 Tuttle et al. ..... 360/51

* cited by examiner

Amended
FIG. 14
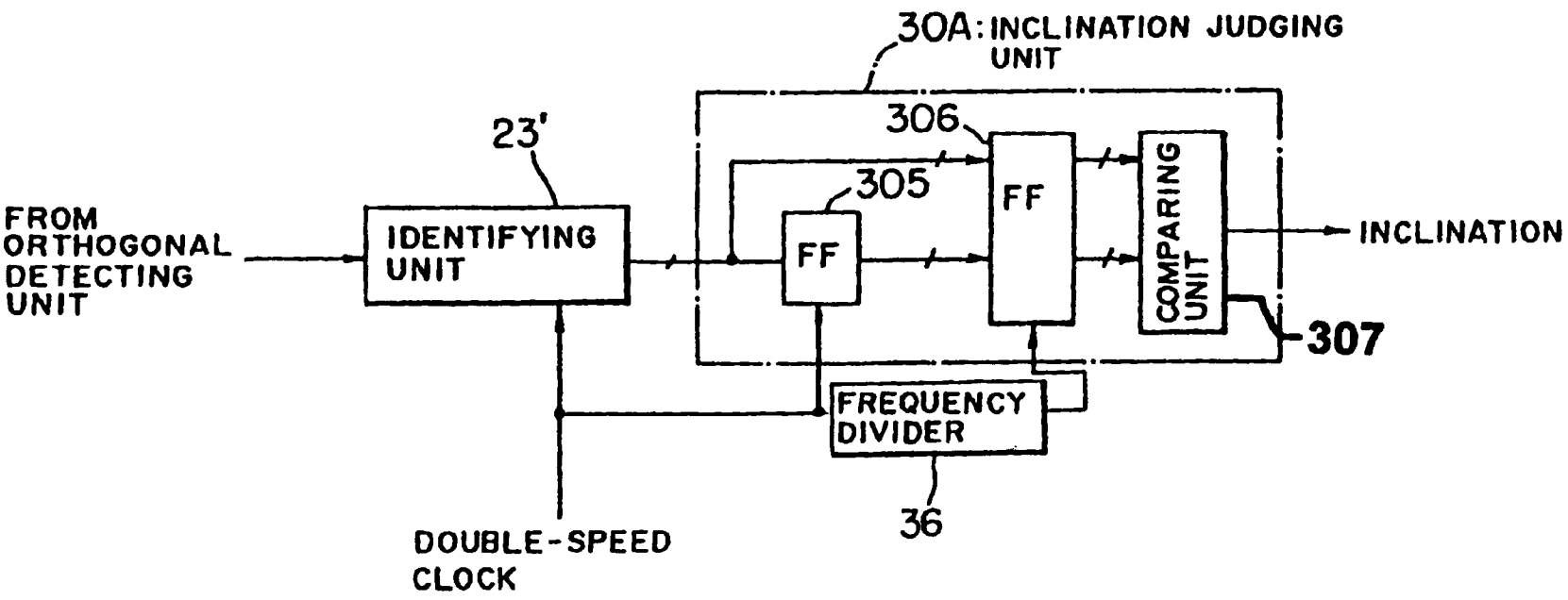

CLOCK PHASE DETECTING CIRCUIT AND CLOCK REGENERATING CIRCUIT EACH ARRANGED IN RECEIVING UNIT OF MULTIPLEX RADIO EQUIPMENT

Matter enclosed in heavy brackets [ ] appears in the original patent but forms no part of this reissue specification; matter printed in italics indicates the additions made by reissue.

BACKGROUND OF THE INVENTION

1) Field of the Invention

The present invention relates to a clock phase detecting circuit and a clock regenerating circuit each arranged in the receiving unit in multiplex radio equipment.

Generally, the clock regenerating circuit which is used in the receiving unit of multiplex radio equipment is called a BTR (Bit Timing Recovery) circuit. The clock regenerating circuit usually regenerates a clock component based on a signal obtained by demodulating a multilevel orthogonal modulation signal obtained through PSK (Pulse Shift Keying) or QAM (Quadrature Amplitude Modulation) and then supplies it as an operation timing signal for an identifier (e.g. an A/D converter) that mainly identifies received data (signal).

The clock which is regenerated in the clock regenerating circuit must be agreed in phase with a demodulated signal level identifying timing (when the so-called eye-pattern is most opened). However, a change in trunk state due to temperature changes may cause a deviation in phase of a clock pulse.

Hence both a clock phase detecting circuit that can detect a phase deviation with high accuracy and a clock regenerating circuit that adjusts accurately a deviation in phase of the clock detected by the clock phase detecting circuit and then supplies signal identification clocks with high accuracy have been requested.

2) Description of the Related Art

FIG. 60 is a block diagram illustrating the configuration of a clock regenerating circuit arranged in the receiving unit of a general multiplex radio equipment. Referring to FIG. 60, numeral 71 represents an orthogonal detecting unit; 72 and 73 represent A/D converters; 74 represents a transversal equalizer; and 75 represents a clock regenerating circuit.

The orthogonal detecting unit 71 detects a signal (IF (intermediate frequency) signal) obtained by demodulating a multilevel orthogonal modulation signal due to PSK or QAM and then produces two kinds of baseband signals (an Ich signal and a Qch signal) with a different angle of 90° in phase from each other. As shown in FIG. 60, the orthogonal detecting unit 71 is formed of hybrids (H) 711 and 712, phase detectors 713 and 714, roll-off filters 715 and 716; and a local oscillating unit 717.

In the detecting unit 71, the hybrid 711 splits the IF signal input into two components and then sends respectively to the phase detectors 713 and 714. At this time, the local oscillating unit 717 supplies a carrier regenerating signal synchronized in phase with a carrier wave to the hybrid 712. The hybrid 712 splits the carrier regenerating signal into two signal waves with phases different from each other by 90°: one being output to the phase detector 713 and the other being output to the phase detector 714.

As a result, the phase detectors 713 and 714 receive base band signals (an Ich signal and a Qch signal) having phases different from each other by 90°. The A/D converter (identifying unit) 72 receives the Ich signal via the roll-off filter 715 to perform an A/C conversion (signal identification). The A/D converter (identifying unit) 73 receives the Qch signal via the roll-off filter 716 to perform an A/D conversion (signal identification). Thus digital demodulated signals with phases different from each other by 90° are obtained.

The A/D converter 72 converts the Ich signal from the orthogonal detecting unit 71 to a digital demodulated signal by A/D converting at a predetermined signal level. The A/D converter 73 converts the Qch signal from the orthogonal detecting unit 71 to a digital demodulated signal by A/D converting at a predetermined signal level. The transversal equalizer 74 equalizes each the digital demodulated signals from the A/D converters 72 and 73.

The clock regenerating circuit 75 regenerates A/D conversion clocks, of which the timing at which the [A/ID] *A/D* converters 72 and 73 execute an A/D conversion (the so-called eye pattern in fully opened state) matches the phase, from a received signal to be detected by the orthogonal detecting unit 75 and then supplies them respectively to the A/D converters 72 and 73. The clock regenerating circuit 75 is formed of a square detecting unit 76, a filer 77, and a PLL circuit 78. The PLL circuit 78 is formed of a phase detector (PD) 79, a loop filter 80, an amplifier 81 and an oscillating unit 82.

The square detecting unit 76 subjects a signal to be detected by the orthogonal detecting unit 71 to a square detection. The filter 77 filters the output of the square detecting unit 76.

In the PLL circuit 78, the phase detector 79 phase-compares the signal square-detected by the square detecting unit 76 and input through the filter 77 with the A/D conversion clocks output from the oscillating unit 82 for the A/D converters 72 and 73 and then feedbacks the result as a control signal to the oscillating unit 82 via the loop filter 80 and the amplifier 81. As a result, the clock (an A/D conversion clock) following the phase of a signal to be detected by the orthogonal detecting unit 71 can be obtained.

In the clock regenerating circuit 75 having the above-configuration, the A/D conversion clocks for the A/D converters 72 and 73 following the phase in which the eye pattern of a received signal is most opened are regenerated from the signal to be detected by the orthogonal detecting unit 71 and then sent to the A/D converters 72 and 73, respectively. Then each of the A/D converters 72 and 73 can regenerate the receive signal data through an accurate digitalizing process.

The clock regenerating circuit 83 proposed by Japanese Patent Laid-open Publication (Tokukaisyo) No. 63-215235, as shown in FIG. 61, is formed of a phase deviation detection unit 831, [a] *an* infinite phase shifter 832, and an oscillating unit 833. Numeral 81 represents a demodulating unit which demodulates a received signal and 82 represents a data regenerating unit that regenerates a demodulated signal (data) from the demodulating unit. The data regenerating unit 82 consists of an equalizer (EQL) 821 that subjects a demodulated signal to an equalizing process and an identifier (A/D converter) that identifies and encodes (digitalizes) the level of the demodulated signal processed by the equalizer.

In the clock regenerating circuit 83, the phase deviation detecting unit 831 monitors the output signal from the identifier 822 and then detects the deviation between the signal phase of the most suitable identifying timing in the identifier with the phase of the clock (CLK). The infinite phase shifter 832 provides a phase shift to the signal with a fixed frequency from the oscillating unit 833.

In the clock regenerating circuit 83 with the above-mentioned structure, the phase deviation detecting unit 831 detects a change in phase deviation appeared between the timing to be identified by the identifier 822 and the clock (CLK) supplied as an operation timing of the identifier 822, and the infinite phase shifter 832 phase-shifts the output of the oscillating unit 833 synchronous with the change in the phase deviation. Thus the phase deviation is canceled so that the clock matched with the phase of the identification timing can be regenerated certainly.

However, the clock regenerating circuit 75 shown in FIG. 60 regenerates an A/D conversion clock each for the A/D converters 72 and 73 from a signal to be detected by the orthogonal detecting unit 71, or an analog signal, thus tending to be frequently influenced by the trunk status due to temperature changes or the like. As a result, there is a problem in that the A/D conversion timing of each of the A/D converters 72 and 73 can not be agreed with high accuracy with the most suitable timing in which the eye pattern of a received signal is most opened.

As described above, regenerating the A/D conversion clocks from an analog signal leads to the clock regenerating circuit 75 in an analog configuration, as shown in FIG. 60. Hence, there is a problem in that the analog configuration results in a large circuit scale in addition to a large number of manual adjustments.

On the other hand, in the clock regenerating circuit 83 shown in FIG. 61, the phase deviation detecting unit 831 detects a change in phase deviation and the infinite phase shifter 832 phase-shifts the output of the oscillating unit 833 in synchronism with the phase deviation change. Thus the clock agreed with the phase of the identification timing can be certainly regenerated by canceling the phase deviation. However, the phase deviation detecting unit 831 detects a phase deviation with insufficient accuracy rather than high accuracy. Hence there is a problem in that the operation timing of the identifier 822 cannot be completely agreed with the most suitable timing in which the eye-pattern of a received signal is most opened.

SUMMARY OF THE INVENTION

The present invention is made to overcome the above mentioned problems. An object of the present invention is to provide a clock phase detecting circuit arranged in the receiving unit of multiplex radio equipment that can regenerate a signal identification clock with high accuracy by certainly detecting the phase component of a signal identification clock and then accurately adjusting the same.

Another object of the present invention is to provide a clock regenerating circuit arranged in the receiving unit in multiplex radio equipment that can regenerate a signal identification clock with high accuracy by certainly detecting the phase component of a signal identification clock and then accurately adjusting the same.

In order to achieve the above objects, according to the present invention, the clock phase detecting circuit arranged in a receiving unit of multiplex radio equipment, is characterized by an identifying circuit for identifying a signal at a predetermined identification level, the signal being obtained by demodulating a multilevel orthogonal modulated signal; a clock regenerating circuit for regenerating a signal identification clock for the identifying circuit to supply the clock to the identifying circuit; an equalizing circuit for subjecting the demodulated signal obtained by demodulating the multilevel orthogonal modulated signal to an equalizing process; and a clock phase detecting unit for detecting a phase component of the signal identification clock based on input/output signals of the equalizing circuit and then for supplying the phase component to the clock regenerating circuit.

Hence, in the clock phase detecting circuit arranged in the receiving unit of the multiplex radio equipment according to the present invention, the clock phase detecting unit can detect the phase component of a signal identification clock, based on the input/output signals of the equalizing circuit which subjects a signal obtained by demodulating a multilevel orthogonal modulated signal to an equalizing process and then supply it to the clock regenerating circuit. Hence there is an advantage in that the clock regenerating circuit can adjust very accurately the phase component of a signal identification clock, thus greatly improving the performance of the multiplex radio equipment.

According to the present invention, the clock regenerating circuit arranged in a receiving unit of multiplex radio equipment, the receiving unit including an identifying unit for identifying a signal at a predetermined identification level, the signal being obtained by demodulating a multilevel orthogonal modulated signal and an equalizing circuit for subjecting the demodulated signal to an equalizing process, the clock regenerating circuit regenerating a signal identification clock for the identifying circuit an then supplying the signal identification clock to the identifying circuit[;], is characterized by a clock regenerating unit for regenerating the signal identification clock based on a signal before the multilevel orthogonal modulated signal is detected[;], a phase adjusting unit for adjusting the phase of a clock from the clock regenerating unit and then supplying the phase-adjusted clock to the identifying circuit[;], and a clockphase detecting unit for detecting a phase component of the signal identification clock based on input/output signals of the equalizing circuit and then supplying the result as the phase adjustment control signal to the phase adjusting unit.

In the clock regenerating circuit arranged in the receiving unit of the multiplex radio equipment according to the present invention, when a signal identification clock for the identifying circuit is regenerated from a signal before a multilevel orthogonal modulated signal is detected and the phase adjusting unit adjusts the phase of the clock from the clock regenerating unit and then supplies the result to the identifying circuit, the clock phase detecting unit can detect the phase component of the signal identification clock, based on the input/output signals of the equalizing circuit, and then supply it as a phase adjustment and control signal to the phase adjusting unit. Hence there is an advantage in that the phase component of a signal identification clock for the identifying circuit can be adjusted accurately so that the accuracy of the signal identifying process in the identifying circuit can be drastically improved.

Furthermore, according to the present invention, the clock regenerating circuit arranged in a receiving unit of multiplex radio equipment, the receiving unit including an identifying circuit for identifying a signal at a predetermined identification level, the signal being obtained by demodulating a multilevel orthogonal modulating signal and an equalizing circuit for subjecting the demodulated signal to an equalizing process, the clock regenerating circuit regenerating a signal identification clock for the identifying circuit and then supplying the signal identification clock to the identifying circuit[;], is characterized by a clock phase detecting unit for detecting a phase component of the signal identification clock based on [inut/output] *input/output* signals of the equalizing circuit[;], a loop filter unit for integrating the output from the clock phase detecting unit[;], and an oscillating unit for producing a signal identification clock for the identifying circuit to the identifying circuit, in response to as a control input the output from the loop filter unit.

In the clock regenerating circuit arranged in the receiving unit of the multiplex radio equipment according to the present invention, the clock phase detecting unit detects the phase component of a signal identification clock based on the input/output signals of the equalizing circuit; the loop filter unit integrates the resultant phase component; and the oscillating unit receives the output as a control input from the loop filter unit. Thus, the adjusted phase component of a signal identification clock for the identifying circuit can be supplied to the identifying circuit. Hence there is an advantage in that the very-simplified configuration can greatly improve the signal identifying process performance by the identifying circuit.

Moreover, according to the present invention, the clock phase detecting circuit arranged in a receiving unit of multiplex radio equipment, is characterized by an identifying circuit for identifying a signal at a predetermined identification level, the signal being obtained by demodulating a multilevel orthogonal modulated signal; a clock regenerating circuit for regenerating a signal identification clock for the identifying circuit to supply the clock to said identifying circuit; and a clock phase detecting unit for detecting a phase component of the signal identification clock based on clock phase difference information supplied to the identifying circuit and signal error differential information obtained by the identifying circuit and then supplying the resultant phase component to the clock regenerating circuit.

In the clock regenerating circuit arranged in the receiving unit of the multiplex radio equipment according to the present invention, the clock phase detecting unit detects the phase component of a signal identification clock based on the clock phase difference information supplied to the identifying circuit and the signal error differential information obtained by the identifying circuit and then supplies it to the clock regenerating circuit. Hence, the very-simplified configuration can greatly improve the accuracy of the signal identification clock regenerating process in the clock regenerating circuit, thus greatly improving the accuracy of the signal identifying process in the identifying circuit.

Furthermore, according to the present invention, the clock regenerating circuit arranged in a receiving unit of multiplex radio equipment, the receiving unit having an identifying circuit that identifies a signal obtained by demodulating a multilevel orthogonal modulated signal at a predetermined identification level, the clock regenerating circuit regenerating a signal identification clock for the identifying circuit to supply the clock to said identifying circuit, is characterized by a clock regenerating unit for regenerating the signal identification clock based on a signal before the multilevel orthogonal modulated signal is detected; a phase adjusting unit for adjusting the phase of a clock sent from the clock regenerating unit and supplying the resultant clock to the identifying circuit; and a clock phase detecting unit for detecting a phase component of the signal identification clock based on clock phase difference information supplied to the identifying circuit and signal error differential information obtained by the identifying circuit and then supplying the resultant phase component to the clock regenerating circuit.

In the clock regenerating circuit arranged in the receiving unit in multiplex radio equipment according to the present invention, when the phase adjusting unit adjusts the phase of a clock from the clock regenerating unit, the clock phase detecting unit can supply the phase component of a signal identification clock detected based on the clock phase difference information supplied to the identifying circuit and the signal error differential information, to the clock regenerating circuit. Hence even if the equalizing circuit that performs an equalizing process of a demodulated signal is not arranged, the very-simplified configuration can improve the accuracy of a signal identification clock regenerated in the clock regenerating circuit.

According to the present invention, the clock regenerating circuit arranged in a receiving unit of multiplex radio equipment, the receiving unit including an identifying circuit for identifying a signal at a predetermined identification level, the signal being obtained by demodulating a multilevel orthogonal modulated signal, the clock regenerating circuit regenerating a signal identification clock for the identifying circuit and then supplying the signal identification clock to the identifying circuit[;], is characterized by a clock phase detecting unit for detecting a phase component of the signal identification clock based on clock phase difference information supplied to the identifying circuit and signal error differential information obtained by the identifying circuit which supplies it *to* the clock regenerating circuit[;], a loop filter unit for integrating the output from the clock phase detecting unit[;], and an oscillating circuit for producing a signal identification clock for the identifying circuit to the identifying circuit, in response to the output as a control input from the loop filter circuit.

In the clock regenerating circuit arranged in the receiving unit of multiplex radio equipment according to the present invention, the clock phase detecting unit detects the phase component of a signal identification clock for the identifying circuit, based on the clock phase difference information supplied to the identifying circuit and the signal error differential information obtained by the identifying circuit, and then supplies it to the clock regenerating circuit. Hence, even if the equalizing circuit that performs an equalizing process of a demodulated signal is not arranged, the very-simplified configuration can greatly improve the accuracy of a signal identification clock regenerated in the clock regenerating circuit.

BRIEF DESCRIPTION OF THE DRAWINGS

FIG. 14 is a block diagram illustrating a phase component detecting unit according to the first embodiment;

DESCRIPTION OF THE PREFERRED EMBODIMENTS (a) Aspect of the Invention:

By referring to the attached drawings, explanation will be made as for an aspect of the present invention.

Figure 1:
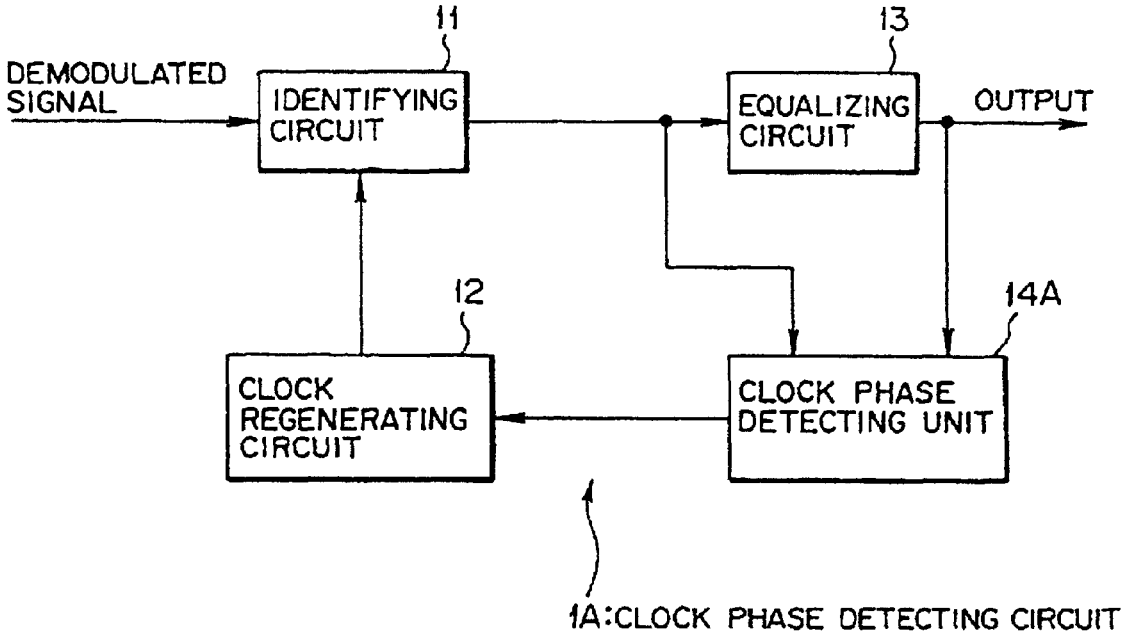
FIG. 1 is a block diagram showing the first aspect of the present invention.

FIG. 1 is a block diagram showing an aspect of the present invention. Referring to FIG. 1, numeral 1A represents a clock phase detecting circuit. The clock phase detecting circuit 1A is used in the receiving unit of multiplex radio equipment including an identifying circuit 11 that identifies a signal obtained by demodulating a multilevel orthogonal modulated signal at a predetermined identification level, a clock regenerating circuit 12 that regenerates a signal identification clock for the identifying circuit 11 and then sends it to the identifying circuit 11, and an equalizing circuit 13 that subjects a signal obtained by demodulating the multilevel orthogonal modulated signal to an equalizing process.

As shown in FIG. 1, the clock phase detecting circuit 1A includes a clock phase detecting unit 14A. The clock phase detecting unit 14A detects the phase component of a signal identification clock based on input/output signals of the equalizing circuit 13 and then supplies it to the clock regenerating circuit 12.

In the clock phase detecting circuit 1A arranged in the receiving unit of multiplex radio equipment according to the present invention, when the identifying circuit 11 identifies a demodulated signal obtained by demodulating a multilevel orthogonal modulation signal at a predetermined identifying level, the clock regenerating circuit 12 regenerates a signal identification clock for the identifying circuit 11 and supplies it to the identifying circuit 11. At the time, the clock phase detecting unit 14A detects the phase component of a signal identification clock in response to the input signal and the output signal of the equalizing circuit 13 that subjects a signal obtained by demodulating a multilevel orthogonal modulated signal to an equalizing process and then supplies the phase component to the clock regenerating circuit 12.

According to the clock phase detecting circuit 1A as described above, there is an advantage in that the phase component of a signal identification clock can be adjusted very accurately so that the performance of the multiplex radio equipment can be greatly improved.

In concrete, the clock phase detecting unit 14A consists of an error detecting unit that detects an error between the input signal and the output signal of the equalizing circuit 13, a signal inclination detecting unit that detects the inclination of a demodulated signal, and a clock phase calculating unit that calculates the output of the error detecting unit and the output of the signal inclination detecting unit and then detects the phase component of a signal identification clock.

In the clock phase component detecting unit 14A, the error detecting unit detects the error between the input signal and the output signal of the equalizing circuit 13, and the signal inclination detecting unit detects the inclination of a demodulated signal, and the clock phase calculating unit calculates the outputs of the error detecting unit and the signal inclination detecting unit. Thus the phase component of a signal identification clock is detected.

Hence the phase component of a signal identification clock can be certainly detected.

The clock phase detecting unit 14A may include a specific signal judging unit that judges whether a specific signal exists and a gating unit that produces the phase component of a signal identification clock obtained by the clock phase calculating unit when the specific signal judging unit judges that a specific signal exists, in addition to the error detecting unit, the signal inclination detecting unit, and the clock phase calculating unit.

In this case, the specific signal judging unit judges whether a received signal is a specific signal. If it is judged that the received signal is a specific signal, the gating unit produces the phase component of a signal identification clock obtained by the phase calculating unit.

In the clock phase detecting unit 14A, only when the specific signal judging unit judges that the received signal is a specific signal with good signal quality, the gating unit can issue the phase component of a signal identification clock obtained by the clock phase calculating unit. Hence the accuracy of the phase component of a signal identification clock can be improved.

The signal inclination detecting unit consists of a delaying unit that delays the output from the identifying circuit 11 and a comparing unit that compares the output from the identifying circuit 11 with the output from the delaying unit and then detects the inclination of the demodulated signal.

Hence the inclination of a demodulated signal which is needed in a calculation process of the phase component of a signal identification clock can be surely obtained.

Where the identifying circuit 11 described above is used for a high-speed clock operation, the signal inclination detecting unit consists of a delaying unit that calculates with high-speed clocks and delays the output of the identifying circuit 11, a latch unit that holds the output of the identifying circuit 11 and the output of the delaying unit with clocks slower than the high-speed clocks, and a comparing unit that compares the output of the identifying circuit with the output of the delaying unit each held in the latch unit and then detects the inclination of the demodulated signal.

In order to detect the inclination of a demodulated signal by the signal inclination detecting unit, the delaying unit calculates with high-speed clocks to delay the output from the identifying circuit 11, the latch unit holds the output of the identifying circuit 11 and the output of the delay unit with clocks slower than the high-speed clocks, and the comparing unit compares the output of the identifying circuit 11 with the output of the delaying unit each held in the latch unit.

Therefore, the sensitivity of detecting the inclination of a demodulated signal can be improved and the phase component of a signal identification clock can be obtained with higher accuracy.

Moreover, the identifying circuit 11 is formed of plural identifying units corresponding to the number of plural demodulated signals obtained by demodulating a multilevel orthogonal modulated signal. Clocks with different predetermined phase shift may be supplied between the identifying units. The signal inclination detecting unit includes a comparing unit that compares the outputs of the identifying units and then detects the inclination of the demodulated signal.

In this case, the comparing unit in the signal inclination detecting unit compares the output of the identifying units to detect the inclination of the demodulated signal.

Hence, the phase component of a signal identification clock can be obtained with higher accuracy in the simple configuration, without using the identifying unit operated with high-speed clocks.

The clock phase calculating unit, in concrete, may be formed as a multiplying unit that subjects the output of the error detecting unit and the output of the signal inclination detecting unit to a multiplying calculation, or as an exclusive OR calculation unit that performs an exclusive OR calculation process.

The phase component of a signal identification clock output from the clock phase calculating unit can be obtained by subjecting the output of the error detecting unit and the output of the signal inclination detecting unit to a multiplying calculation by means of the multiplying unit, or by performing an exclusive OR calculation by means of the exclusive OR operation unit.

Hence, the phase component detecting circuit can be realized very easily and in a simplified configuration.

Furthermore, the specific signal judging unit includes plural signal judging units that judge plural kinds of specific signals. A selection unit that selects decision results sent from plural signal judging units is arranged between the specific signal judging unit and the gating unit.

In this case, the selecting unit can selectively output a specific one among decision results from plural signal judging units.

Since the decision results from plural specific signal judging units can be selectively output, provided that it is judged that a specific signal has a good signal quality, the phase component of a signal identification clock output out of the gating unit can be further improved in accuracy.

Figure 2:
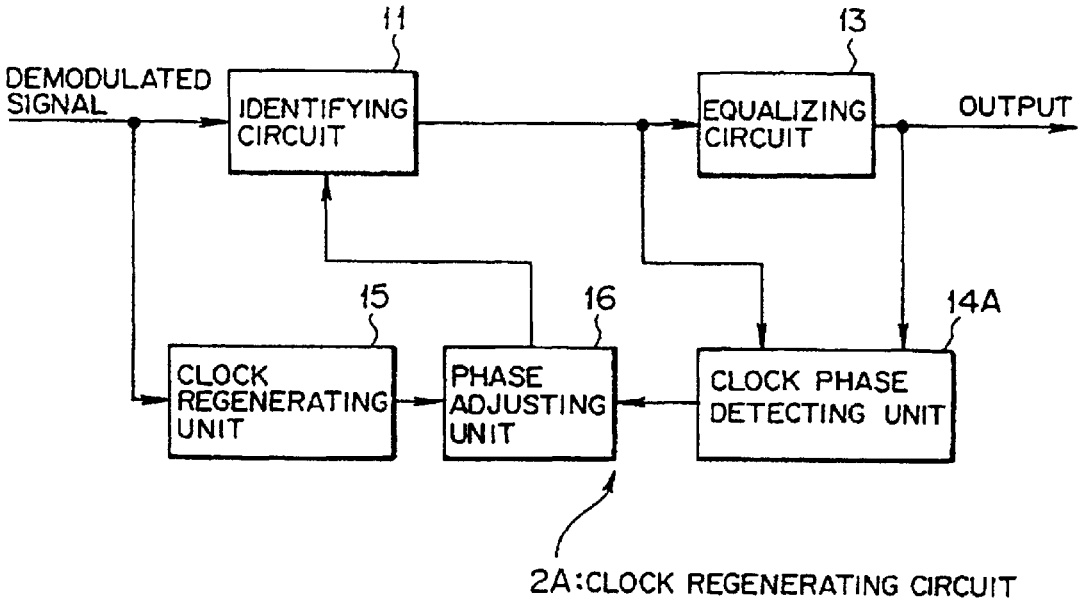
FIG. 2 is a block diagram showing the second aspect of the present invention.

FIG. 2 is a block diagram showing the second aspect of the present invention. Referring to FIG. 2, numeral 2A represents a clock regenerating circuit. The clock regenerating circuit 2A is arranged in the receiving unit of multiplex radio equipment including an identifying circuit 11 that identifies a signal obtained by demodulating a multilevel orthogonal modulated signal at a predetermined identification level and an equalizing circuit that subjects a demodulated signal obtained by demodulating a multilevel orthogonal modulation signal to an equalizing process. The clock regenerating circuit 2A regenerates a signal identification clock for the identification circuit 11 and supplies it to the identifying circuit 11.

The clock regenerating circuit 2A includes a clock regenerating unit 15, a phase adjusting unit 16, and a clock phase detecting unit 14A.

The clock regenerating unit 15 regenerates a signal identification clock from a multilevel orthogonal modulated signal to be detected. The phase adjusting unit 16 adjusts the phase of a clock from the clock regenerating unit 15 to supply to the identifying circuit 11. The clock phase detecting unit 14A detects the phase component of a signal identification clock based on the input and output signals of the equalizing circuit 13 and supplies the resultant component as a phase adjustment control signal to the phase adjusting unit 16.

As shown in FIG. 2, the clock regenerating circuit 2A regenerates a signal identification clock for the identifying circuit 11 to the identifying circuit 11. In concrete, the clock regenerating unit 15 regenerates a signal identification clock from a multilevel orthogonal modulation signal to be detected. The phase adjusting unit 16 adjusts the phase of a clock from the clock regenerating unit 15 and then supplies to the identifying circuit 11. The phase adjustment of the phase adjusting unit 16 is performed with a phase adjustment control signal which is obtained by the clock phase detecting unit 14A that detects the phase component of a signal identification clock based on the input and output signals of the equalizing circuit 13.

The clock regenerating circuit 2A has an advantage in that the phase component of a signal identification clock for the identifying circuit 11 can be adjusted accurately so that the accuracy of the signal identification process in the identifying circuit 11 can be greatly improved.

An averaging unit may be arranged between the clock phase detecting unit 14A and the phase adjusting unit 16 to average the output from the clock phase detecting unit 14A, thus averaging the output from the clock phase detecting unit 14A.

Hence, the phase adjusting control signal can be obtained with more accuracy.

In the clock regenerating circuit 2A, the identifying circuit 11 may be formed of plural identifying units corresponding to the number of plural signals obtained by demodulating the multilevel orthogonal modulated signal. The clock regenerating unit 15, the phase adjusting unit 16, and the clock phase detecting unit 14A may be used in common to plural identifying units.

In this case, the phase component of a clock identification clock for each of the plural identifying units is detected by the clock phase detecting unit 14A used in common to the plural identifying units. The phase component is supplied as a phase adjustment control signal for a signal identification clock regenerated by the clock regenerating unit 15 to the phase adjusting unit 16 shared by the identifying units 15.

Hence, in the receiving unit of multiplex radio equipment that demodulates a multilevel orthogonal modulated signal to obtain plural signals, the phase component of a signal identification clock can be detected and adjusted very easily.

In the clock regenerating circuit 2A, the identifying circuit 11 may be formed of plural identifying units corresponding to the number of plural signals obtained by demodulating a multilevel orthogonal modulation signal. An averaging unit is arranged between the clock phase detecting unit 14A and the phase adjusting unit 16 to average the output from the clock phase detecting unit 14A. The clock regenerating unit 15, the phase adjusting unit 16, the averaging unit, and the clock phase detecting unit 14A may be used in common to the plural identifying units.

In this case, the clock phase detecting unit 14A used in common to the plural identifying units detects the phase component of a signal identification clock for each of plural identifying units. The averaging unit performs an averaging process for the detected phase component. The averaged phase component is supplied as a phase adjustment and control signal for a signal identification clock regenerated by the clock regenerating unit 15 to the phase adjusting unit 16 used in common by the plural identifying units.

Hence, in the receiving unit of multiplex radio equipment in which plural demodulated signals are obtained, the phase component of a signal identification clock can be detected and adjusted very easily. In this case, since the averaging unit can average the output (phase adjustment and control signal) from the clock phase detecting unit 14A, the phase adjustment and control signal can be obtained with higher accuracy.

In the clock regenerating circuit 2A, the identifying circuit 11 consists of plural identifying units corresponding to plural signals obtained by demodulating multilevel orthogonal modulation signal. The clock regenerating unit 15 is used in common to the plural identifying units. Plural phase adjusting units 16 and plural clock phase detecting units 14A may be arranged corresponding to the identifying units.

In this case, the phase components of signal identification clocks for the plural identifying units are respectively detected by the clock phase detecting units 14A arranged corresponding to the identifying units. Each phase component is supplied as a phase adjustment and control signal for a signal identification clock regenerated by the clock regenerating unit 15 to each of the phase adjusting units 16.

Hence, the clock phase detecting unit 14A corresponding to each identifying unit can detect the phase component of a signal identification clock for each of plural identifying units. Each phase adjusting unit 16 can adjust the phase component to supply to the corresponding identifying unit. Thus the accuracy of the signal identifying process in each identifying unit can be further improved.

In the clock regenerating circuit 2A, the identifying circuit 11 is formed of plural identifying units corresponding to the number of plural signals obtained by demodulating a multilevel orthogonal modulated signal. An averaging unit may be arranged between the clock phase detecting unit 14A and the phase adjusting unit 16 to average the output from and clock phase detecting unit 14A. The clock regenerating unit 15 is shared with the identifying units. Plural phase adjusting units 16, plural averaging units, and plural clock phase detecting units 14A may be arranged corresponding to the identifying units.

In this case, the phase components of signal identification clocks for plural identifying units are respectively detected by the clock phase detecting units 14A arranged corresponding to the identifying units. Each of the averaging units averages each of the phase components and then supplies the resultant phase component as phase adjustment and control signals for the signal identifying clocks regenerated by the clock regenerating unit 15 to each of the phase adjusting units 16.

In this case, the signal identification clock for each of plural identifying units can be obtained from the corresponding clock phase detecting unit 14A. Each of the averaging units can average a phase adjustment and control signal for the phase adjusting unit 16 being the output from the clock phase detecting unit 14A. Hence the accuracy of a signal identification process in each identifying unit can be further improved.

The clock regenerating circuit 2A may include a selecting unit that selectively outputs the output of the clock phase detecting unit 14A and the output of the test signal generating unit, in addition to a test signal generating unit that generates a test signal. Thus the output of the selecting unit is supplied as an input to the phase adjusting unit 16.

In the clock regenerating circuit 2A, the identifying circuit 11 may be formed of plural identifying units corresponding to the number of plural signals obtained by demodulating the multilevel orthogonal modulated signal. The clock regenerating unit 15, the phase adjusting unit 16, and the clock phase detecting unit [14] *14A* may be used in common to plural identifying units.

The signal identification clock for the identifying circuit can be tested and regenerated very easily by testing a phase adjustment process in the phase adjusting unit. This feature leads to improving the performance of the multiplex radio equipment.

Figure 3:
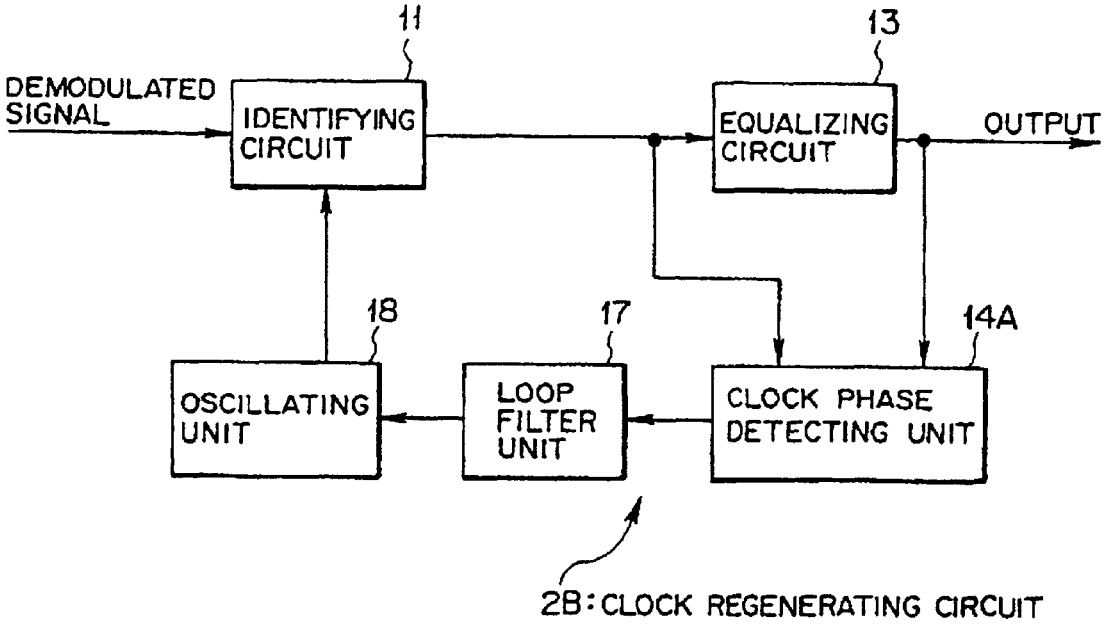
FIG. 3 is a block diagram showing the third aspect of the present invention.

FIG. 3 is a block diagram illustrating the third aspect of the present invention. Referring to FIG. 3, numeral 2B represents a clock regenerating circuit. The clock regenerating circuit 2B is arranged in the receiving unit of multiplex radio equipment including an identifying circuit 11 that identifies a signal obtained by demodulating a multilevel orthogonal modulated signal at a predetermined identification level, and an equalizing circuit that subjects the signal obtained by demodulating the multiplex orthogonal modulation signal to an equalizing process. A signal identification clock for the identifying circuit 11 is regenerated to supply to the identifying circuit 11.

The clock regenerating circuit 2B, as shown in FIG. 3, includes a clock phase detecting unit 14A, a loop filter unit 17, and an oscillating unit 18.

In this case, the clock phase detecting unit 14A detects the phase component of a signal identification clock based on the input signal and the output signal of the equalizing circuit 13. The loop filter unit 17 integrates the output of the clock phase detecting unit 14A. The oscillating unit 18 receives as a control input the output of the loop filter unit 17 and then outputs a signal identification clock for the identifying unit 11 to the identifying circuit 11.

In the clock regenerating circuit 2B shown in FIG. 3, the clock phase detecting unit 14A detects the phase component of a signal identification clock based on the input signal and the output signal of the equalizing circuit 13 and the loop filter unit 17 integrates the output of the clock phase detecting unit 14A. The oscillating unit 18 receives as a control input the output from the loop filter unit 17 and then outputs a signal identification clock for the identifying unit 11 to the identifying circuit 11.

According to the clock regenerating circuit 2B, there is an advantage in that the simplified configuration allows the identifying circuit 11 to improve greatly the performance of the signal identification process.

In the clock regenerating circuit 2B, the identifying circuit 11 may be formed of plural identifying units corresponding to the number of plural signals obtained by demodulating a multilevel orthogonal modulated signal. The clock phase detecting unit 14A, the loop filter unit 17, and the oscillating unit 18 are used in common to the identifying units.

In such a case, the clock phase detecting unit 14A shared by the identifying units detects the phase component of a signal identification clock for each of plural identifying units. Then the loop filter unit 17 integrates the phase component to supply the result as a control input to the oscillating unit 18.

Consequently, in the receiving unit of multiplex radio equipment which demodulates a multilevel orthogonal modulation signal to obtain plural signals, the phase component of a signal identification clock can be adjusted automatically, accurately and very easily so that the accuracy of a signal identifying process in each identifying unit can be improved.

In the clock regenerating circuit 2B, the identifying circuit 11 may be formed of plural identifying units corresponding to the number of plural signals obtained by demodulating a multilevel orthogonal modulation signal. Plural clock phase detecting units 14A are arranged corresponding to the identifying units. The loop filter unit 17 and the oscillating unit 18 are used in common to the identifying units. A composing unit may be arranged to compose the output of each of the clock phase detecting units 14A. The output of the composing unit is supplied as an input to the loop filter unit 17.

In this case, the composing unit composes the outputs (the phase components of signal identification clocks) of the plural clock phase detecting units 14A arranged corresponding to the identifying units and then supplies them as an input to the loop filter unit 17.

Hence, the more-simplified configuration can adjust accurately the phase components of signal identification clocks supplied from the oscillating unit 18, thus improving greatly the accuracy of the signal identifying process in each identifying unit.

Furthermore, in the clock regenerating circuit 2B, the identifying circuit 11 may be formed of plural identifying units corresponding to the number of plural signals obtained by demodulating a multilevel orthogonal modulation signal. Plural clock phase detecting units 14A and plural loop filter units 17 are arranged corresponding to the identifying units. The oscillating unit 18 is used in common to each identifying unit. A part of the plural identifying units are connected to the oscillating unit 18 via the phase adjusting unit to supply as a control input the outut of the loop filter unit 17 to the oscillating unit 18 or the phase adjusting unit.

In this case, the loop filter unit 17 supplies its output (a signal identification clock phase component) as a control input to the oscillating unit 18 or the phase adjusting unit.

The phase components of signal identification clocks for the identifying units can be detected respectively by the corresponding clock phase detecting units 14A and then supplied as a control input to the oscillating unit 18 or the phase adjusting unit. Hence the phase component of a signal identification clock can be adjusted respectively by the oscillating unit 18 or the phase adjusting unit to supply the signal identification clock to each identifying unit. This feature allows each identifying unit to improve greatly the accuracy of the signal identifying process.

In the clock regenerating circuit 2B, the identifying circuit 11 may be formed of plural identifying units corresponding to the number of signals obtained by demodulating a multilevel orthogonal modulation signal. A second clock phase detecting unit is arranged to detect the phase component of a signal identification clock in a manner different from that in the clock phase detecting unit 14A. The loop filter unit 17 and the oscillating unit 18 are arranged in common to each identifying unit. A corresponding unit is arranged to compose the output of the clock phase detecting unit 14A with the output of the second clock phase detecting unit. The output of the composing unit is supplied as an input to the loop filter unit 17.

In this case, the output (the phase component of a signal identification clock) from the composing unit is supplied as an input to the loop filter unit 17.

As described above, the composing unit composes the phase component of each signal identification clock detected by the clock phase component detecting unit 14A with phase component of each signal identification clock for each identifying unit detected in a different method to supply as an input the resultant phase component to the loop filter unit 17. Hence the phase component of a signal identification clock can be adjusted more accurately, whereby the accuracy of the signal identification process in each identifying unit can be improved more.

Instead of the above-mentioned composing unit, a selecting unit, which outputs selectively the output of the clock phase detecting unit 14A and the output of the second clock phase detecting unit, may be arranged to input the output to the loop filter unit 17. In this case, the output of the selecting unit is supplied to the loop filter unit 17.

In this case, the accuracy of the signal identifying process in each identifying unit can be more improved by adjusting accurately the phase component of a signal identification clock.

The clock regenerating circuit 2B may include a test signal generating unit that generates a test signal as well as a selecting unit that selects the output of the clock phase detecting unit 14A or the test signal generating unit to supply it to the loop filter unit 17.

Thus in the clock regenerating circuit 2B, the test signal generating unit generates a test signal and the selecting unit selectively outputs the output of the clock phase detecting unit 14A and the output of the test signal generating unit. Hence the output of the selecting unit can be supplied as an input to the loop filter unit 17.

Hence the signal identification clock for the identifying circuit 11 can be tested and regenerated very easily.

Figure 4:
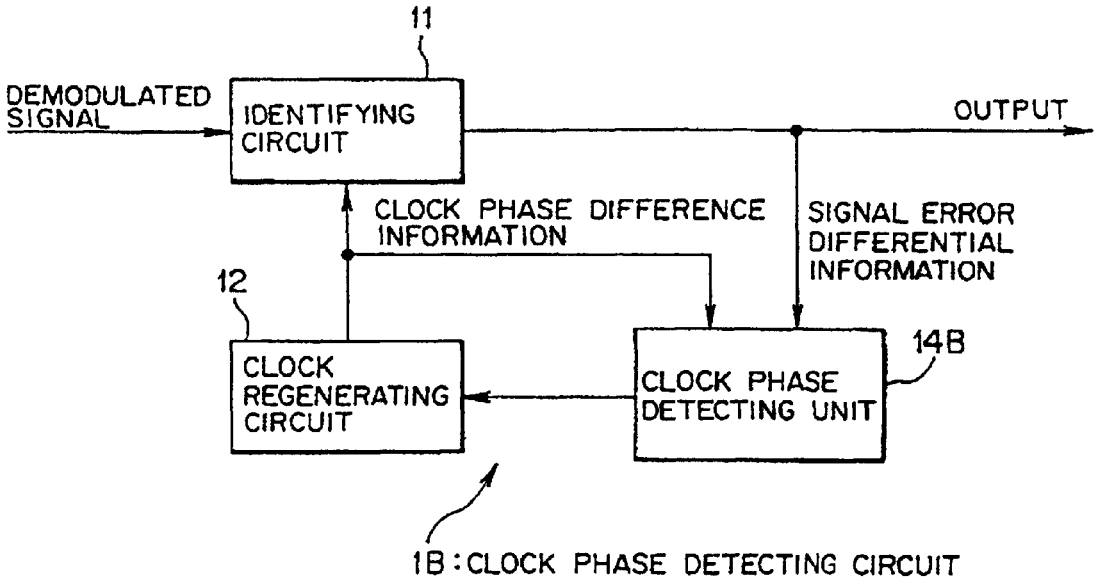
FIG. 4 is a block diagram showing the fourth aspect of the present invention.

FIG. 4 is a block diagram illustrating the fourth aspect of the present invention. Referring to FIG. 4, numeral 1B represents a clock phase detecting circuit. The clock phase detecting circuit 1B is used in the receiving unit of multiplex radio equipment including an identifying circuit 11 that identifies a signal obtained by demodulating a multilevel orthogonal modulated signal at a predetermined identification level, and a clock regenerating circuit 12 that regenerates a signal identification clock for the identifying circuit 11 to supply the resultant to the identifying circuit 11.

As shown in FIG. 4, the clock phase detecting circuit 1B includes a clock phase detecting unit 14B. The clock phase detecting unit 14B detects the phase component of a signal identification clock, based on clock phase difference information supplied to the identifying circuit 11 and signal error differential information obtained by the identifying circuit 11, and then supplies it to the clock regenerating circuit 12.

In the clock phase detecting circuit 1B shown in FIG. 4, the clock phase detecting unit 14B detects the phase component of a signal identification clock based on the clock phase difference information supplied to the identifying circuit 11 and the signal error differential information obtained by the identifying circuit 11, and then supplies the same to the clock regenerating circuit 12.

According to the clock phase detecting circuit 1B arranged in the receiving unit of multiplex radio equipment of the present invention, the simplified configuration can improve greatly the accuracy of the signal identification clock regenerating process. Hence the accuracy of the signal identifying process in the identifying circuit 11 can be greatly improved.

In concrete, the clock phase detecting unit 14B consists of a clock phase difference detecting unit that detects clock phase difference information supplied to the identifying circuit 11, a signal error differential detecting unit that detects signal error differential information obtained by the identifying circuit 11, and a clock phase calculating unit that detects the phase component of a signal identification clock by calculating based on the output of the clock phase difference detecting unit and the output of the signal error differential detecting unit.

In order to detect the phase component of a signal identification clock by the clock phase detecting unit 14B, the clock phase difference detecting unit detects the clock phase difference information supplied to the identifying circuit 11 and the signal error differential detecting unit detects the signal error differential information obtained by the identifying circuit 11. Then the clock phase calculating unit subjects the output of the clock phase difference detecting unit and the output of the signal error differential detecting unit to a calculation process.

Hence, the simplified configuration can detect surely the phase component of a signal identification clock.

Furthermore, the clock phase calculating unit is formed as a dividing unit that subjects the output of the error detecting unit and the output of the signal inclination detecting unit to a division calculation process. In the division process of the clock phase operating unit, the dividing unit subjects the output of the error detecting unit and the output of the signal inclination detecting unit to a division calculation process.

Hence the clock phase calculating unit can be realized very easily.

In this case, the clock phase calculating unit may be constituted as an exclusive OR calculating unit that subjects the output of the error detecting unit and the output of the signal inclination detecting unit to an exclusive OR calculation process. In the operation in the clock phase calculating unit, the exclusive OR calculating unit subjects the output of the error detecting unit and the output of the signal inclination detecting unit to an exclusive OR calculation process.

Hence, the clock phase calculating unit can be realized readily in a more-simplified configuration.

Figure 5:
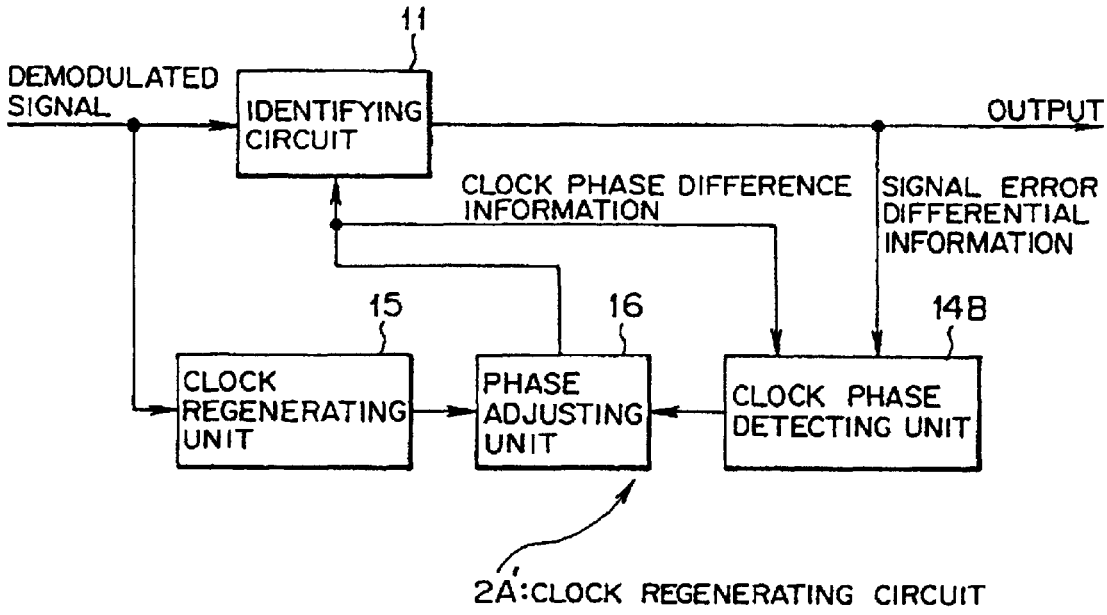
FIG. 5 is a block diagram showing the fifth aspect of the present invention.

FIG. 5 is a block diagram illustrating the fifth aspect of the present invention. Referring to FIG. 5, numeral 2A' represents a clock regenerating circuit. The clock regenerating circuit 2A' is arranged in the receiving unit of multiplex radio equipment including an identifying circuit 11 that identifies a signal obtained by demodulating a multilevel orthogonal modulated signal at a predetermined identification level. The clock regenerating circuit 2A' regenerates a signal identification clock to the identifying units for the identifying circuit 11.

As shown in FIG. 5, the clock regenerating circuit 2A' includes a clock regenerating unit 15, a phase adjusting unit 16, and a clock phase detecting unit 14B.

The clock regenerating unit 15 regenerates a signal identification clock from a multilevel orthogonal modulated signal to be detected. The phase adjusting unit 16 adjusts the phase of a clock from the clock regenerating unit 15 to supply to the identifying circuit 11. The clock phase detecting unit 14B detects the phase component of a signal identification clock based on clock phase difference information supplied to the identifying circuit 11 and signal error differential information obtained by the identifying circuit 11 to supply the phase component to the clock regenerating circuit 15.

In the clock regenerating circuit 2A' shown in FIG. 5, the clock regenerating unit 15 regenerates a signal identification clock from a multilevel orthogonal modulated signal to be detected, and the phase adjusting unit 16 adjusts the phase of a clock from the clock generating unit 15 to supply to the identifying circuit 11. The clock phase detecting unit 14B detects the phase component of a signal identification clock based on clock phase difference information supplied to the identifying circuit 11 and signal error differential information obtained by the identifying circuit 11 to supply to the clock regenerating circuit 2A'.

Hence according to the clock regenerating circuit 2A' arranged in the receiving unit of multilevel radio equipment of the present invention, even if an equalizing circuit that subjects a demodulated signal to an equalizing process is not provided, the accuracy of a signal identification clock can be improved by the very-simplified configuration.

An averaging unit may be arranged between the clock phase detecting unit 14B and the phase adjusting unit 16 to average the output of the clock phase detecting unit 14B. Hence the averaging unit can average the output (the phase component of a signal identification clock) from the clock phase detecting unit 14B.

Hence, a signal identification clock can be regenerated with higher accuracy.

In the clock regenerating circuit 2A', the identifying circuit 11 may be formed of plural identifying units corresponding to the number of plural signals obtained by demodulating a multilevel orthogonal modulated signal. The clock regenerating unit 15, the phase adjusting unit 16, and the clock phase detecting unit 14B may be arranged in common to the identifying units.

In this case, the phase component of a signal identification clock for each identifying unit is detected by the clock phase detecting unit 14B shared with each identifying unit and then supplied to the phase adjusting unit 16 as a phase adjustment and control signal for a signal identification clock regenerated by the clock regenerating unit 15.

Hence, in the receiving unit of the multiplex radio equipment in which plural signals are obtained by demodulating a multilevel orthogonal modulated signal, the phase component of a signal identification clock for each identifying unit can be adjusted accurately so that the accuracy of a signal identifying process in each identifying unit can be improved greatly.

Moreover, in the clock regenerating circuit 2A', the identifying circuit 11 is formed of plural identifying units corresponding to the number of plural signals obtained by demodulating a multilevel orthogonal modulated signal. An averaging unit that averages the output from the clock phase detecting unit 14B is arranged between the clock phase detecting unit 14B and the phase adjusting unit 16. The clock regenerating unit 15, the phase adjusting unit 16, the averaging unit, and the clock phase detecting unit 14B are used in common to each identifying unit.

In this case, the clock phase detecting unit 14B shared by each identifying unit detects the phase component of a signal identification clock for each identifying unit. The averaging unit shared by each identifying unit averages the phase component and then supplies the resultant component as a phase adjustment and control signal to adjust the phase of a signal identification clock regenerated by the clock regenerating unit 15, to the phase adjusting unit 16.

Hence, since the averaging unit can average the phase component of a signal identification clock, it can adjust more accurately the same and then deliver to each identifying unit. Thus it is possible to improve more greatly the accuracy of the signal identifying process in each identifying unit.

In the clock regenerating circuit 2A', the identifying circuit 11 may be formed of plural identifying units corresponding to the number of plural signals obtained by demodulating a multilevel orthogonal modulated signal. The clock regenerating unit 15 is used in common to each identifying unit. Plural phase adjusting units 16 and plural clock phase detecting units 14B are arranged corresponding to the identifying units.

In this case, the clock phase detecting units 14B arranged corresponding to the identifying units detect respectively the phase components of signal identification clocks for the identifying units and then supply them to the phase adjusting unit 16.

Hence, since the clock phase detecting units 14B arranged corresponding to the identifying units detect respectively the phase component of a signal identification clock and the phase adjusting units 16 can adjust them, the signal identifying clock can be supplied with higher accuracy.

In the clock regenerating circuit 2A', the identifying circuit 11 is formed of plural identifying units corresponding to the number of plural signals obtained by demodulating a multilevel orthogonal modulated signal. An averaging unit is arranged between the clock phase detecting unit 14B and the phase adjusting unit 16 to average the output of the clock phase detecting unit 14B. The clock regenerating unit 15 is shared with each identifying unit. Plural phase adjusting units 16, plural averaging units, and plural clock phase detecting units 14B may be arranged corresponding to the identifying units.

In this case, the clock phase detecting units 14B arranged corresponding to the identifying units detect respectively the phase components of signal identification clocks for the identifying units. The averaging units arranged corresponding to the identifying units average the phase components to supply to the phase adjusting units 16 as phase adjustment and control signals of signal identification clocks regenerated by the clock regenerating unit 15.

Hence, the phase components of signal identification clocks are respectively detected by the clock phase detecting units corresponding to the identifying units, averaged by the averaging units, and adjusted by the phase adjusting units. Hence the signal identification clocks can be supplied with higher accuracy to the identifying units.

The clock regenerating circuit 2A' may include a test signal generating unit that generates a test signal as well as a selecting unit that selectively outputs the output of the clock phase detecting unit 14B and the output of the test signal generating unit. The output of the selecting unit may be input to the phase adjusting unit 16.

In the clock regenerating circuit 2A', the test signal generating unit generates a test signal. The selecting unit selectively outputs the output from the clock phase detecting unit 14B and the output from the test signal generating unit to input the selected one to the phase adjusting unit 16.

Hence, the signal identification clock sent to the identifying circuit 11 can be tested and regenerated very easily.

Figure 6:
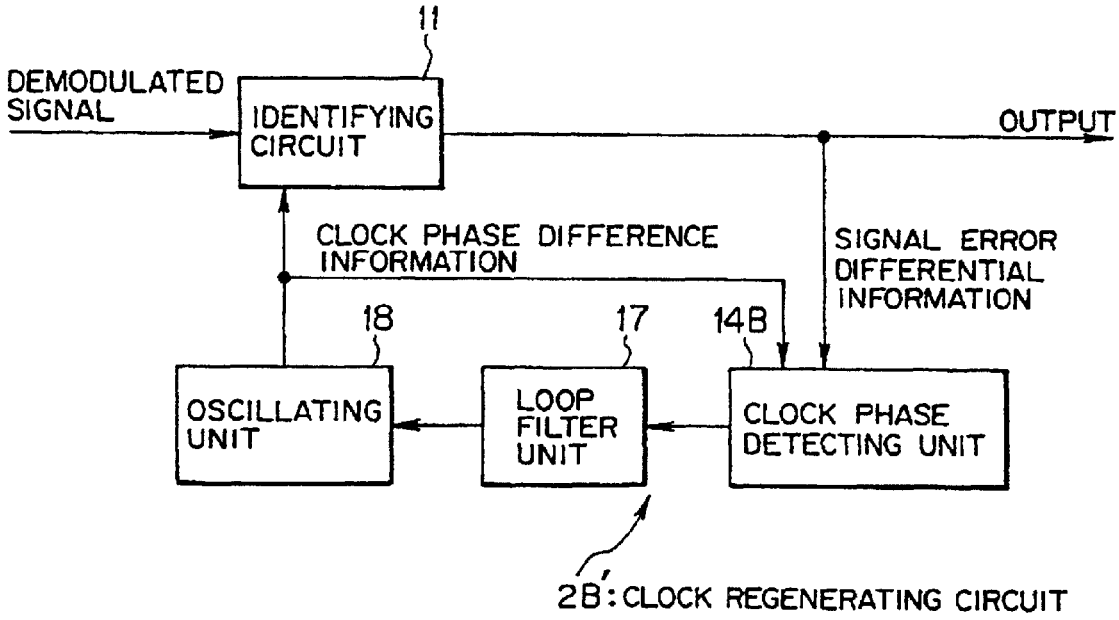
FIG. 6 is a block diagram showing the sixth aspect of the present invention.

FIG. 6 is a block diagram showing the sixth aspect of the present invention. Referring to FIG. 6, numeral 2B' represents a clock regenerating circuit. The clock regenerating circuit 2B' is arranged in the receiving unit of multiplex radio equipment including an identifying circuit 11 that identifies a signal obtained by demodulating a multilevel orthogonal demodulated signal at a predetermined identification level. The clock regenerating circuit 2B' regenerates a signal identification clock for the identifying circuit 11 to the identifying circuit 11.

As shown in FIG. 6, the clock regenerating circuit 2B' includes a clock phase detecting unit 14B, a loop filter unit 17, and an oscillating unit 18.

The clock phase detecting unit 14B detects the phase component of a signal identification clock based on clock phase difference information supplied to the identifying circuit 11 and signal error differential information obtained by the identifying circuit 11 to supply it to the clock regenerating circuit 12B. The loop filter unit 17 integrates the output of the clock phase detecting unit 14B. The oscillating unit 18 outputs a signal identification clock for the identifying circuit 11 to the identifying circuit 11 in response to the output acting as a control input of the loop filter unit 17.

As shown in FIG. 6, in the clock regenerating circuit 2B', the clock phase detecting unit 14B detects the phase component of the signal identification clock based on the clock phase difference information supplied to the identifying circuit 11 and signal error differential information obtained by the identifying circuit 11. The loop filter unit 17 integrates the resultant phase component. The oscillating unit 18 receives the output of the loop filter unit 17 as a control input and then outputs a signal identification clock for the identifying circuit 11 to the identifying circuit 11.

Hence, according to the clock regenerating circuit 2B', even if an equalizing circuit that subjects a demodulated signal to an equalizing process is not arranged, the simplified configuration can improve greatly the accuracy of the signal identification clock.

In the clock regenerating circuit 2B', the identifying circuit 11 may consist of plural identifying units corresponding to the number of plural signals obtained by demodulating a multilevel orthogonal modulated signal. The clock phase detecting unit 14B, the loop filter unit 17, and the oscillating unit 18 are used in common to the identifying units.

In this case, the phase component of a signal identification clock to each identifying unit is detected by the clock phase detecting unit 14B which is shared by the identifying units. The detected phase component is integrated by the loop filter unit 17. The oscillating unit 18 receives the result as a control input to produce signal identification clocks.

Hence, in the receiving unit of the multiplex radio equipment which demodulates a multilevel orthogonal modulated signal to obtain plural signals, the oscillating unit 18 adjusts very easily the phase component of a signal identification clock for each identifying unit to supply to each identifying unit. This feature allows each identifying unit to improve the accuracy of a signal identifying process.

In the clock regenerating circuit 2B', the identifying circuit 11 may consist of plural identifying units corresponding to plural signals obtained by demodulating a multilevel orthogonal modulation signal. Plural clock phase detecting units 14B are arranged corresponding to the plural identifying units. The loop filter unit 17 and the oscillating unit 18 are used in common to the identifying units. A composing unit is arranged to compose the output of each clock phase detecting unit 14B. The output of the composing unit is supplied as an input to the loop filer unit 17.

In this case, the clock phase detecting units 14B arranged corresponding to the identifying units detect respectively the phase components of signal identification clocks sent to the identifying units. The detected phase components are composed by the composing unit. The loop filter unit 17 receives the result as an input.

As described above, the clock phase detecting units arranged corresponding to the identifying units detect respectively the phase components of signal identifying clocks for each identifying unit. The composing unit composes the detected phase components. Then the result is supplied to the oscillating unit 18 via the loop filter unit 17. Hence the signal identification process accuracy in each identifying unit can be greatly improved.

Moreover, in the clock regenerating circuit 2B', the identifying circuit 11 may be formed of plural identifying units corresponding to the number of plural signals obtained by demodulating a multilevel orthogonal modulation signal. Plural clock phase detecting units 14B and plural loop filter units 17 are arranged corresponding to the identifying units. The oscillating unit 18 is used in common to the identifying units. A part of plural identifying units are connected to the oscillating unit via the phase adjusting unit. The output of each loop filter unit 17 is supplied as a control input to the oscillating unit 18 or the phase adjusting unit.

In this case, the clock phase detecting units 14B arranged corresponding to the identifying units detect respectively the phase components of signal identification clocks for each identifying unit. Each loop filter unit 17 integrates the detected phase component to supply as a control input to the oscillating unit 18 or the phase adjusting unit.

Hence, the oscillating unit 18 or the phase adjusting unit adjusts respectively the phase component of a signal identification clock for each identifying unit and then supplies the signal identification clock to each identifying unit. Thus each identifying unit can improve greatly the accuracy of the signal identifying process.

In the clock regenerating circuit 2B', the identifying circuit 11 may consist of plural identifying units corresponding to the number of plural signals obtained by demodulating a multilevel orthogonal modulated signal. The second clock phase detecting unit is arranged to detect the phase component of a signal identification clock in a method different from the clock phase detecting unit 14B'. The loop filter unit 17 and the oscillating unit 18 are used in common to each identifying unit. A composing unit is arranged to compose the output of the clock phase detecting unit 14B and the output of the second clock phase detecting unit. The output of the composing unit is supplied as an input to the loop filter unit 17.

In this case, the clock phase detecting unit 14B and the second clock phase detecting unit detect the phase component of a signal identification clock for each identifying unit according to different methods, respectively. The composing unit composes the detected phase components to supply as an input to the loop filter unit 17.

Hence, the signal identification clock can be supplied to each identifying unit by adjusting more accurately the phase component of a signal identification clock for each identifying unit, whereby the accuracy of a signal identifying process in each identifying unit can be more improved.

In this example, instead of the composing unit, a selecting unit that outputs selectively the output of the clock phase detecting unit 14B and the output of the second clock phase detecting unit may be arranged to supply the resultant output as an input to the loop filter unit 17.

In this case, the selecting unit selectively supplies the phase components of signal identification clocks detected in a different method by means of the clock phase detecting unit 14B and the second clock phase detecting unit to the loop filter unit 17 as an input.

Hence, in this case, the accuracy of a signal identifying process in each identifying unit can be greatly improved.

The clock regenerating circuit 2B' may include a selecting unit that selectively outputs the output of the clock phase detecting unit 14B and the output of the test signal generating unit in addition to a test signal generating unit that generates a test signal. The output of the selecting unit is supplied to the loop filter unit 17 as an input.

Thus in the clock regenerating circuit 2B', the test signal generating unit generates a test signal and the selecting unit selectively outputs the output of the clock phase detecting unit 14B and the output of the test signal generating unit to supply the selected one to the loop filter unit 17.

Hence, the signal identification clock for the identifying circuit 11 can be tested and regenerated very easily.

(b) First Embodiment of the Present Invention:

Next, the first embodiment according to the preset invention will be explained below by referring to the attached drawings.

Figure 7:
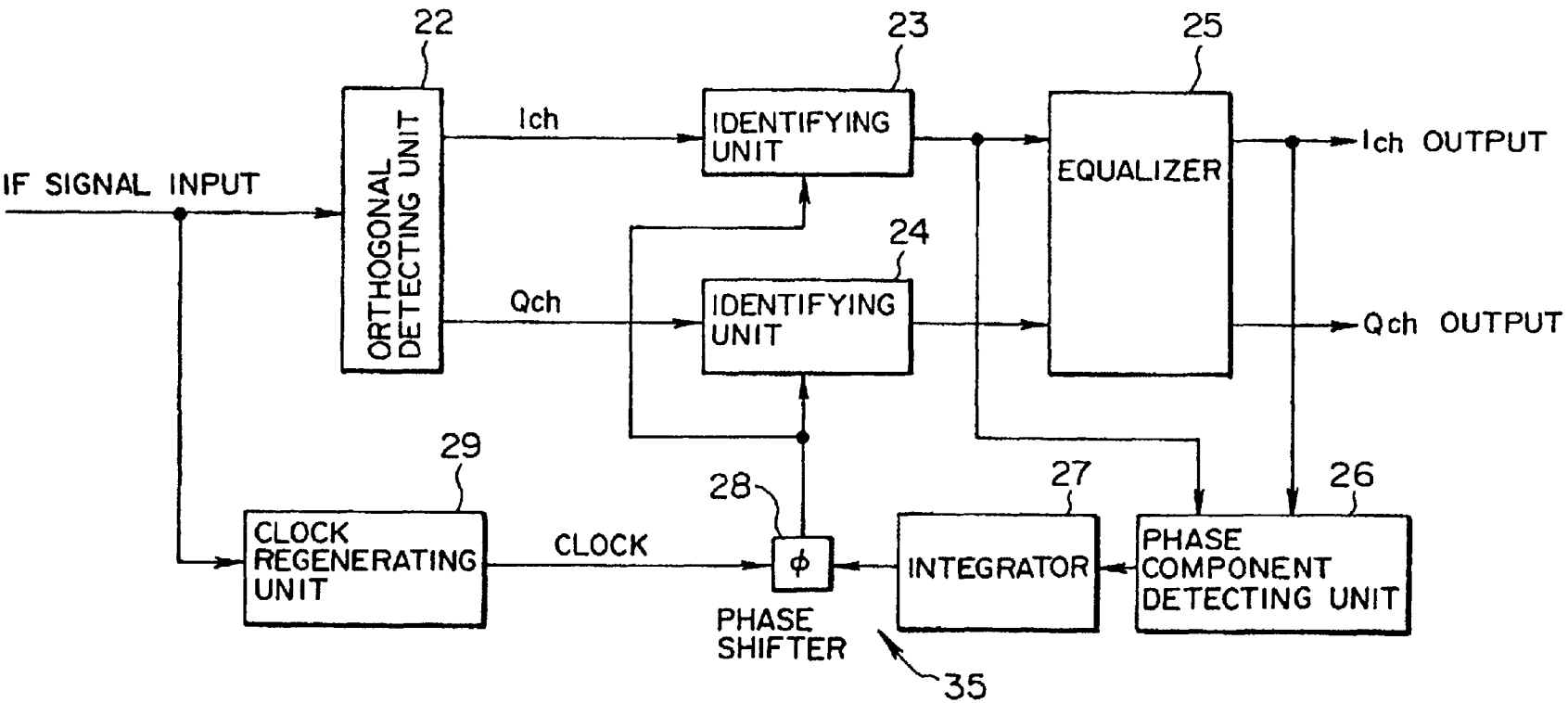
FIG. 7 is a block diagram showing the configuration of each of a clock phase detecting circuit and a clock regenerating circuit arranged in multiplex radio equipment according to the first embodiment of the present embodiment.

FIG. 7 is a block diagram showing the configuration of each of a clock phase detecting circuit and a clock regenerating circuit each arranged in the receiving unit in multiplex radio equipment, according to the first embodiment of the present invention. Referring to FIG. 7, numeral 22 represents an orthogonal detecting unit that detects an IF band signal (in this embodiment, it is assumed that a multiplex radio equipment on an originating side performs an orthogonal modulation such as PSK or QAM) received by the multiplex radio equipment and obtained by performing a frequency conversion and then obtains two kinds of base band signals (an Ich signal and a Qch signal) being different (perpendicular to) by 90° in phase from each other; 23 and 24 represent identifying units each that identifies the output (signals obtained by demodulating multilevel orthogonal modulated signals) from the orthogonal detecting unit 22 at a predetermined identification level; 25 represents an equalizer (equalizing circuit) that subjects the output (a signal obtained by demodulating a multilevel orthogonal modulation signal) from the identifying units 23 or 24 to an equalizing process.

Figure 9:
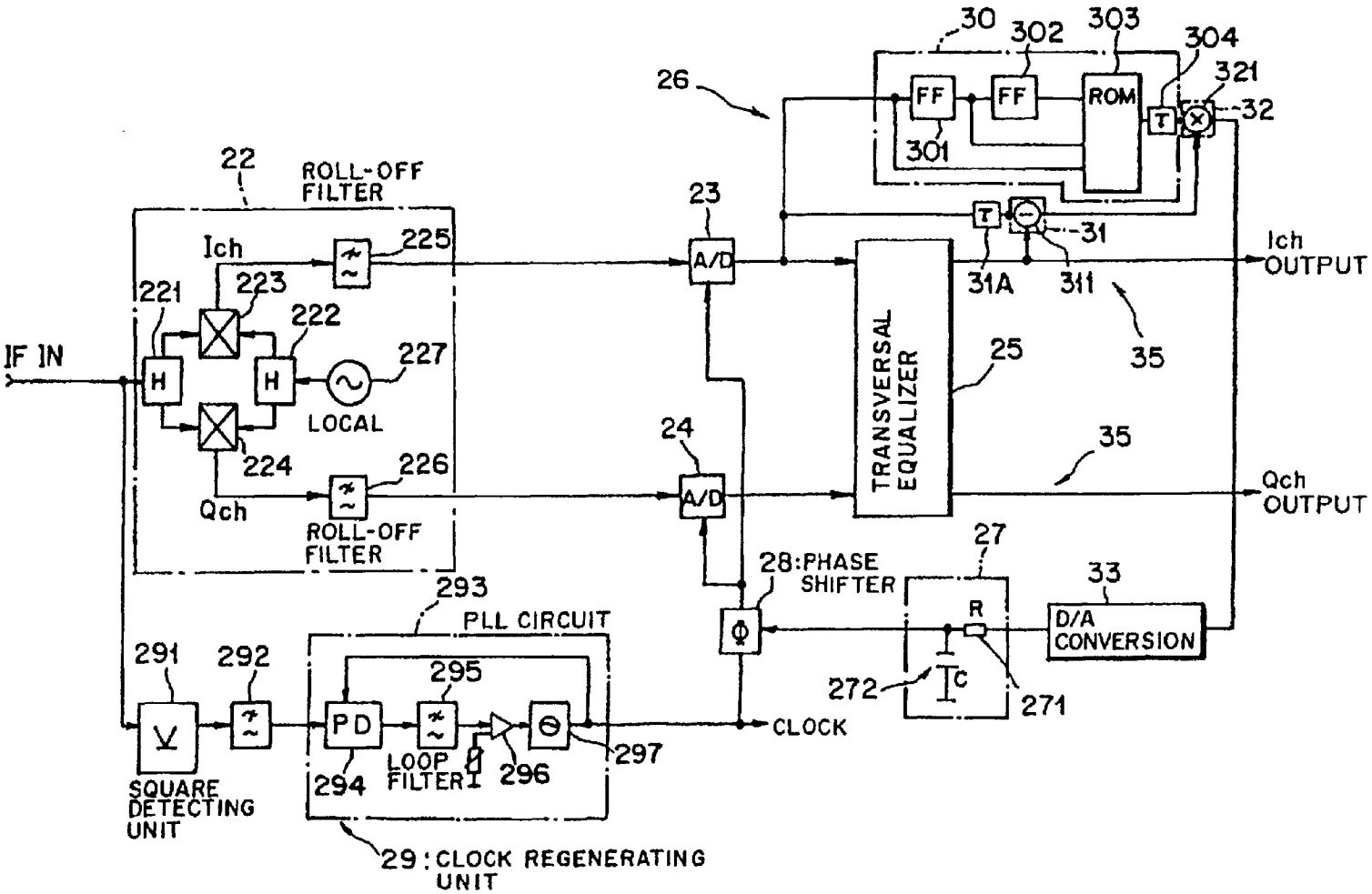
FIG. 9 is a block diagram illustrating the detail configuration of each of a clock regenerating circuit and the peripheral circuits according to the first embodiment of the present invention.

In this embodiment, as shown in FIG. 9, the orthogonal detecting unit 22 consists of hybrid circuits (H) 221 and 222, phase detectors 223 and 224, roll-off filters 225 and 226, and a local oscillating unit 227. The identifying units 23 and 24 correspond respectively to two kinds (plural) of signals (an Ich signal and a Qch signal) obtained by demodulating a multilevel orthogonal modulated signal. The identifying units 23 and 24 are formed of two A/D converters, respectively. The equalizer 25 is formed of a transversal equalizer.

In the orthogonal detecting unit 22, the hybrid circuit 221 splits the input IF signal into two signals. The two signals are output respectively to the phase detectors 223 and 224. At this time, the local oscillating unit 227 supplies a carrier regenerating signal synchronized in phase with the a carrier wave to the hybrid circuit 222. The hybrid circuit 222 splits the carrier regenerating signal into two signals with phases being different by 90° from each other and then outputs them respectively to the phase detectors 223 and 224.

As a result, the phase detectors 223 and 224 produce respectively base band signals (an Ich signal and a Qch signal) with phases being different by 90° from each other. The A/D converter (identifying unit) 23 subjects an Ich signal via the roll-off filter 225 to an A/D conversion (signal identification) while the A/D converter (identifying unit) 24 subjects a Qch signal via the roll-off filter 226 to an A/D conversion (signal identification). As a result, digital demodulated signals different from 90° in phase from each other are obtained. The transversal equalizer 25 subjects the digital demodulated signals to an equalizing process.

Referring to FIG. 7, numeral 26 represents a phase component detecting unit. The clock regenerating circuit 35 being the main portion according to the present invention consists of the integrator 27, the phase shifter 28, and the clock regenerating unit 29, in addition to the phase component detecting unit 26. According to the present embodiment, the phase component detecting unit 26, the integrator 27, the phase shifter 28, and the clock regenerating unit 29 are used in common to the identifying units 23 and 24.

Figure 8:
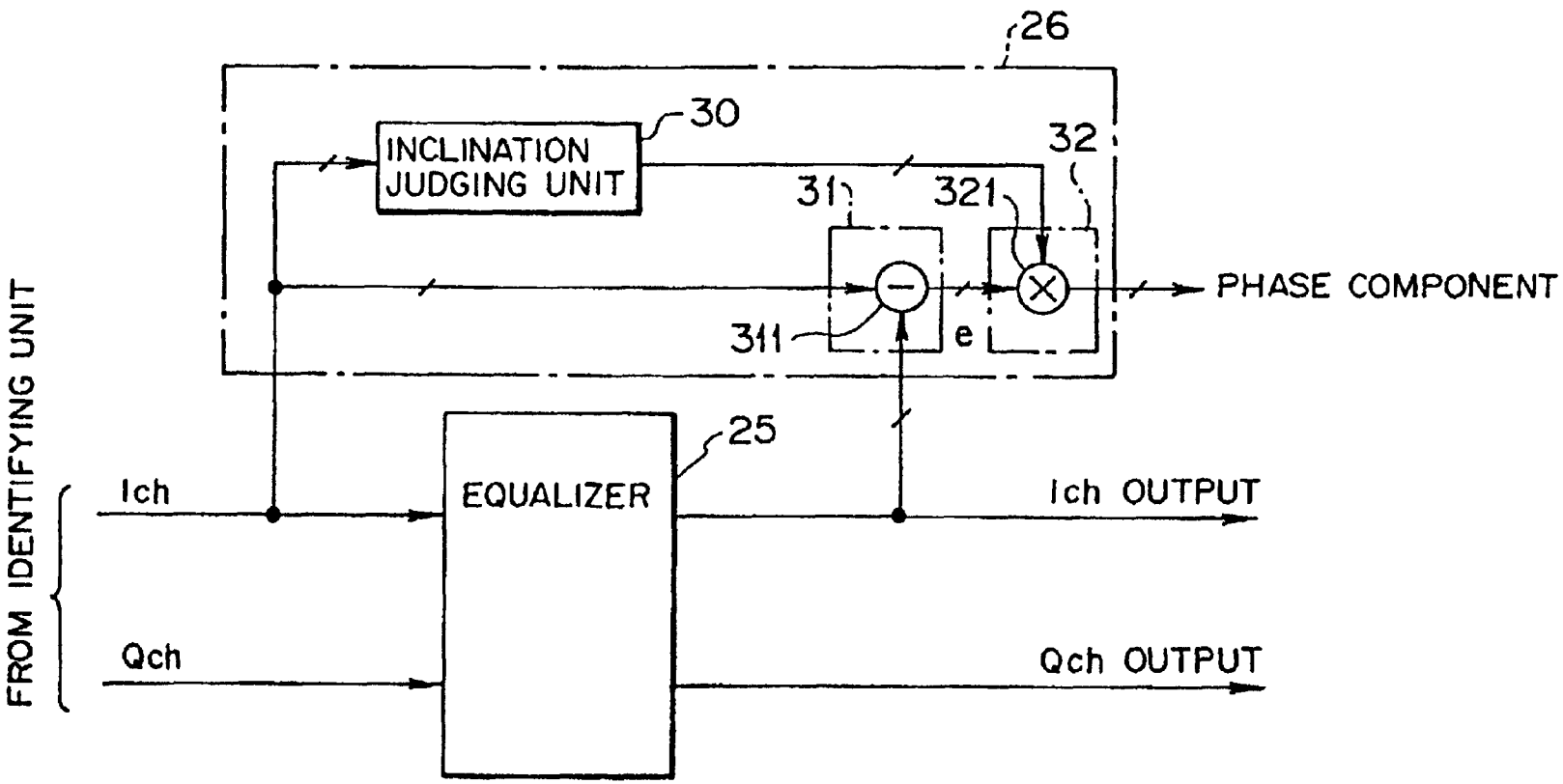
FIG. 8 is a block diagram showing the configuration of a phase component detecting unit according to the first embodiment of the present embodiment.

The phase component detecting unit (clock phase detecting unit (circuit)) 26 detects the phase component of a signal identification clock (signal identification clock) in the identifying units 23 and 24 based on the input and output signals (Ich signals) of the equalizer 25 and then supplies it as a phase adjusting and control signal to the phase shifter 28 (to be described later). As shown in FIG. 8, the phase component detecting unit 26 consists of an inclination judging unit 30, an error detecting unit 31 formed of a subtracter 311 and a clock phase calculating unit 32 formed of a multiplier 321.

The inclination judging unit (signal inclination detecting unit) 30 detects the inclination of an Ich signal (demodulated signal) (as described later). In the error detecting unit 31, the subtracter 311 subjects the Ich input signal and the Ich output signal of the equalizer 25 to a substracting process to detect an error (hereinafter, referred to as a signal error) between the Ich input signal and the Ich output signal of the equalizer 25. In the clock phase calculating unit 32, the multiplier 321 subjects the output of the inclination judging unit 30 and the output of the error detecting unit 31 (subtracter 311) to a multiplying process and then detects the phase component of a signal identification (A/D conversion) clock to the identifying units (A/D converters) 23 and 24.

The inclination judging unit 30, as shown in FIG. 9 is formed of flip-flop (FF) circuits 301 and 302, a ROM 303, and a time adjusting unit 304. Each of the FF circuits (delaying units) 301 and 302 delays in time the output of the A/D converter 23. The ROM (comparing unit) 303 compares the output from the FF circuit 301 with the output from the FF circuit 302 to detect the inclination of the Ich signal (demodulated signal).

The multiplier (clock phase calculating unit 32) 321 multiplies the inclination of an Ich signal detected by the ROM 303 with the signal error of the Ich signal obtained by subjecting the input signal and the output signal of the transversal equalizer 25 to a subtracting process by means of the subtracter 311 (error detecting unit 31). As a result, each of the A/D converters 23 and 24 can obtain information (phase component) regarding the phase deviation of an A/D conversion (signal identification) clock supplied as an A/D conversion operation timing.

Each of the time adjusting units 31A and 304 adjusts in time so as to agree the output from the inclination judging unit 30 with the output from the error detecting unit 31 in a multiplying timing of the clock phase calculating unit 32.

The integrator (averaging unit) 27 arranged between the phase component detecting unit 26 and the phase shifter 28 averages the output of the phase component detecting unit 26. As shown in FIG. 9, the integrator 27 is formed of a resistor (R) 271 and a capacitor (C) 272. The resistor 271 and the capacitor 272 averages an A/D conversion clock phase deviation information converted from a digital signal to an analog signal by the D/A converter 33.

The phase shifter (phase adjusting unit) 28 adjusts the phase of an A/D conversion clock generated by the clock regenerating unit 29 (to be described later) based on the information regarding the phase deviation of an A/D conversion clock detected by the phase component detecting unit 26 and averaged by the integrator 27 and then supplies the result to the identifying units (A/D converters) 23 and 24.

The clock regenerating unit 29 regenerates the A/D conversion clock from the IF signal to be detected by the orthogonal detecting unit 22 and supplies it to the identifying units (A/D converters) 23 and 24. Generally, as shown in FIG. 9, the clock regenerating unit 29 is formed of a square detecting unit 291 which performs a square detection, loop filters 292 and 295, a phase detector (PD) 294, an amplifier 296, and an oscillating unit 297. In this embodiment, the phase detector 294, the loop filter 295, the amplifier 296, and the oscillating unit 297 provide the so-called PLL circuit 293.

The operations of the phase component detecting unit 26 and the clock regenerating circuit 35 each being the above-mentioned main element according to the present invention will be described below in detail with reference to FIG. 9.

In the phase component detecting unit 26, each of the FF circuits 301 and 302 delays part of the Ich signal (digital demodulated signal) to be equalized by the transversal equalizer 25 at intervals of e.g. time T (that is, sampled at intervals of time T), and then inputs the information regarding each of signal levels at three points to the ROM 303. The ROM 303, for example, as shown in FIG. 10, time-sequentially stores and compares three pieces of information regarding the signal levels at three points (−T,0,T) to detect the inclination "g" of the Ich signal.

If the transversal equalizer 25 equalizes the Ich signal with the inclination "g" by "e", the subtracter 311 in the error detecting unit 31 subjects the Ich signal to be equalized by the transversal equalizer 25 and the Ich signal after an equalizing process to a subtracting process, thus producing a signal error "e".

Figure 10:
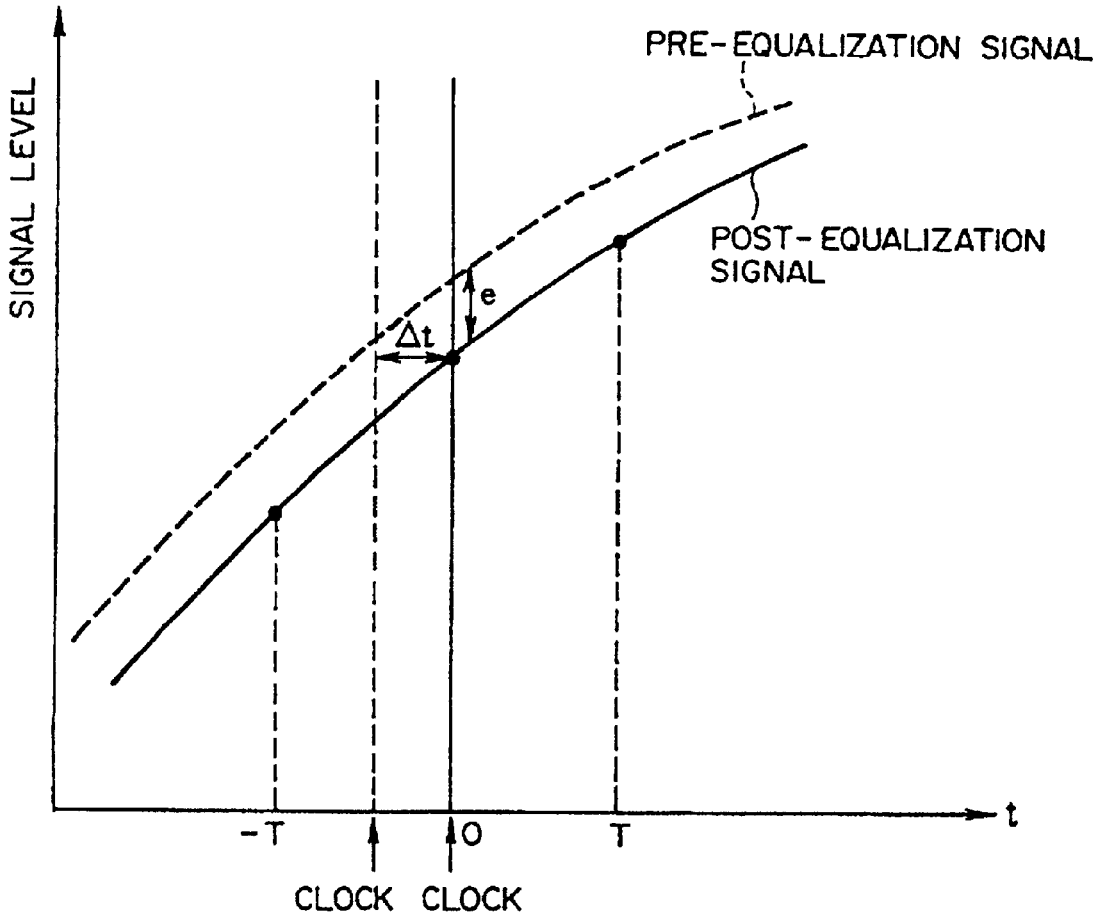
FIG. 10 is a diagram used for explaining the operation of a clock regenerating circuit according to the first embodiment.

In this case, as shown in FIG. 10, the phase of the A/D conversion clock is shifted by "Δt" from the optimum phase at which the opening portion of the eye pattern is opened maximumly. However, the phase shift "Δt" is expressed by the following formula:

$$\Delta t = g \times e \tag{1}$$

where "g" is the inclination of the Ich signal and "e" is a signal error of the Ich signal. Hence the multiplier 321 in the clock phase calculating unit 32 detects an A/D conversion clock phase shift "Δt" by multiplying the inclination "g" of the Ich signal by the signal error "e" of the Ich signal. Then the phase shift "Δt" can be supplied to the clock regenerating circuit 35 and then regenerated as an A/D conversion clock phase adjustment and control signal in the clock regenerating unit 29.

In the clock regenerating circuit 35, the IF signal to be detected by the orthogonal detecting unit 22 is processed desirably through the square detecting unit 291, the filter 292, and the PLL circuit 293 so that an A/D conversion timing signal is created to the A/D converters 23 and 24. The D/A converter 33 converts the phase shift "Δt" of an A/D conversion clock as described above from a digital signal to an analog signal and then the integrator 27 averages the analog signal. The phase shifter 28 receives the output of the integrator 27 as a phase adjustment and control signal to adjust the phase shift of the A/D conversion clock, thus sending it to the A/D converters 23 and 24.

Therefore, the A/D conversion clock to the A/D converters 23 and 24 to be regenerated in the clock regenerating circuit 35 can be always agreed to the optimum phase at which the opening portion of the eye pattern is opened maximumly. As a result, each of the A/D converters 23 and 24 can improve greatly the accuracy of the A/D conversion process.

As described above, the error detecting unit 31 detects the input signal to output signal error "e" of the transversal equalizer 25 while the inclination judging unit (signal inclination detecting unit) 30 detects the inclination "g" of the demodulated signal. Then the multiplier 321 in the clock phase calculating unit 32 multiplies the output of the error detecting unit 31 by the output of the inclination judging unit 30. Thus the phase shift (phase component) "Δt" of an A/D conversion clock can be obtained, whereby the phase shift of an A/D conversion clock can be surely detected.

Furthermore, the A/D conversion clock for the A/D converters (identifying units) 23 and 24 is obtained by means of the phase component detecting unit 26, the integrator 27, the phase shifter 28, and the clock regenerating unit 29 each used in common to the A/D converters (identifying units) 23 and 24. Hence in the receiving unit in the multiplex radio equipment wherein two kinds of orthogonal signals (an Ich signal and a Qch signal) are obtained by demodulating a multilevel orthogonal modulation signal such as 16 QAM, the phase shift of an A/D conversion clock can be detected and adjusted by a very-simplified configuration.

Since the integrator 27 can average the output (phase adjustment and control signal) of the phase component detecting unit 26, the accuracy of the phase adjustment and control signal to the phase shifter 28 can be increased, whereby the phase shifter 28 can perform accurately the phase adjusting process.

Figure 11:
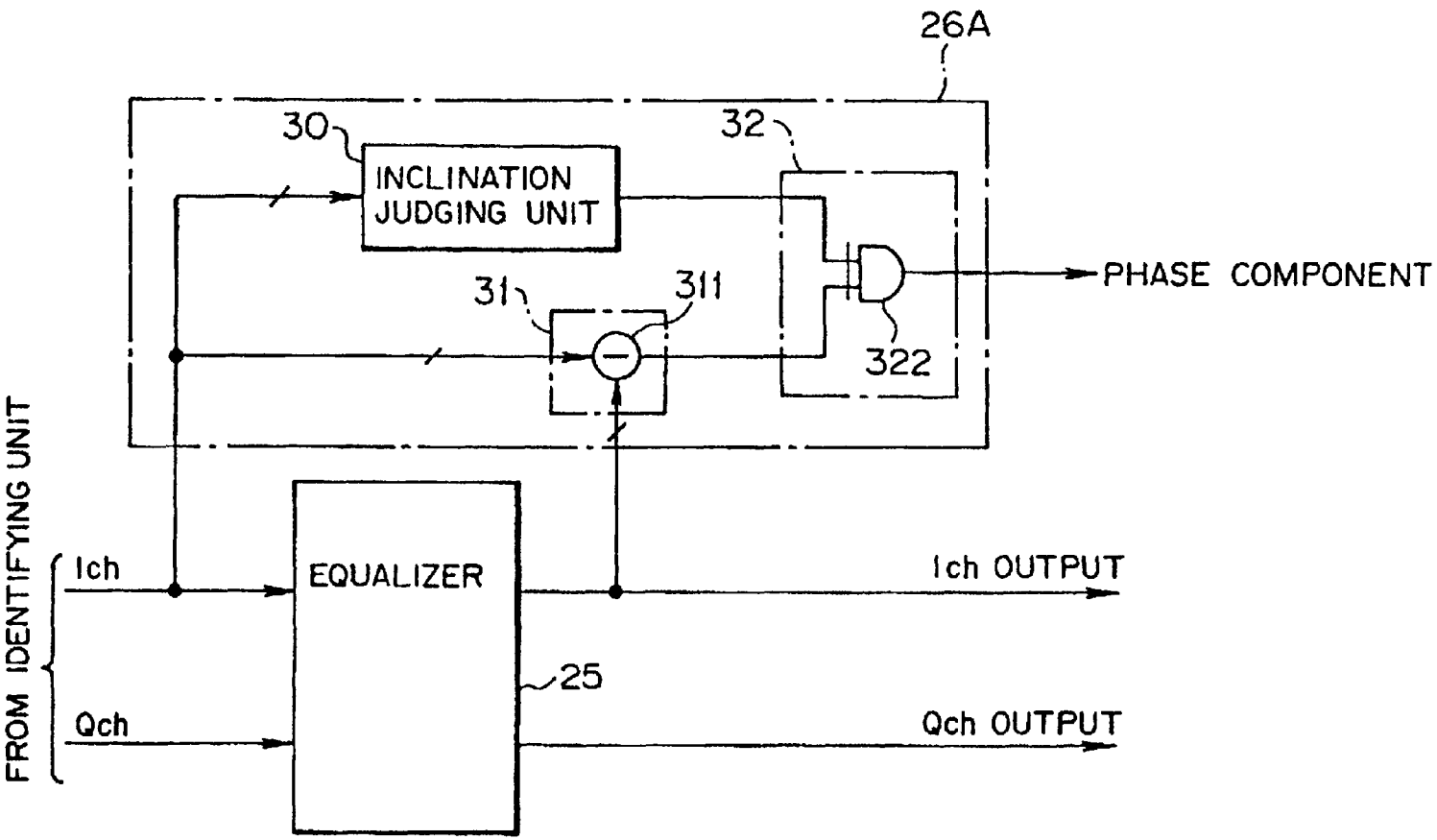
FIG. 11 is a block diagram illustrating another configuration of a phase component detecting unit according to the first embodiment.

If the inclination "g" obtained by the inclination judging unit 30 and the signal error "e" obtained by the error detecting unit 31 are simply expressed only by polarity, the clock phase calculating unit 32 (refer to FIG. 8) may be formed of an EX-OR gate (exclusive OR element) 322 instead of the multiplier 321, as shown in FIG. 11. Hence the more simplified configuration can detect the phase shift (phase component) of an A/D conversion clock.

In the clock regenerating circuit 35, the phase component detecting unit 26 arranged on the Ich channel side detects the phase shift of an A/D conversion clock from the Ich signal. However, the phase component detecting unit 26 may be arranged on the Qch channel side to detect the phase shift of an A/D conversion clock based on the Qch signal. In the embodiments to be described later, the phase shift of an A/D conversion clock can be detected using either the Ich signal or Qch signal.

Figure 12:
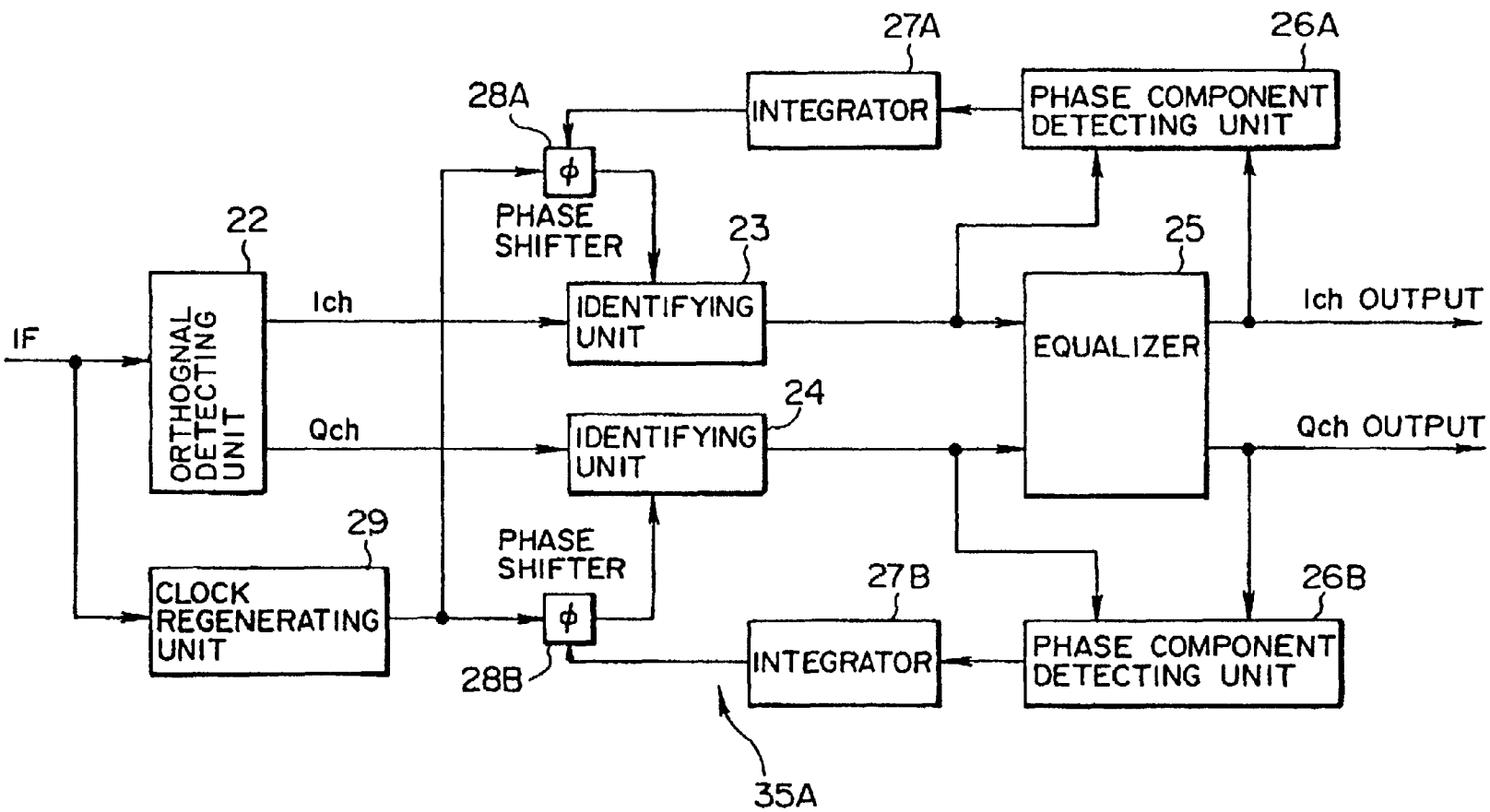
FIG. 12 is a block diagram illustrating another configuration of a clock regenerating circuit according to the first embodiment.
Figure 13:
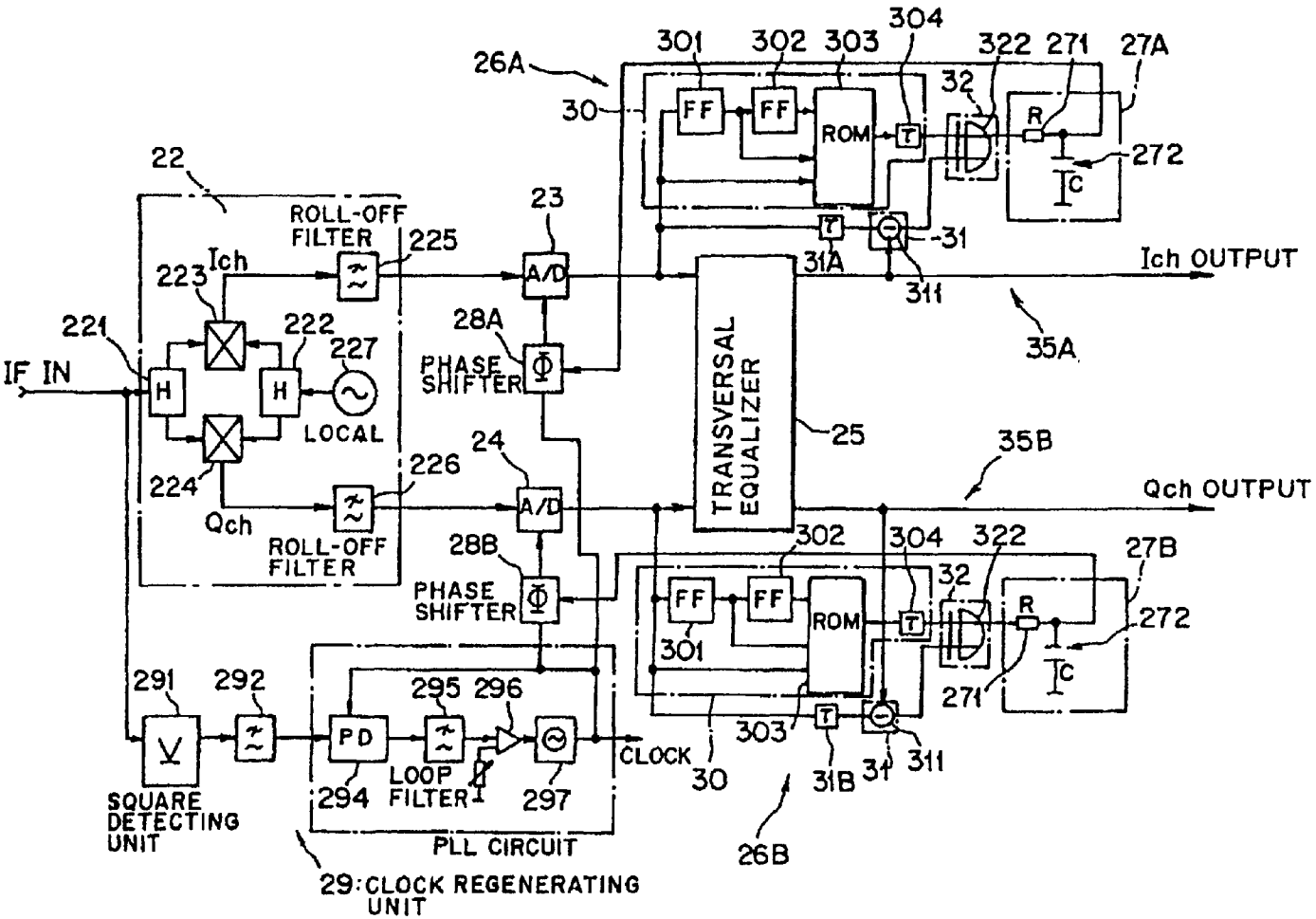
FIG. 13 is a block diagram illustrating a clock regenerating circuit and the peripheral circuits according to the first embodiment.

FIGS. 12 and 13 are block diagrams each illustrating another configuration of the clock regenerating circuit 35. In the clock regenerating circuit 35A shown in FIGS. 12 and 13, the clock regenerating unit 29 is used in common to identifying units (A/D converters) 23 and 24. The phase shifter 28A, the integrator 27A, and the phase component detecting unit 26A which correspond respectively to the phase shifter 28, the integrator 27, and the phase component detecting unit 26, described with FIGS. 7 and 9, are arranged to the identifying unit 23. The phase shifter 28B, the integrator 27B, and the phase component detecting unit 26B which correspond respectively to the phase shifter 28, the integrator 27, and the phase component detecting unit 26, described with FIGS. 7 and 9, are arranged to the identifying unit 24.

Each of the phase component detecting units 26A and 26B shown in FIG. 13 resembles structurally the phase component detecting unit 26A shown in FIG. 11. The clock phase calculating unit 32 is constituted as an EX-OR gate 322. The clock phase calculating unit 32 may be formed as the multiplier 321 shown in FIG. 7. In FIGS. 12 and 13, the same signs as those shown in FIGS. 7 and 9 represent same elements.

In the clock regenerating circuit 35A having the above-mentioned configuration, like the configuration shown in FIGS. 7 and 9, the phase component detecting unit 26A arranged corresponding to the channel (Ich) identifying unit 23 detects the phase shift of an A/D conversion clock based on an Ich signal while the phase component detecting unit 26B arranged corresponding to the channel (Qch) identifying unit 24 detects the phase shift of an A/D conversion clock based on a Qch signal. The integrator [27] *27A* averages the phase shift of an A/D conversion clock to supply as a phase adjustment and control signal for the phase shifter 28A to the phase shifter 28A while the integrator [27] *27B* averages the phase shift of an [A/ID] *A/D* conversion clock to supply as a phase adjustment and control signal for the phase shifter 28B to the phase shifter 28B. As a result, the phase shifters 28A and 28B adjust independently the phase of the A/D conversion clock regenerated in the clock regenerating unit 29 and supply it respectively to the identifying units 23 and 34.

Hence, compared with the clock regenerating circuit 35 shown in FIGS. 7 and 9, the signal identification clocks supplied to the identifying units 23 and 24 can be agreed with higher accuracy the optimum timing (at which the opening portion of the eye pattern is opened maximumly). Hence the accuracy of the signal identifying process in each of the identifying units 23 and 24 can be improved largely.

The inclination judging unit 30 in the phase component detecting unit 26 (26A or 26B), as described in FIG. 10, detects the inclination "g" of an Ich signal by sampling and comparing the Ich signal to be equalized by the transversal equalizer 25 at the time T. However, the inclination of the Ich signal can be detected more accurately by shortening the sampling time.

For example, when a high-speed identifying unit that calculates at a twofold clock speed is used for the identifying unit 23 and the Ich signal to be equalized by the transversal equalizer 25 is sampled at an interval of time T/2, the inclination of a signal can be accurately detected merely by comparing the signal levels at two points including a current time "0" and a past time "−T/2".

FIG. 14 is a block diagram illustrating the configuration of a inclination judging unit using the high speed identifying unit 23' that calculates at a twofold clock speed instead of the identifying unit 23 based on the above-mentioned theory. In this case, the inclination judging unit 30A is formed of flip-flop (FF) circuits 305 and 306 and a comparing unit 307.

The FF circuit (delaying unit) 305 calculates at a twofold clock speed (high speed) to delay the output of the identifying unit 23' by the time T/2. The FF circuit (latching unit) 306 latches (holds) the output of the identifying unit 23' and the output of the FF circuit 305 at intervals of time T, based on the basic clock (slower than the high speed clock) obtained by dividing the high speed clocks by means of the frequency divider 36. The comparing unit 307 compares the output of the identifying unit 23' latched by the FF circuit 306 with the output of the FF circuit 305 and then detects the inclination of the Ich signal (demodulated signal).

Figure 16:
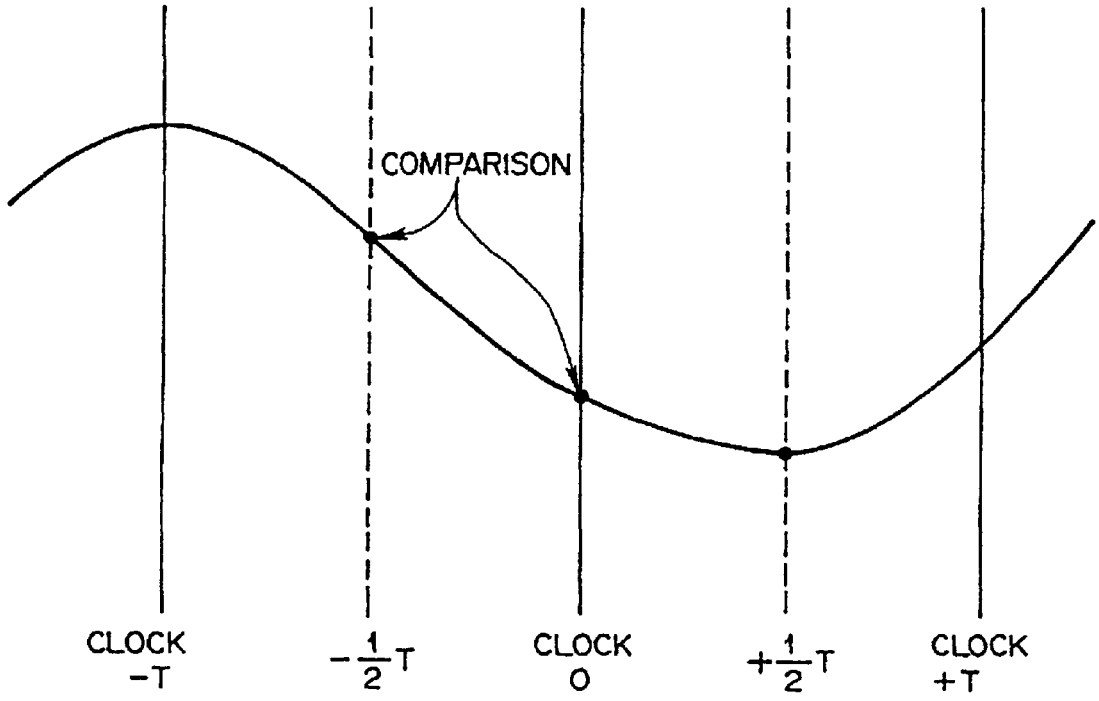
FIG. 16 is a diagram used for explaining the operation of a clock regenerating circuit according to the first embodiment.

In the inclination judging unit 30A having the above-mentioned configuration, the FF circuit 306, for example, as shown in FIG. 16, latches the current Ich signal (at the time "0") and the past Ich signal (at the time "−T/2") delayed by the time T/2 by the [FE] *FF* circuit 305 and then outputs them to the comparing unit 307 according to the basic clocks from the frequency divider 36.

The comparing unit 307 compares the signal levels at two points of the time "0" and the time "−T/2" to detect the inclination of the Ich signal.

Figure 15:
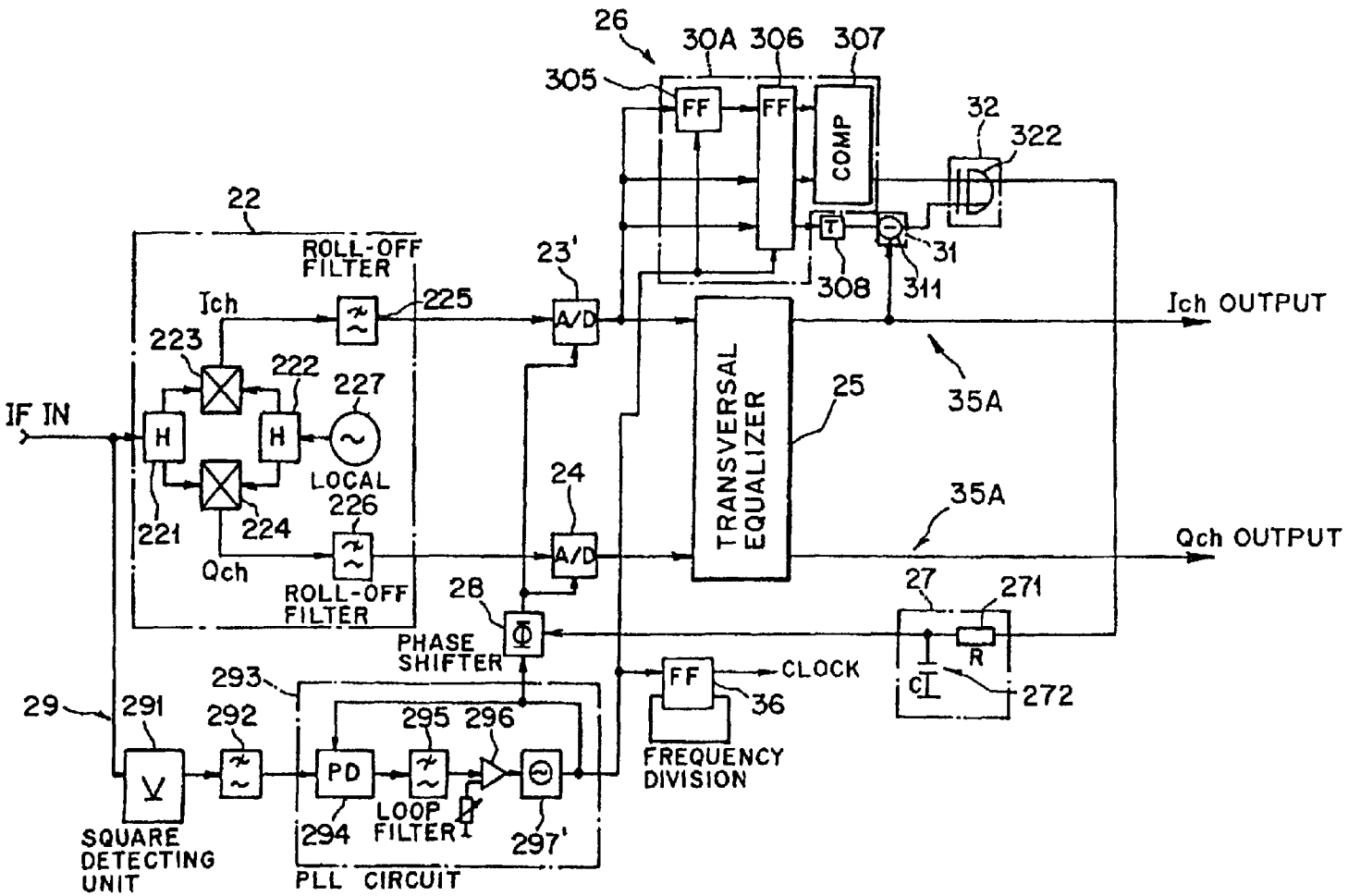
FIG. 15 is a block diagram illustrating the detail configuration of each of a clock regenerating circuit and the peripheral circuits according to the first embodiment.

FIG. 15 is a block diagram showing the detail configuration of each of the clock regenerating circuit 35A and the peripheral circuits in the case where the inclination judging unit 30A is applied instead of the inclination judging unit 30 in the phase component detecting unit 26 shown in FIG. 9. In this case, a comparator (COMP) is used as the comparing unit 307 and a flip-flop (FF) circuit with input and output terminals loop-connected partially is used as the frequency divider 36. The time adjusting unit (τ) 308 arranged to the output side of the FF circuit 306 adjusts the time for which the Ich signal is input to the subtracter 311 to agree the inclination of an Ich signal to be operated by the clock phase calculating unit 32 with the signal error in the input timing.

In FIG. 15, an oscillating unit 297' which generates at a frequency twice the basic frequency (f) is used in the PLL circuit 293 to create two-fold speed clocks in the clock regenerating unit 29. In FIG. 15, like numerals represent like elements shown in FIG. 9.

In this case, in the phase component detecting unit 26, as shown in FIG. 14, the EX-OR gate (clock phase calculating unit 32) 322 calculates the inclination of an Ich signal to be detected by the inclination judging unit 30A just before the transversal equalizer 25 equalizes, and a signal error and then detects the phase shift of the A/D conversion clocks input to the A/D converters 23' and 24. The signal error is obtained by subjecting the input and output signals of the transversal equalizer 25 to a subtracting process by the subtracter 311 (error detecting unit 31).

Thereafter, like the configuration shown in FIG. 9, the D/A converter 33 converts the phase shift of the A/D conversion clock from the digital signal into an analog signal. Then the integrator 27 averages the analog signal and outputs as a phase adjustment and control signal to the phase shifter 18. The phase shifter 18 adjusts automatically the phase shift of the A/D conversion clock for the A/D converters 23' and 24 (in this case, two-fold speed clock) regenerated by the clock regenerating unit 29 according to the above-mentioned phase adjustment and control signal to supply to the A/D converters 23' and 24.

As described above, according to the clock regenerating circuit 35A shown in FIG. 15, since the signal level of the Ich signal is sampled and compared at intervals of the time "T/2" shorter than the basic clock sampling time "T", using the two-fold high speed clocks, the inclination of the Ich signal can be detected more accurately. Hence the phase shift of the A/D conversion clock regenerated by the clock regenerating unit 29 can be adjusted more accurately and the A/D conversion clocks with higher accuracy can be obtained for the A/D converters 23' and 24.

The phase component detecting unit 26 samples and compares the Ich signals at two points including the time "−T/2" and the time "0" to detect the inclination of the Ich signal. However, when a FF circuit is used to delay additionally the output of the FF circuit 305 by the time "T/2", the inclination of the Ich signal can be detected more accurately by sampling the Ich signals at three points including the time "−T/2", the time "0", and the time "T/2" and then by comparing the signal level of the three Ich signals by the COMP 307.

Figure 17:
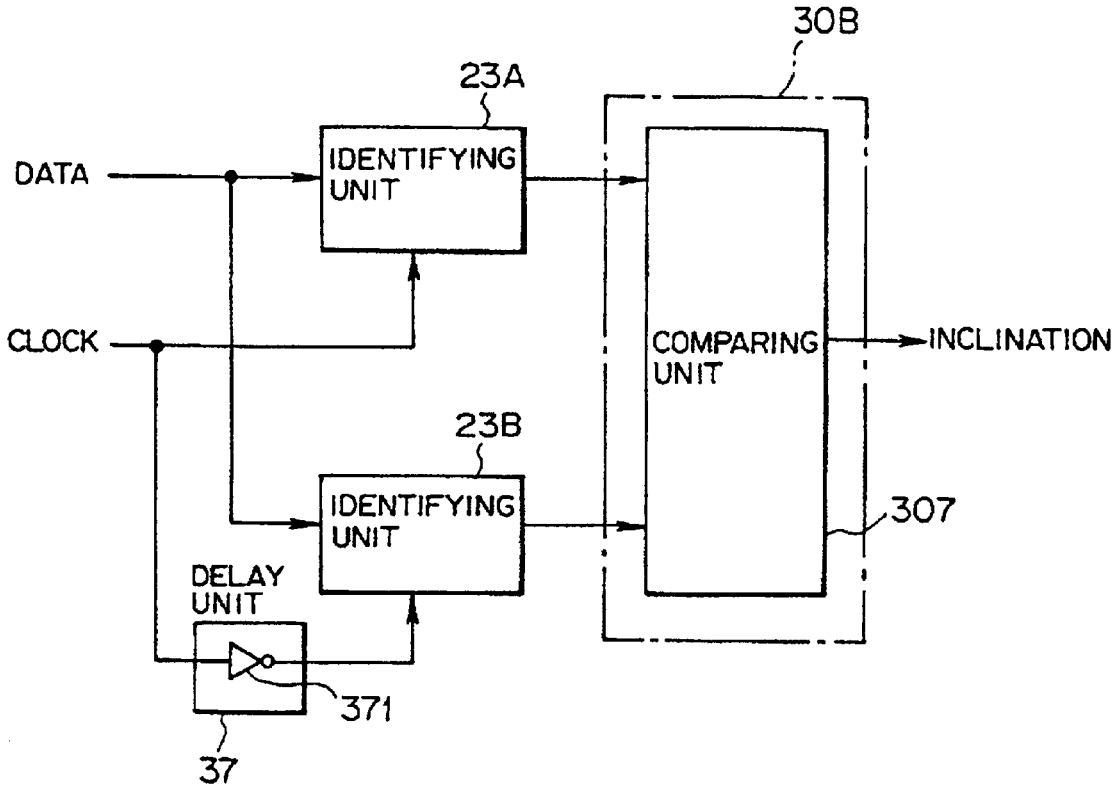
FIG. 17 is a block diagram illustrating another configuration of a phase component detecting unit according to the first embodiment.

Instead of the high speed clock identifying unit (A/D converter) 23' that calculates at the two-fold clock speed, as shown in FIG. 17, the identifying units 23A and 23B shown in FIG. 7 or 12, and the delaying unit 37 (in this example, the inverting gate 371) can be used to supply two kinds of clocks different in phase by "T/2" from each other respectively to the identifying units 23A and 23B between the identifying units 23A and 23B. Thus the inclination judging unit 30B can be constituted of only the comparing unit 307 so that the Ich signal can be sampled at intervals of the time "T/2".

Figures 19A, 19B, 19C:
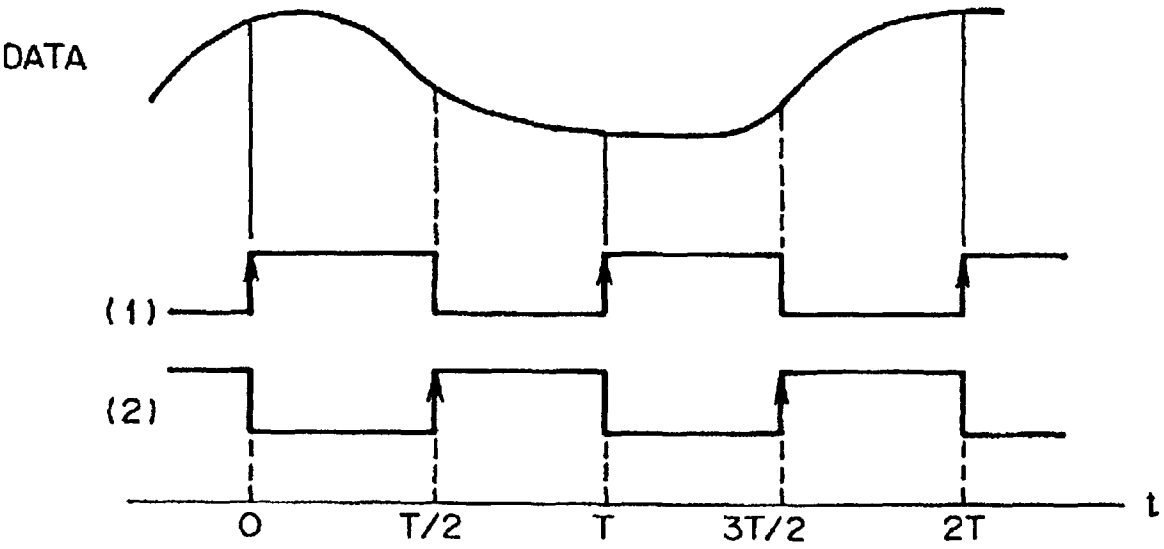
FIGS. 19(a) to 19(c) are diagrams each used for explaining the operation of a clock regenerating circuit according to the first embodiment.

For example, when the Ich signal (data), as shown in FIG. 19(a), is input to the identifying unit 23A, the clock pulses (1) having an "H" level at intervals of the time "T/2" is supplied to the identifying unit 23A as shown in FIG. 19(b). The clock pulses (2) different in phase by "T/2" from the clock pulses input to the identifying unit 23A (or clock pulses different in phase by a predetermined amount) is supplied to the identifying unit 23B by inverting a part of the clock pulses by the inverting gate 371 in the delaying unit 37.

When the clock turns to the "H" level, each of the identifying units 23A and 23B outputs data. As a result, the comparing unit 307, for example, receives data at the time "0" and data at the time "T/2" to compare the two signal levels, thus detecting the inclination of the Ich signal (data).

Figure 18:
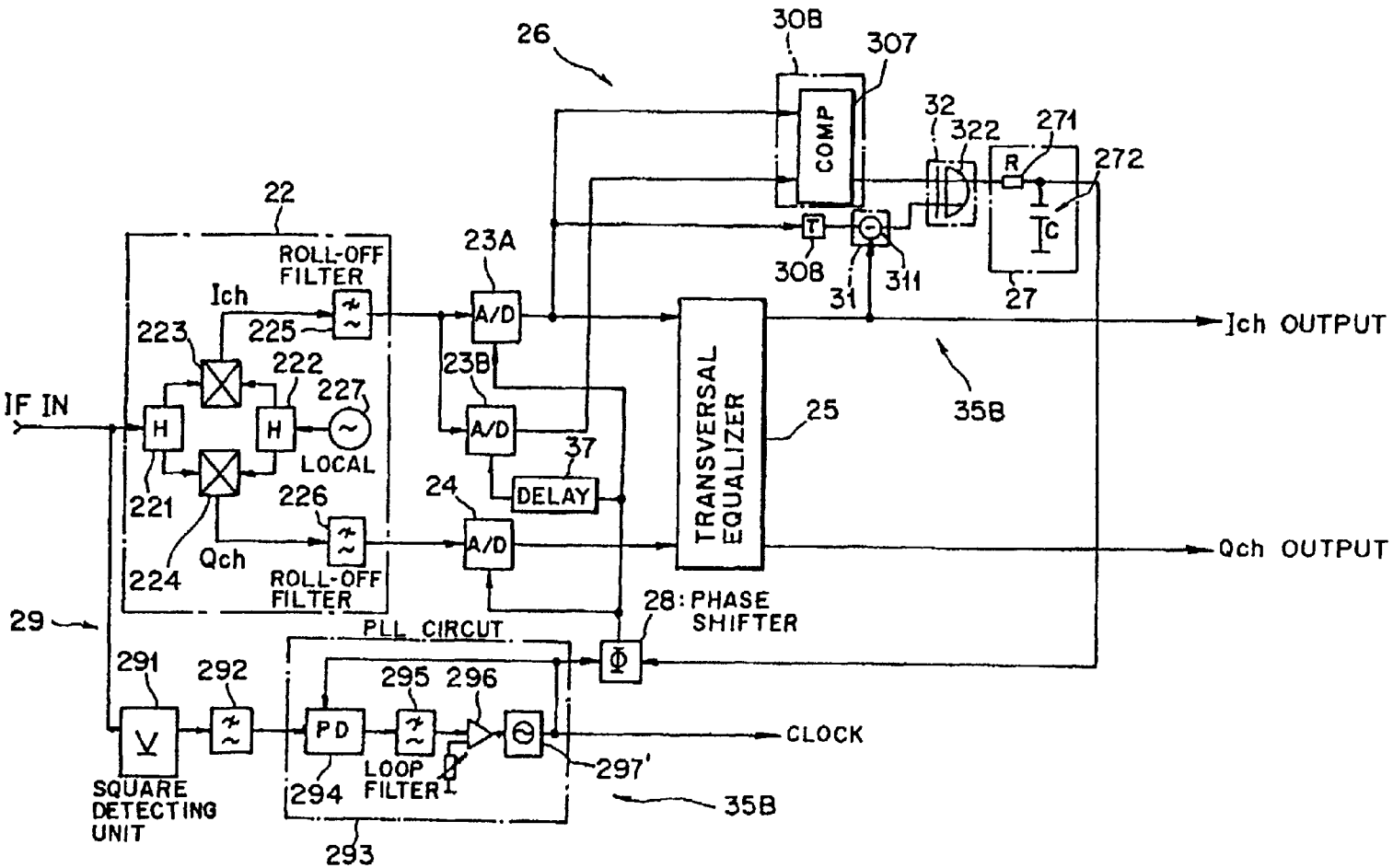
FIG. 18 is a block diagram showing the detail configuration of a clock regenerating circuit and the peripheral circuits according to the first embodiment.

FIG. 18 is a block diagram illustrating the detailed configuration of the peripheral circuits in the case where the circuit described with FIG. 17 is applied as the clock regenerating circuit 35B to the clock regenerating circuit 35A shown in FIG. 15. In FIG. 18, the identifying units 23A and 23B are constituted as A/D converters. The comparing unit 307 is constituted as the comparator (COMP) 307.

The A/D converter 23B receives the A/D conversion clocks obtained by delaying a part of the A/D conversion clocks supplied to the A/D converter 23A by the time "T/2" by the delaying unit 37. The COMP 307 compares the signal levels of Ich signals at two points output at intervals of the time "T/2" to detect the inclination of the Ich signal.

Thereafter, the EX-OR gate (clock phase calculating unit 32) 321 subjects the inclination of an Ich signal obtained as described above and the signal error of the Ich signal to an exclusive OR calculation. The signal error of the Ich signal is obtained by subjecting the input signal and the output signal of the transversal equalizer 25 to a subtracting process by the subtracter (error detecting unit 31) 311. Thus the phase shift of the A/D conversion clock to the A/D converters 23A, 23B and 24 is detected.

After the integrator 27 averages the phase shift of the A/D conversion clock, the phase shifter 28 receives the result as a phase adjustment and control signal to adjust the phase of the A/D conversion clock which is regenerated by the clock regenerating unit 29 and supplied to the A/D converters 23 and 24.

As described above, according to the clock regenerating circuit 35B which does not include the high-speed clock identifying unit (A/D converter) 23' shown in FIGS. 14 and 15, the Ich signal can be sampled at intervals of the time "T/2" by supplying clocks different in phase by the time "T/2" (or by a different predetermined amount in phase) respectively to the identifying units (A/D converters) 23A and 23B, without using the delaying circuit such as a flip-flop (FF) circuit. Hence, the inclination of an Ich signal can be detected more accurately using the more-simplified configuration, whereby the phase shift of the A/D conversion clock can be detected more accurately.

Hence the phase shifter 28 can adjust automatically and with high accuracy the phase shift of the A/D conversion clock for the identifying units (A/D converters) 23A, 23B, and 24 to be regenerated by the clock regenerating unit 29 and then supplies it to the identifying units (A/D converters) 23A, 23B, and 24.

Figure 20:
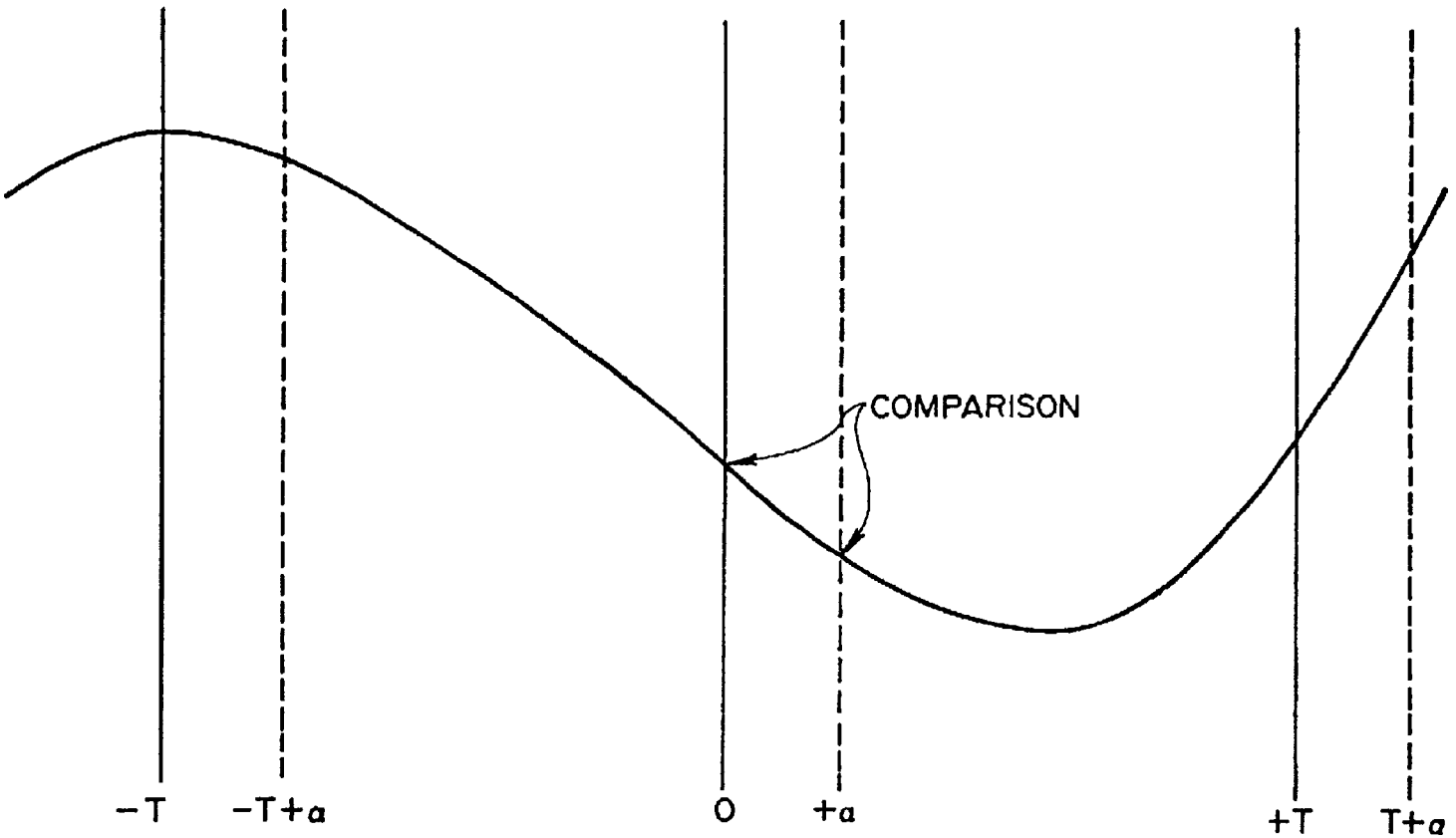
FIG. 20 is a diagram used for explaining the operation of a clock regenerating circuit according to the first embodiment.

In the above embodiment, the inverting gate 371 in the delaying unit 37 (see FIG. 17) inverts the clock to be supplied to the identifying unit (A/D converter) 23A and then shifts the phase of the clock to be supplied to the identifying unit (A/D converter) 23B by "T/2" to sample the Ich signal at intervals of the time "T/2". However, the Ich signal can be sampled at intervals of time shorter than the time "T/2" (e.g. the time "0" and the time "α") as shown in FIG. 20, by using an element delaying the clock phase by the shorter time "d" than the time "T/2" in the delaying unit 37. As a result, the inclination of the Ich signal can be detected more accurately.

Figure 21:
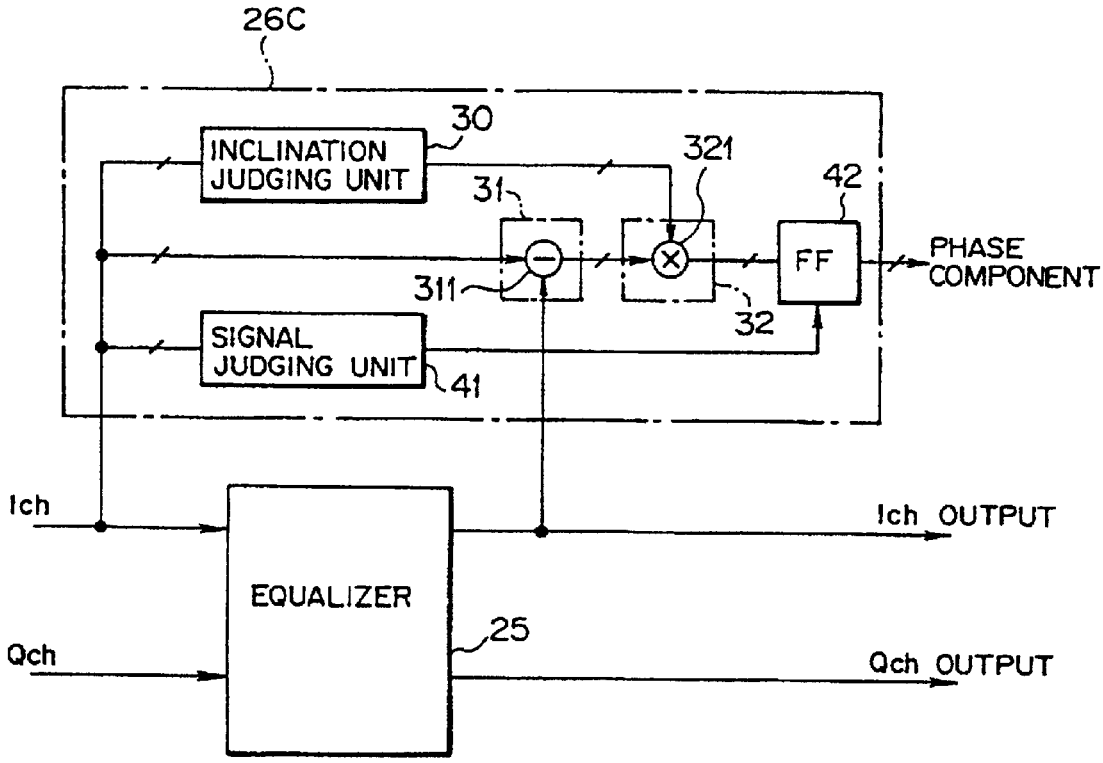
FIG. 21 is a block diagram showing another configuration of a phase component detecting unit according to the first embodiment.

FIG. 21 is a block diagram illustrating another configuration of the phase component detecting unit (clock phase detecting circuit) 26 described with FIGS. 7 and 8. The phase component detecting unit 26C, shown in FIG. 21, includes a signal judging unit 41 and a flip-flop (FF) circuit 42, in addition to the inclination judging unit 30, an error detecting unit 31 acting as the subtracter 311, and a clock phase calculating unit 32 acting as the multiplier 321 described with FIG. 8.

The signal judging unit (specific signal judging unit) 41 judges whether the signal point of the Ich signal input to the inclination judging unit 30 and the error detecting unit 31 is at a specific position of the so-called eye pattern (e.g. near the middle portion of the eye pattern) and the Ich signal is in a relatively good state in signal quality (or whether the signal point is a specific signal or not). The FF circuit (gating unit) 42 produces the phase shift (phase component) of an A/D conversion clock (signal identifying clock) obtained by the clock phase calculating unit 32 (multiplier 321), in response to signal notifying that the signal judging unit 41 judges that the signal point of the Ich signal to be input to the inclination judging unit 30 and the error detecting unit 31 is in a specific position of the eye pattern.

Figure 22:
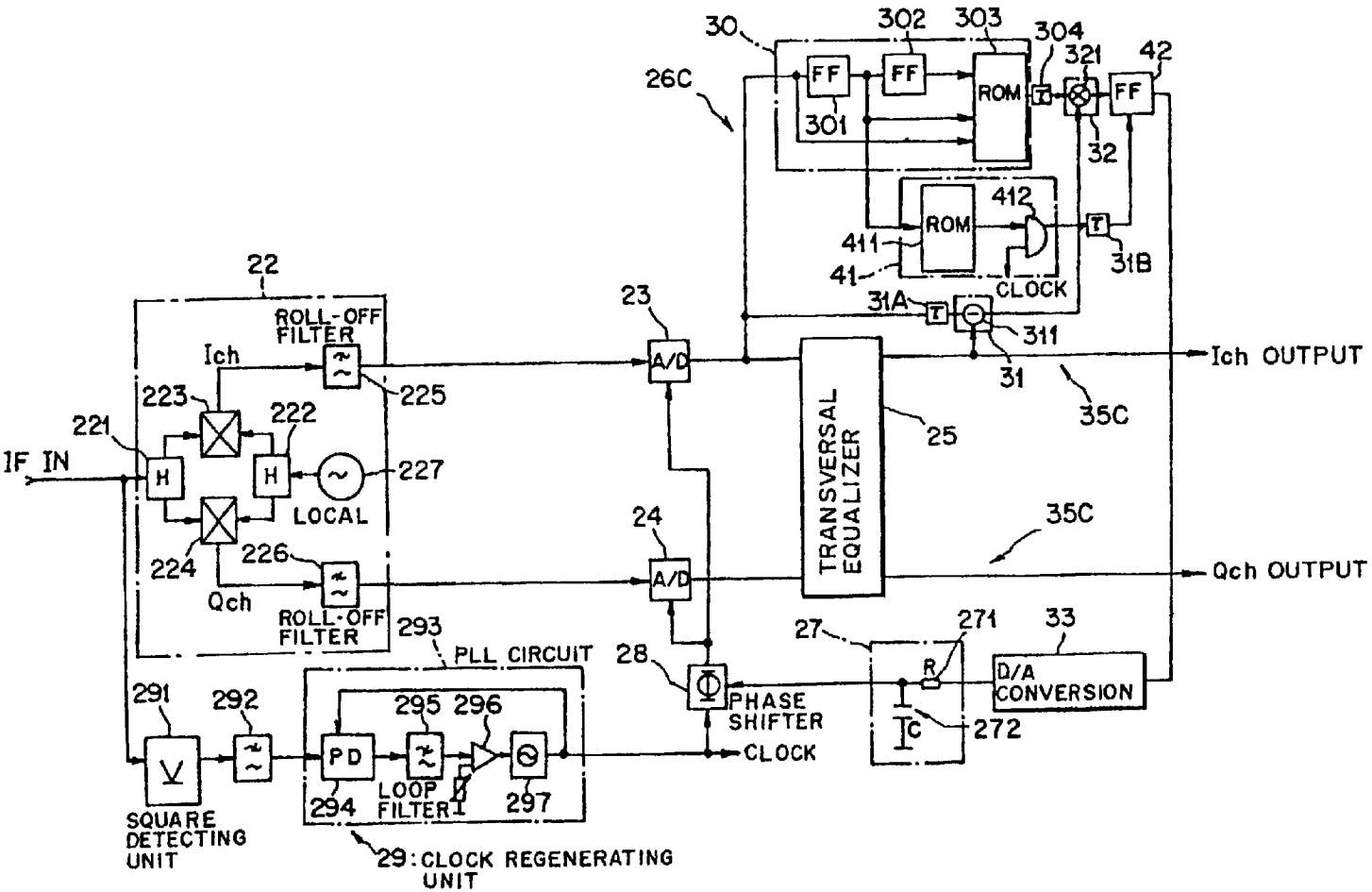
FIG. 22 is a block diagram showing the detail configuration of a clock regenerating circuit and the peripheral circuits according to the first embodiment.

FIG. 22 is a block diagram illustrating the detail configuration of the clock regenerating circuit 35C and the peripheral circuits in the case where the phase component detecting unit 26C is used instead of the phase component detecting unit 26 shown in FIG. 7. As shown in FIG. 22, the inclination judging unit 30 is formed of the flip-flop (FF) circuits 301 and 302 and the comparing unit (ROM) 303, corresponding to those shown in FIG. 9. The signal judging unit 41 is formed of a ROM 411 and an AND gate 412. Numerals 31A, 31B and 304 represent time adjusting units (τ) each which agrees with the operational timing of each unit. In FIG. 22, like numerals and symbols represent like elements in FIG. 9.

Figure 25:
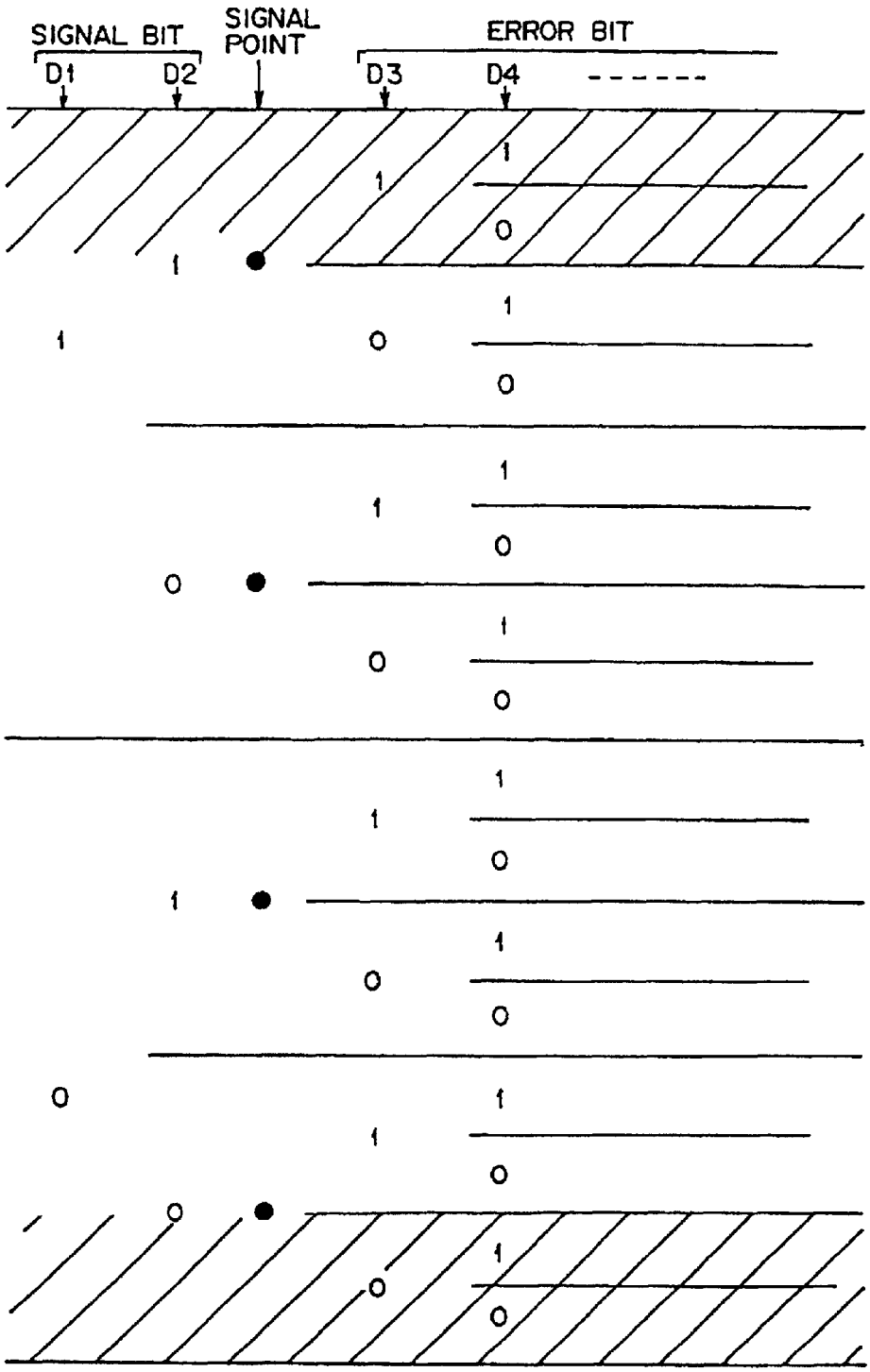
FIG. 25 is a diagram showing an example of data used in a phase component detecting unit according to the first embodiment.

In this case, the ROM 303 in the inclination judging unit 30 stores data regarding the inclination of an Ich signal detected. The ROM 411 within the signal judging unit 41 stores as signal quality status judging data partial data shown with the shaded portion among data formed of the so-called signal bit (D1, D2) and an error bit (D3, D4, . . . ), as shown in FIG. 25.

The phase component detecting unit 26C judges whether the signal point of an Ich signal input to the inclination judging unit 30 and the error detecting unit 31 is at a specific position of an eye pattern, based on data stored in the ROM 303 in the signal judging unit 41. If the signal point is at the specific position, the clock phase calculating unit (multiplier 321) 32 multiplies the inclination of an Ich signal detected by the inclination judging unit 30 by the signal error of an Ich signal obtained by the error detecting unit (subtracter 311) 31. Then the FF circuit 42 outputs the phase shift (phase component) of the resultant A/D conversion clock.

Thereafter, the D/A converter 33 converts the phase shift of the above-detected A/D conversion clock from a digital signal into an analog signal. Then the integrator 27 averages the resultant analog signal and then supplies it to the phase shifter 28 as an A/D conversion clock phase adjustment and control signal for the A/D converters 23 and 24 regenerated by the clock regenerating unit 29.

As described above, according to the phase component detecting unit 26C, only when the signal point of an Ich signal input to the inclination judging unit 30 and the error detecting unit 31 is at a specific position of the eye pattern, the phase shift of the A/D conversion clock detected is supplied as a phase adjustment and control signal to the phase shifter 28. Hence the phase shift of the A/D conversion clock can be adjusted more accurately so that the A/D conversion clock for the A/D converters 23 and 24 can be agreed with the phase of optimum A/D conversion timing at which the opening of the eye pattern is opened at its maximum.

Figure 23:
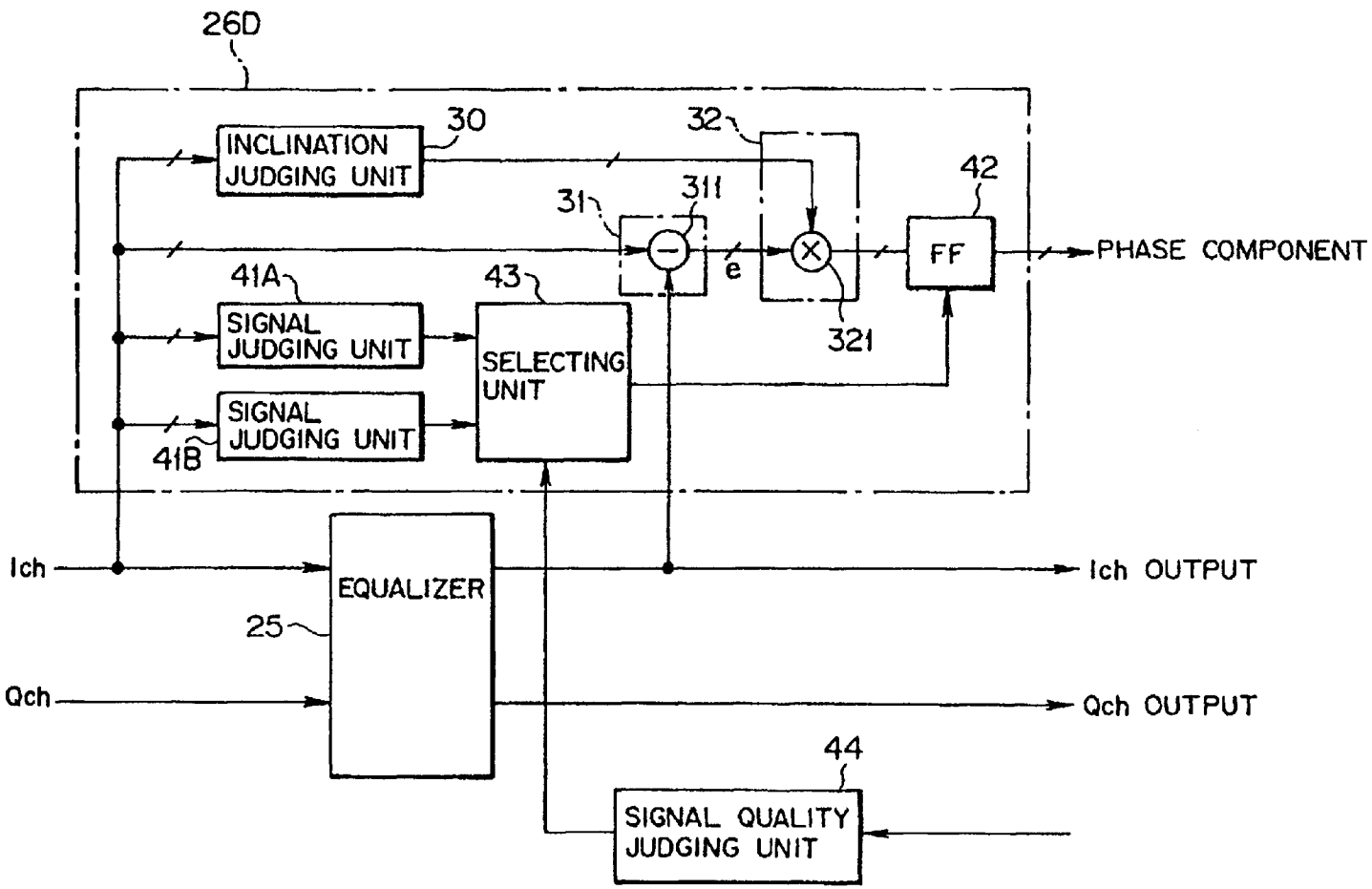
FIG. 23 is a block diagram showing another configuration of a phase component detecting unit according to the first embodiment.

FIG. 23 is a block diagram illustrating another configuration of the phase component detecting unit 26 described with FIGS. 7 and 8. The phase component detecting unit 26D shown in FIG. 23 includes signal judging units 41A and 41B, a flip-flop (FF) circuit 42, and a signal quality judging unit 44, in addition to the inclination judging unit 30, the error detecting unit 31 acting as the subtracter 311, and the clock phase calculating unit 32 acting as the multiplier 321. A selecting unit 43 is arranged between the signal judging units 41A and 41B and the flip-flop (FF) circuit 42.

Each of the signal judging units 41A and 41B corresponds to the signal judging unit 41 shown in FIG. 21. However, in this case, each of the signal judging units 41A and 41B judges whether the signal point of the Ich signal input to the inclination judging unit 30 and the error detecting unit 31 is at a different specific position of the eye pattern (or judges plural kinds of specific signals). The selecting unit 43 selects the decision result issued when it is judged that the signal point of the Ich signal to each of the signal judging units 41A and 41B is at a specific position, according to the control signal from the signal quality judging unit 44 (to be described later) and then outputs it to the FF circuit 42.

When receiving the output from the selecting unit 43, the FF circuit (gating unit) 42 outputs the phase shift (phase component) of an A/D conversion clock (signal identification clock) obtained by the clock phase calculating unit (multiplier 321) 32. The signal quality judging unit 44 judges the signal quality status of a demodulated signal and then supplies the decision result as a control signal for the selecting unit 43 to the selecting unit 43.

As described above, in the phase component detecting unit 26D, the selecting unit 43 can selectively output the output of the signal judging unit 41A or 41B according to the signal quality status from the signal quality judging unit 44. In other words, since the specific position can be changed on the eye pattern of a signal point to be judged according to the signal quality status of the demodulated signal, the phase shift of an A/D conversion clock can be detected accurately without depending on the signal quality of an Ich signal (or a Qch signal) used to detect the phase shift of an A/D conversion clock.

Figure 24:
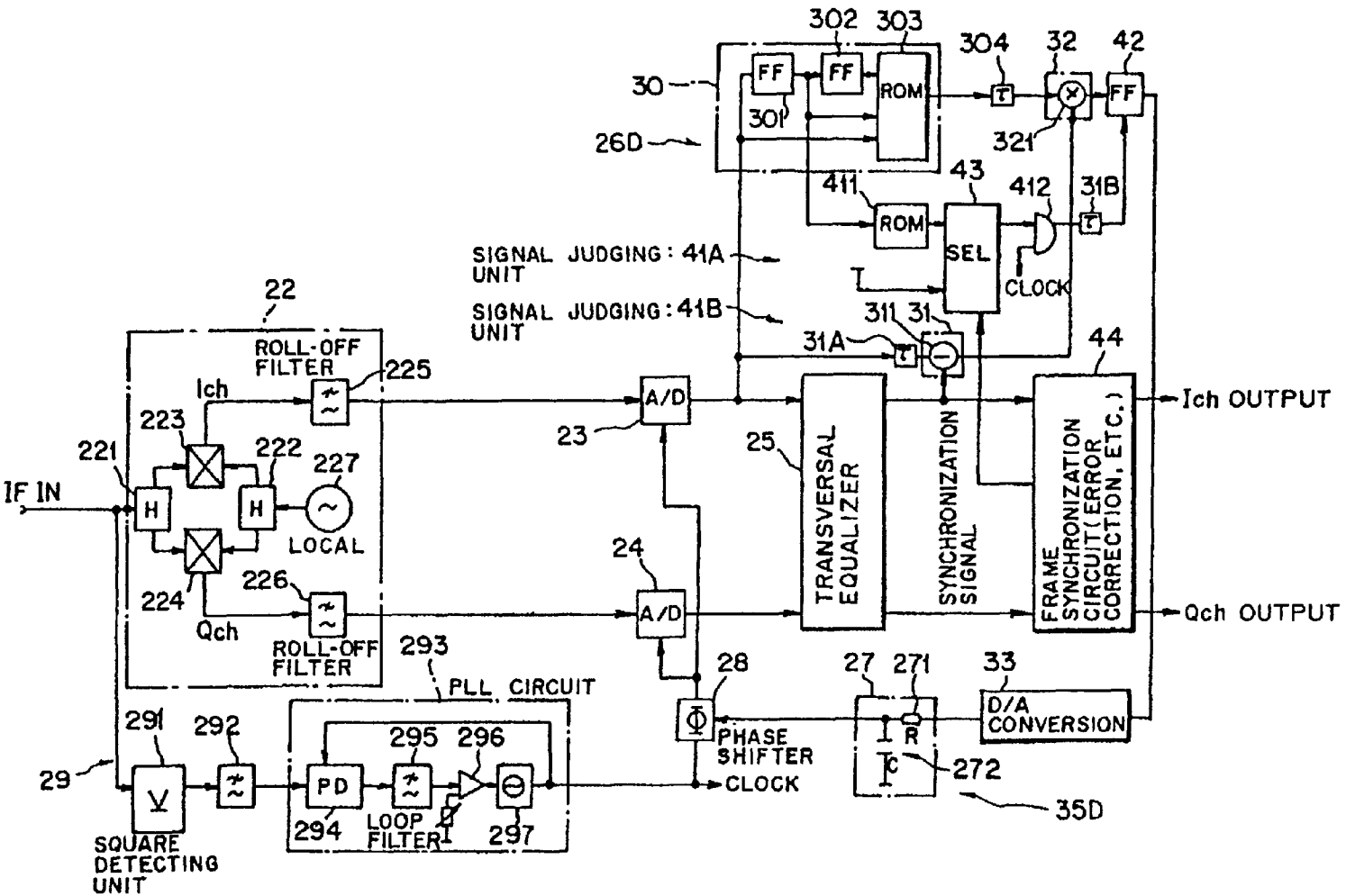
FIG. 24 is a block diagram showing the detail configuration each of a clock regenerating circuit and the peripheral circuits according to the first embodiment.

FIG. 24 is a block diagram illustrating the detailed configuration of the clock regenerating circuit 35D and the peripheral circuits to which the above-mentioned phase component detecting unit (clock phase detecting circuit) 26D is applied. The phase component detecting unit 26D, shown in FIG. 24, includes a selector (SEL) acting as the selecting unit 43 and a frame synchronizing circuit acting as the signal quality judging unit 44 that performs an error correction to a post equalization signal from the transversal equalizer 25. In FIG. 24, it should be noted that like numerals represent like elements shown in FIG. 9.

Figure 26:
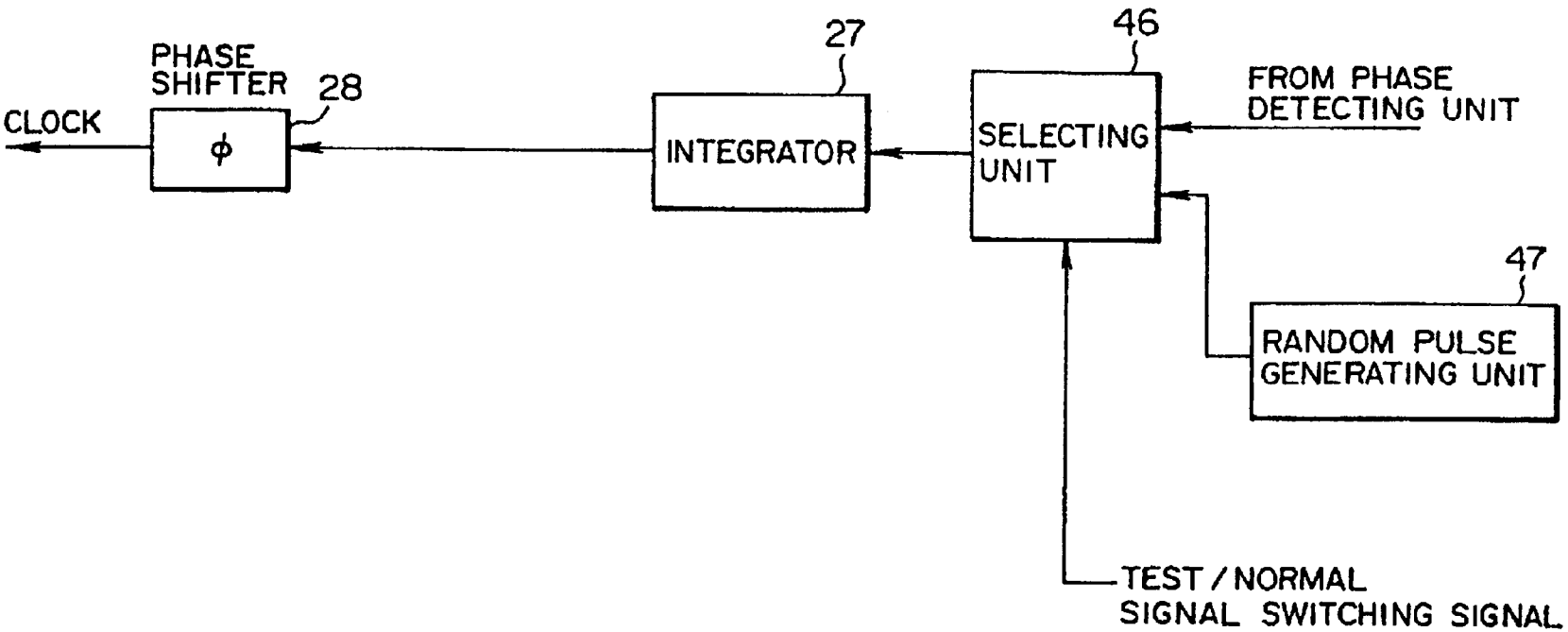
FIG. 26 is a block diagram showing another configuration of a clock regenerating circuit according to the first embodiment.

The clock regenerating circuit 35 (or 35A) shown in FIG. 7 (or FIG. 12) may include a random pulse generating unit 47 and a selecting unit 46 which produces its output to the phase shifter 28 via the integrator 27 and the amplifier 45, as shown in FIG. 26.

The random pulse generating unit (test signal generating unit) 47 generates random pulses to test the clock regenerating circuit 35 (or 35A). In this case, the random pulse generating unit 47 generates the pulse of the middle value of a detection result in phase shift of an A/D conversion clock of the phase component detecting unit 26 (or 26A or 26B).

The selecting unit 46 outputs selectively the output of the phase component detecting unit 26 (or 26A or 26B) or the output of the random pulse generating unit 47, in response to a test/normal switching signal. The integrator 27 corresponds to that described with FIG. 7 (or FIG. 12) and averages the output of the selecting unit 46. The amplifier 45 amplifies the output of the integrator 27 to a desired signal level.

Figure 27:
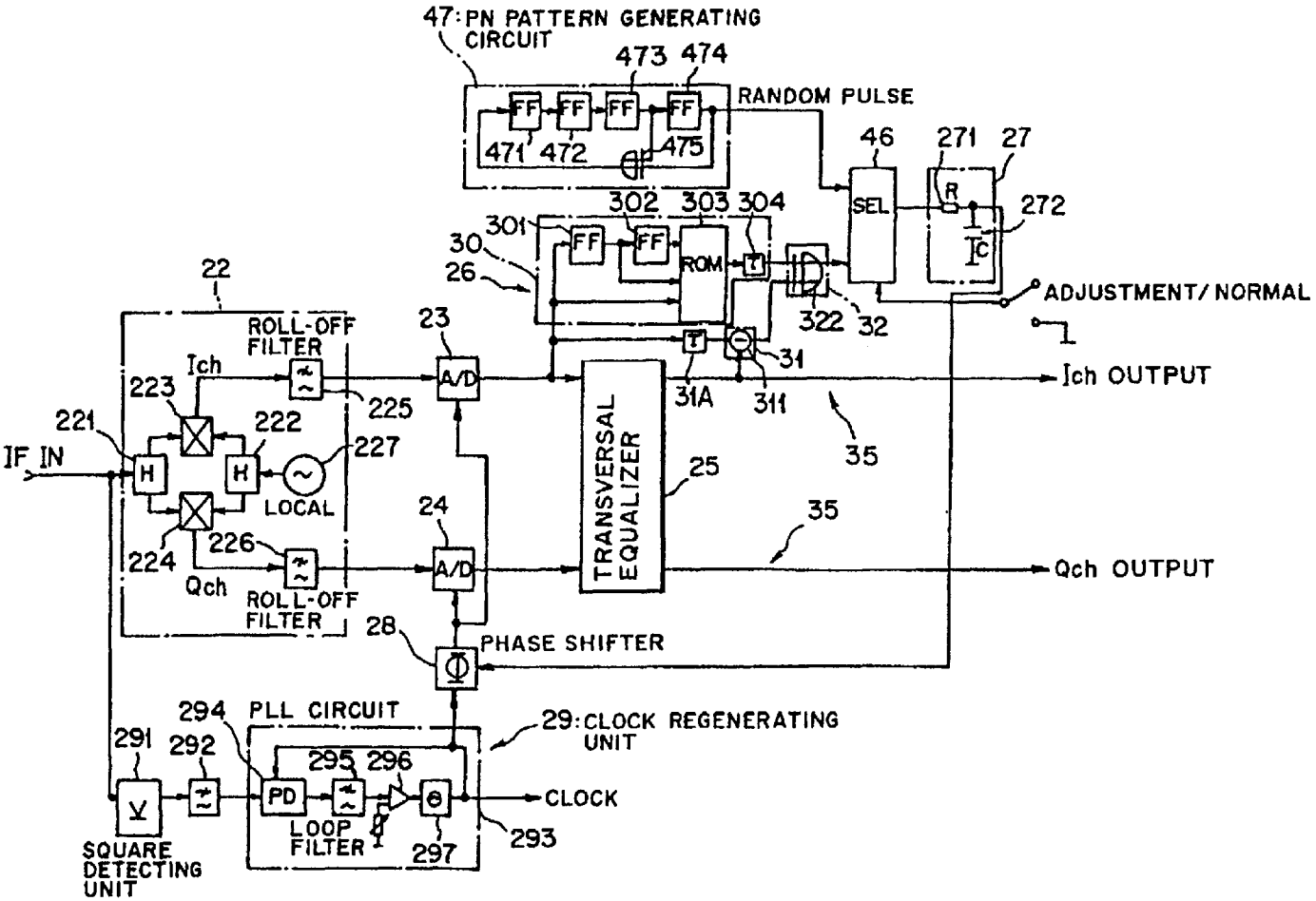
FIG. 27 is a block diagram showing the detail configuration of each of a clock regenerating circuit and the peripheral circuits according to the first embodiment.

In concrete, the random pulse generating unit 47, as shown in FIG. 27, consists as a PN pattern generating circuit formed of four flip-flop (FF) circuits 471 to 474 and an EX-OR gate 475. The selecting unit 46 is formed as a selector (SEL). In FIG. 26 and FIG. 9 or 13, the same numerals represent the same elements.

In such a configuration, when the SEL 46 receives an adjustment (or test) signal to adjust (test) the clock regenerating circuit 35, it selects a random pulse (test signal) generated by the PN pattern generating circuit 47, instead of the phase shift (phase component) of an A/D conversion clock to the A/D converters 23 and 24 detected by the phase component detecting unit 26 shown in FIGS. 7 to 9. Then the integrator 27 averages the random pulse and then sends the result as a phase adjustment and control signal for the phase shifter 28 to the phase shifter 28.

Hence the phase shifter 28 can test and adjust very easily the phase shift of an A/D conversion clock to the A/D converters 23 and 24.

Figure 28:
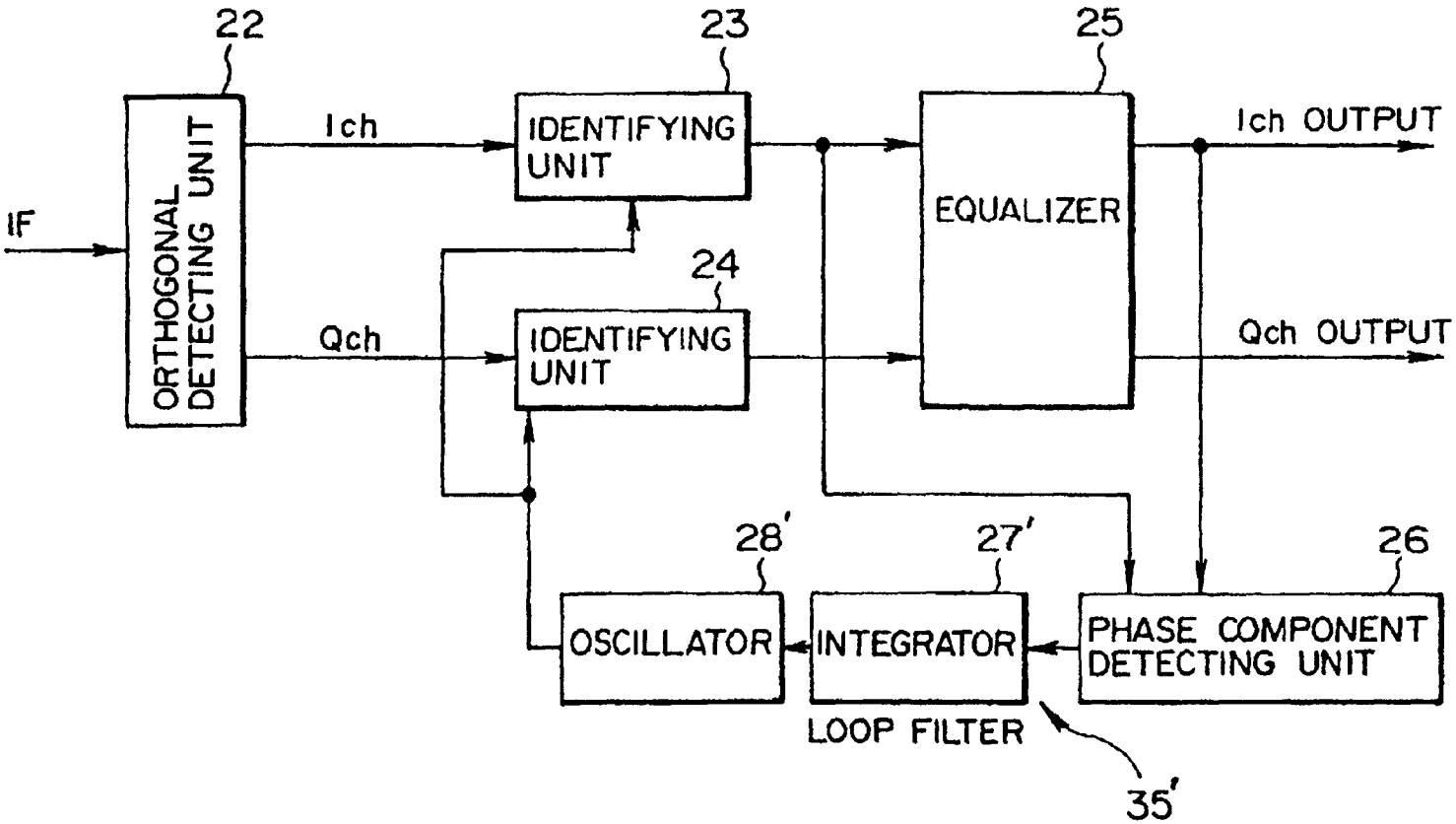
FIG. 28 is a block diagram showing the configuration of each of a clock phase detecting circuit and a clock regenerating circuit according to the second embodiment of the present invention.
Figure 29:
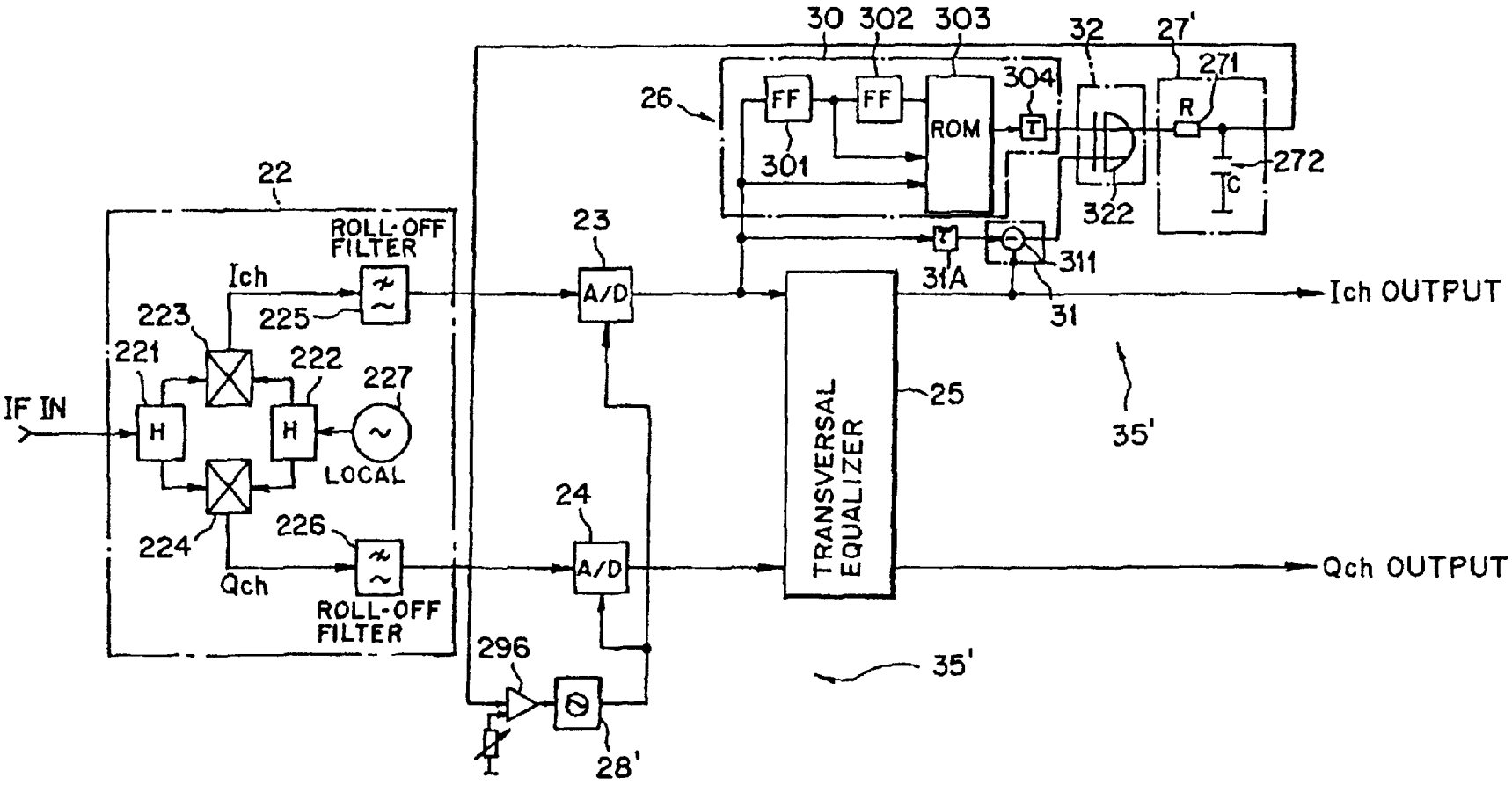
FIG. 29 is a block diagram showing the detail configuration of a clock regenerating circuit and the peripheral circuits according to the second embodiment.

(c) Second Embodiment of the Present Invention:

FIG. 28 is a block diagram showing the configuration of each of the clock phase detecting circuit and the clock regenerating circuit arranged in multiplex radio equipment according to the second embodiment. Referring to FIG. 29, numeral 22 represents an orthogonal detecting unit that detects an IF signal obtained by subjecting it to a frequency conversion, the IF signal being received by the multiplex radio equipment similar to that shown in the first embodiment, and then produces two kinds of signals (an I-channel (Ich) signal and a Q-channel (Qch) signal) with phases different by 90° from each other; 23 and 24 represent an identifying unit that identify the output (a signal obtained by demodulating a multilevel orthogonal modulated signal) of the orthogonal detecting unit 22 at a predetermined identification level; and 25 represents an equalizer (equalizing circuit) that subjects the outputs (a signal obtained by demodulating a multilevel orthogonal modulated signal) of the identifying units 23 and 24 to an equalizing process.

In this embodiment, as shown in FIG. 29, the orthogonal detecting unit 22 consists of hybrid circuits (H) 221 and 222, the phase detectors 223 and 224, roll-off filters 225 and 226, and a local oscillating unit 227. The identifying units 23 and 24 are formed of two A/D converters corresponding to two kinds (plural) of signals (an Ich signal and a Qch signal) obtained by demodulating a multilevel orthogonal modulation signal. The equalizer 25 is formed of a transversal equalizer. The above-mentioned elements have been explained in detail in the first embodiment by referring to FIG. 9. Hence the duplicate explanation will be omitted here.

In FIG. 28, numeral 26 represents a phase component detecting unit (clock phase detecting unit (circuit)) similar to that shown in FIG. 11. In this case, as shown in FIG. 29, the phase component detecting unit 26 consists of the inclination judging unit 30 formed of flip-flop (FF) circuits 301 and 302, a ROM 303, and a time adjusting unit ($\tau$) 304, an error detecting unit 31 formed of the subtracter 311, and a clock phase calculating unit 32 formed of the EX-OR gate 32.

Numerals 27' and 28" represent each integrator and oscillator forming the clock regenerating circuit 35' together with the phase component detecting unit 26. In this embodiment, the phase component detecting unit 26, the integrator 27' and the oscillating unit 28' are used in common to the A/D converters 23 and 24.

The integrator (loop filter unit) 27' integrates the output of the phase component detecting unit 26. In this case, like the integrator shown in FIG. 9, the integrator 27' is formed of a resistor (R) 271 and a capacitor (C) 272. The resistor 271 and the capacitor 272 integrates the phase shift (phase component) of an A/D conversion clock detected by the phase component detecting unit 26.

Furthermore, the oscillating unit (oscillating unit) 28' generates an A/D conversion clock (signal identification clock) for the A/D converters 23 and 24 to the A/D converters 23 and 24 in response to the output as a control input from the integrator 27'. Numeral 296 represents an amplifier that amplifies information regarding the phase shift of an A/D conversion clock for the A/D converters 23 and 24 to be detected by the phase component detecting unit 26 to a predetermined signal level.

In the clock regenerating circuit 35' having the above-mentioned configuration, the phase component detecting unit 26 detects the phase shift of an A/D conversion clock based on the input signal and the output signal of the transversal equalizer 25 described in the first embodiment. Then the integrator 27' integrates the phase shift information and the amplifier 296 amplifies the result to a predetermined signal level. Then the resultant digital signal is output to the oscillating unit 28' without any change.

The oscillating unit 28' receives the phase shift information as a control input and then adjusts automatically the phase shift of an A/D conversion clock to be sent to the A/D converters 23 and 24, thus producing an A/D conversion clock to the A/D converters 23 and 24.

As described in the first embodiment, without converting information regarding the phase shift of an A/D conversion clock detected by the phase component detecting unit 26 from a digital signal form to an analog signal form and adjusting the phase shift of an A/D conversion clock regenerated based on the signal to be detected by the orthogonal detecting unit 22 using the analog signal, the clock regenerating circuit 35', as shown in FIG. 29, outputs information regarding the phase shift of an A/D conversion clock as a control input in a digital signal form to the oscillating unit 28', and then adjusts the A/D conversion clock using the digital signal.

Therefore, although the clock regenerating unit 29 and the phase shifter 28 are not arranged like the first embodiment, the very-simplified configuration can adjust automatically the phase shift of an A/D conversion clock to be sent to the A/D converters 23 and 24 so that the phase of the A/D conversion clock can be agreed to the optimum phase at which the opening of the eye pattern is opened maximumly. Thus the accuracy of the A/D conversion process by the A/D converters 23 and 24 can be improved greatly.

Figure 30:
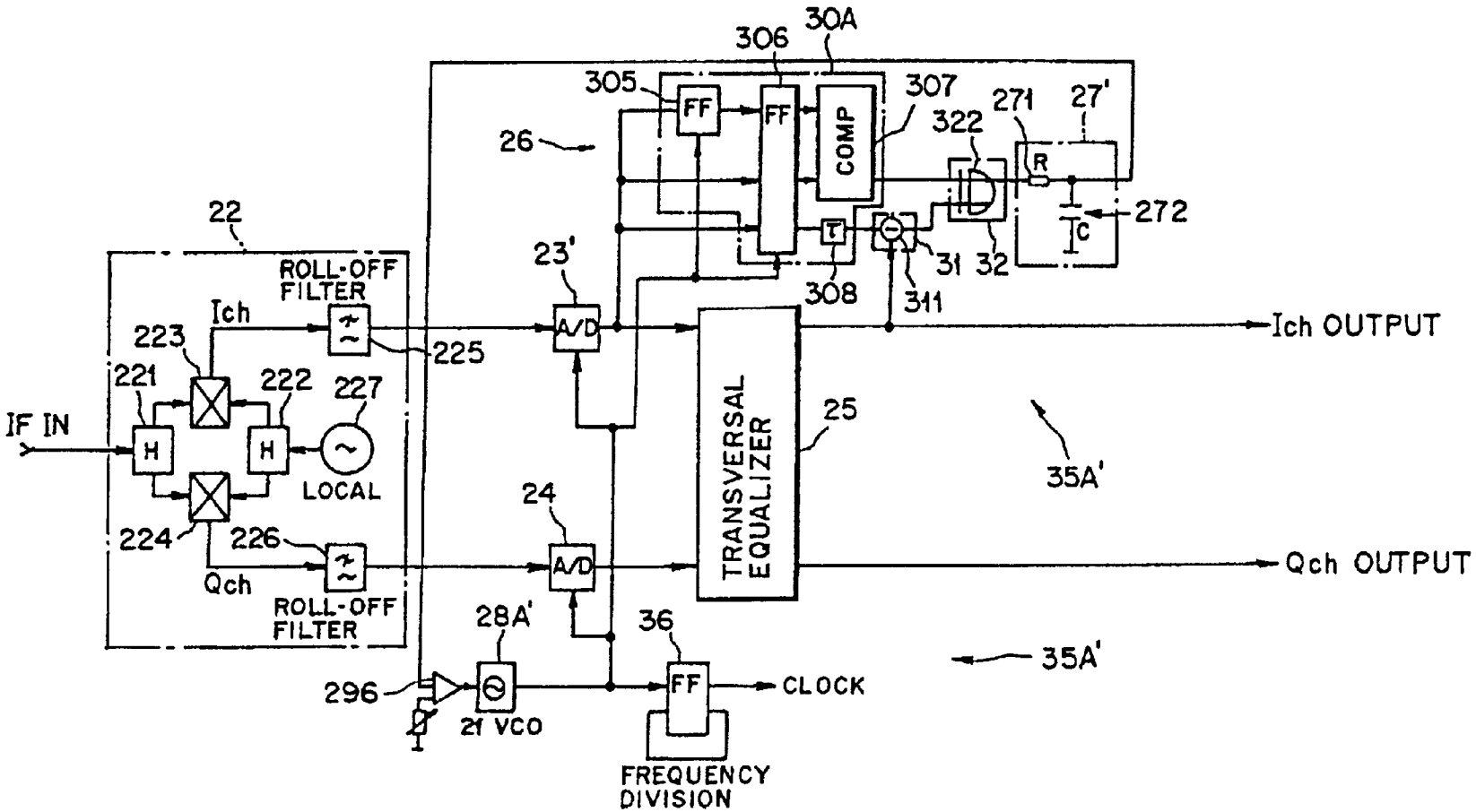
FIG. 30 is a block diagram illustrating the detail configuration of each of a clock regenerating circuit and the peripheral circuits according to the second embodiment.

FIG. 30 is a block diagram illustrating the detailed configuration of the clock regenerating circuit 35A' (the phase component detecting unit 26, the integrator 27', the amplifier 296, and the oscillating unit 28A') in the case where the phase component detecting unit 26 shown in FIG. 29 includes the inclination judging unit 30A in the first embodiment shown in FIG. 14 which samples an Ich signal at intervals of the time "T/2" with two-fold high speed clocks and then detects the inclination of the Ich signal. In this case, the inclination judging unit 30A, as shown in FIG. 15, is formed of the flip-flop (FF) circuits 305 and 306 and the COMP (comparing unit) 307.

The A/D converter 23' is a high speed A/D converter which calculates with two-fold high speed clocks. The oscillating unit 28A' is a high-speed voltage-controlled oscillating unit (VCO) which calculates with two-fold high speed clocks (2f).

In the clock regenerating circuit 35A' with the above-mentioned configuration shown in FIG. 30, the inclination judging unit 30A in the phase component detecting unit 26 shown in FIGS. 14 and 15 samples an Ich signal at intervals of the time "T/2" to detect the inclination of the Ich signal and the error detecting unit (subtracter 311) 31 obtains a signal error of the Ich signal based on the input signal and the output signal of the transversal equalizer 25. Then the clock phase calculating unit (EX-OR gate 322) 32 subjects the inclination of the resultant Ich signal and the signal error to a calculation (exclusive OR calculation) to detect the phase shift (phase component) of an A/D conversion clock.

The phase shift information is integrated by the integrator 271. Then the result is amplified to a predetermined signal level by the amplifier 296 and then sent to the oscillating unit 28A' as it is in a digital signal form. When receiving the phase shift information as a control unit, the oscillating unit 28A' adjusts automatically the phase shift of an A/D conversion clock for the A/D converters 23 and 24, thus outputting the A/D conversion clock to the A/D converters 23 and 24.

Therefore, even if the clock regenerating unit 29 and the phase shifter 28 described in the first embodiment are not arranged, the very-simplified configuration can adjust automatically the phase shift of an A/D conversion clock sent to the A/D converters 23 and 24 and samples an Ich signal at intervals of the time "T/2" with two-fold high-speed clocks, thus detecting the inclination of the Ich signal. Hence the phase shift of an A/D conversion clock can be detected more accurately.

Figure 31:
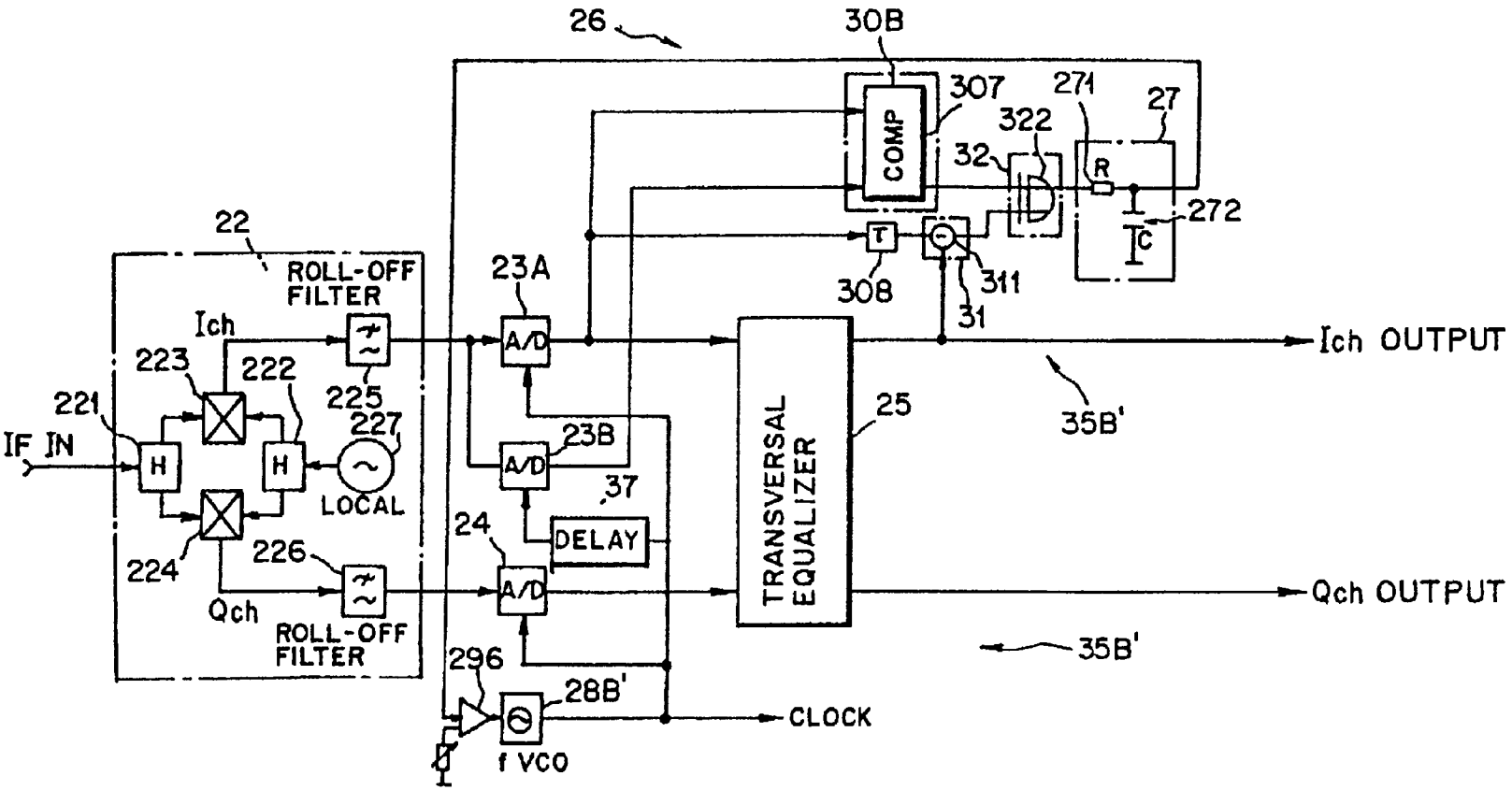
FIG. 31 is a block diagram illustrating the detail configuration of a clock regenerating circuit and the peripheral circuits according to the second embodiment.

FIG. 31 is a block diagram illustrating the detailed configuration of the clock regenerating circuit 35B' in the case where the inclination judging unit 30B with no high-speed A/D converter applied as described with FIGS. 17 and 18 in the first embodiment, instead of the inclination judging unit 30A shown in FIG. 30.

Hence, in this case, the oscillating unit 28B' which calculates with basic clocks is used as an oscillating unit.

In the clock regenerating circuit 35B' with the above-mentioned configuration which does not include the clock regenerating unit 29 and the phase shifter 28 described in the first embodiment, the very-simplified configuration can adjust automatically the phase shift of an A/D conversion clock applied to the A/D conversion converters 23 and 24.

In this case, even if the A/D converter 23' operated with high-speed clocks described in FIG. 30 and the delaying circuit such as a flip-flop (FF) circuit are not used, the Ich signal can be sampled at intervals of the time "T/2" by supplying clocks from the delaying unit 37 to the A/D converters 23A and 23B, the clocks being different in phase by "T/2" (or a different phase shift) from each other, as described with FIGS. 17 and 18. Hence the further-simplified configuration can detect accurately the inclination of the Ich signal so that the phase shift of an A/D conversion clock can be detected more accurately.

Hence the phase shift of an [A/ID] *A/D* conversion clock for the A/D converters 23A, 23B, and 24 can be adjusted automatically and with high accuracy to supply to the identifying units (A/D converters) 23A, 23B, and 24.

Figure 32:
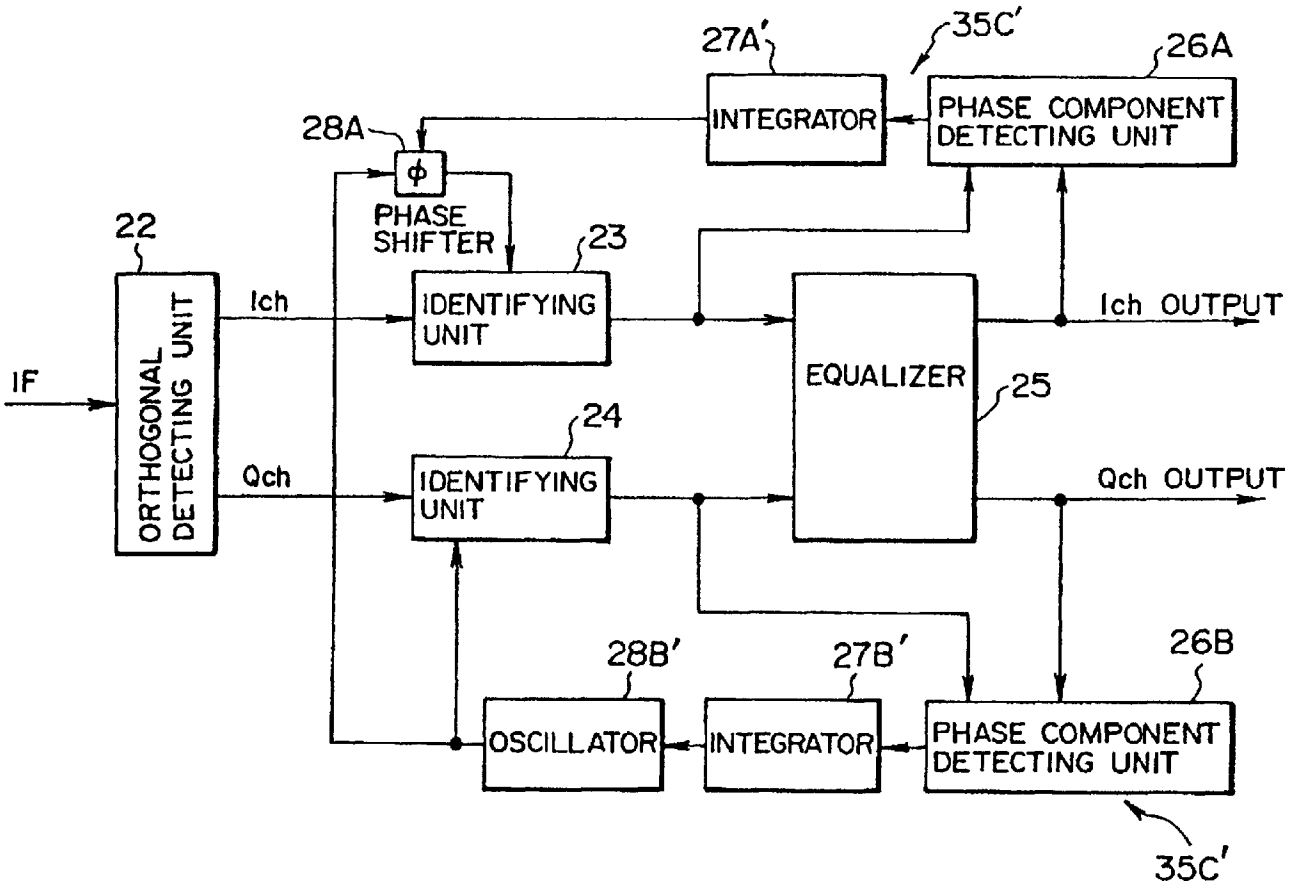
FIG. 32 is a block diagram showing another configuration of a clock regenerating circuit according to the second embodiment.
Figure 33:
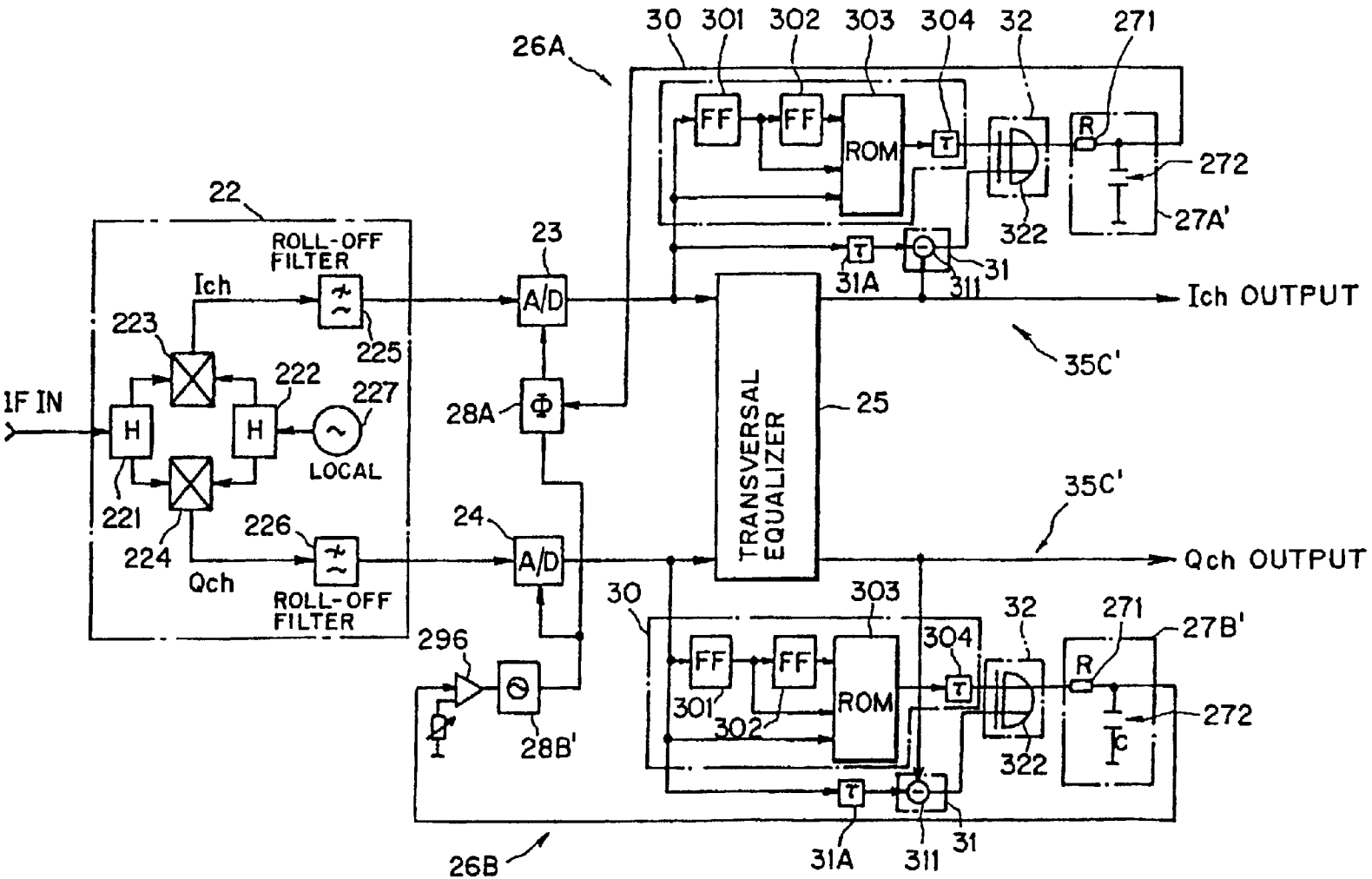
FIG. 33 is a block diagram showing the detail configuration of each of a clock regenerating circuit and the peripheral circuits according to the second embodiment.

FIGS. 32 and 33 are block diagrams each illustrating another configuration of the clock regenerating circuit 35' shown in FIG. 28. In the clock regenerating circuit 35C' shown in FIGS. 32 and 33, as described with FIGS. 12 and 13, the phase component detecting unit (clock phase detecting unit) 26A and the integrator (loop filter unit) 27A' are arranged to the identifying unit 23 while the phase component detecting unit (clock phase detecting unit) 26B and the integrator (loop filter unit) 27B' are arranged to the identifying unit 24. The oscillating unit (oscillating unit) 28B' is used in common to the identifying units (A/D converters) 23 and 24. The identifying unit 23 (part of the identifying units) is connected to the oscillating unit 28B' via the phase shifter 28A, in the manner similar to that shown in FIGS. 7 and 12. The output of the integrator 27A' or 27B' is supplied as a control input to the phase shifter 28A or the oscillating unit 28B'. Numeral 296 represents an amplifier that amplifies information regarding the phase shift of an A/D conversion clock for the A/D converters 23 and 24 detected by the phase component detecting unit 26B to a predetermined signal level.

In brief, the clock regenerating circuit 35C' shown in FIGS. 32 and 33 is formed in a digital circuit configuration by using the oscillating unit 28B' and the amplifier 296 in the clock regenerating unit 29 of the clock regenerating circuit 35A shown in FIGS. 12 and 13.

In the clock regenerating circuit 35C', the phase component detecting unit 26A arranged to the A/D converter 23 detects the phase shift of an A/D conversion clock to the A/D converter 23 and then the integrator 27A' integrates the result. The phase component detecting unit 26B arranged to the A/D converter 24 detects the phase shift of an A/D conversion clock to the A/D converter 24 and then the integrator 27B' integrates the result. The outputs of the integrators 27A' and 27B' are supplied as control inputs to the phase shifter 28A or oscillating unit 28B'.

The oscillating unit 28B' adjusts its oscillation frequency based on the information regarding the phase shift of the A/D conversion clock to adjust automatically the phase shift of the A/D conversion clock. Then the resultant A/D conversion clock is supplied to the A/D converter 24. The phase shifter 28A adjusts the phase of a piece of the phase shift information supplied to the oscillating unit 28B' and then supplies the result to the A/D converter 23.

According to the clock regenerating circuit 35C', the phase shift of an A/D conversion clock for the A/D converter 23 is detected by the phase component detecting unit 26A corresponding to the A/D converter 23 and then supplied as a control signal for the oscillating unit 28B' to the oscillating unit 28B', whereas the phase shift of an A/D conversion clock for the A/D converter 24 is detected by the phase component detecting unit 26B corresponding to the A/D converter 24 and then supplied as a control signal for the oscillating unit 28B' to the oscillating unit 28B'. Hence, the process accuracy of each of the identifying units 23 and 24 can be more improved, compared with the clock regenerating circuit 35 described with FIGS. 28 and 29.

Figure 34:
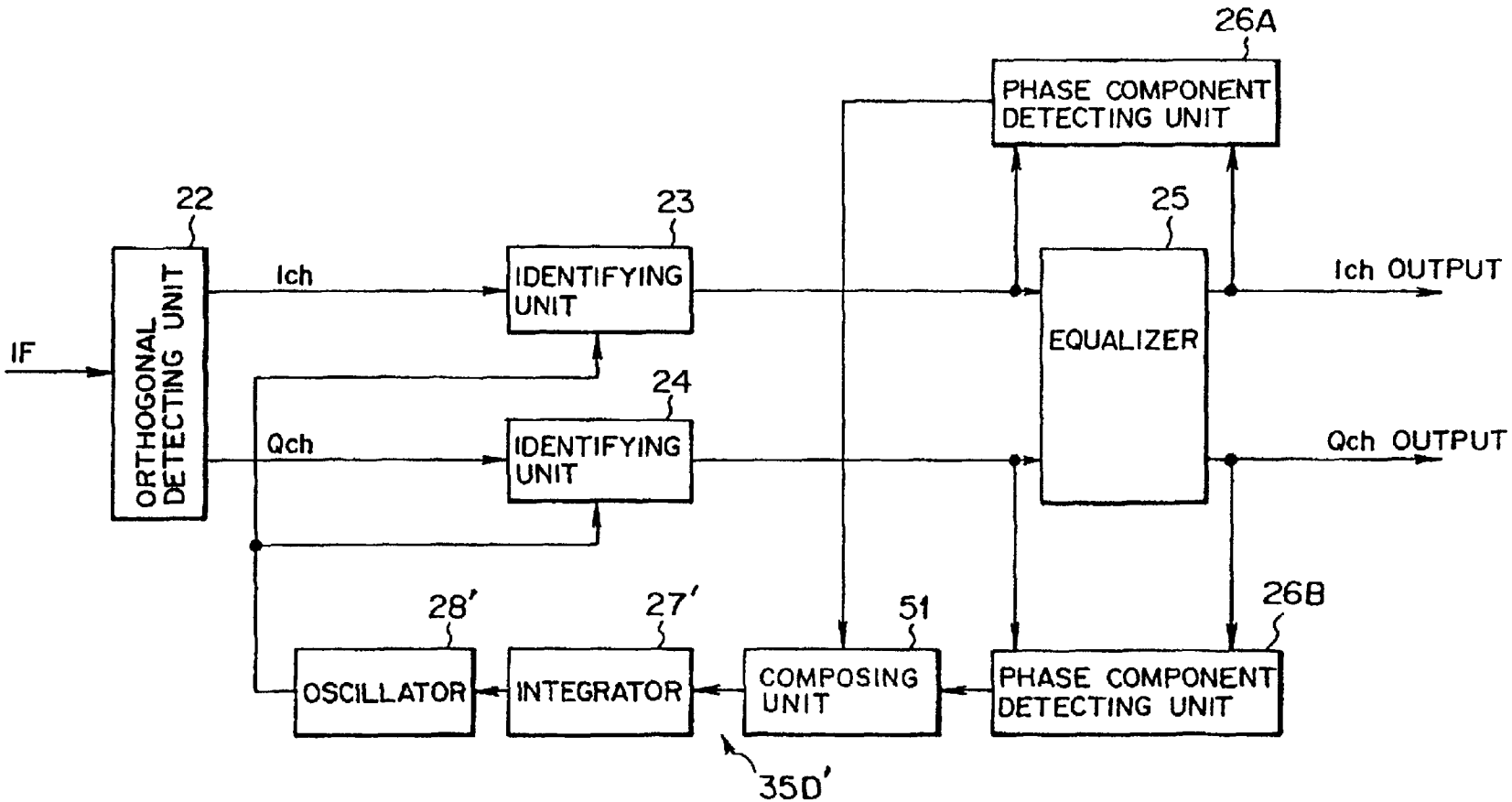
FIG. 34 is a block diagram showing another configuration of a clock regenerating circuit according to the second embodiment.
Figure 35:
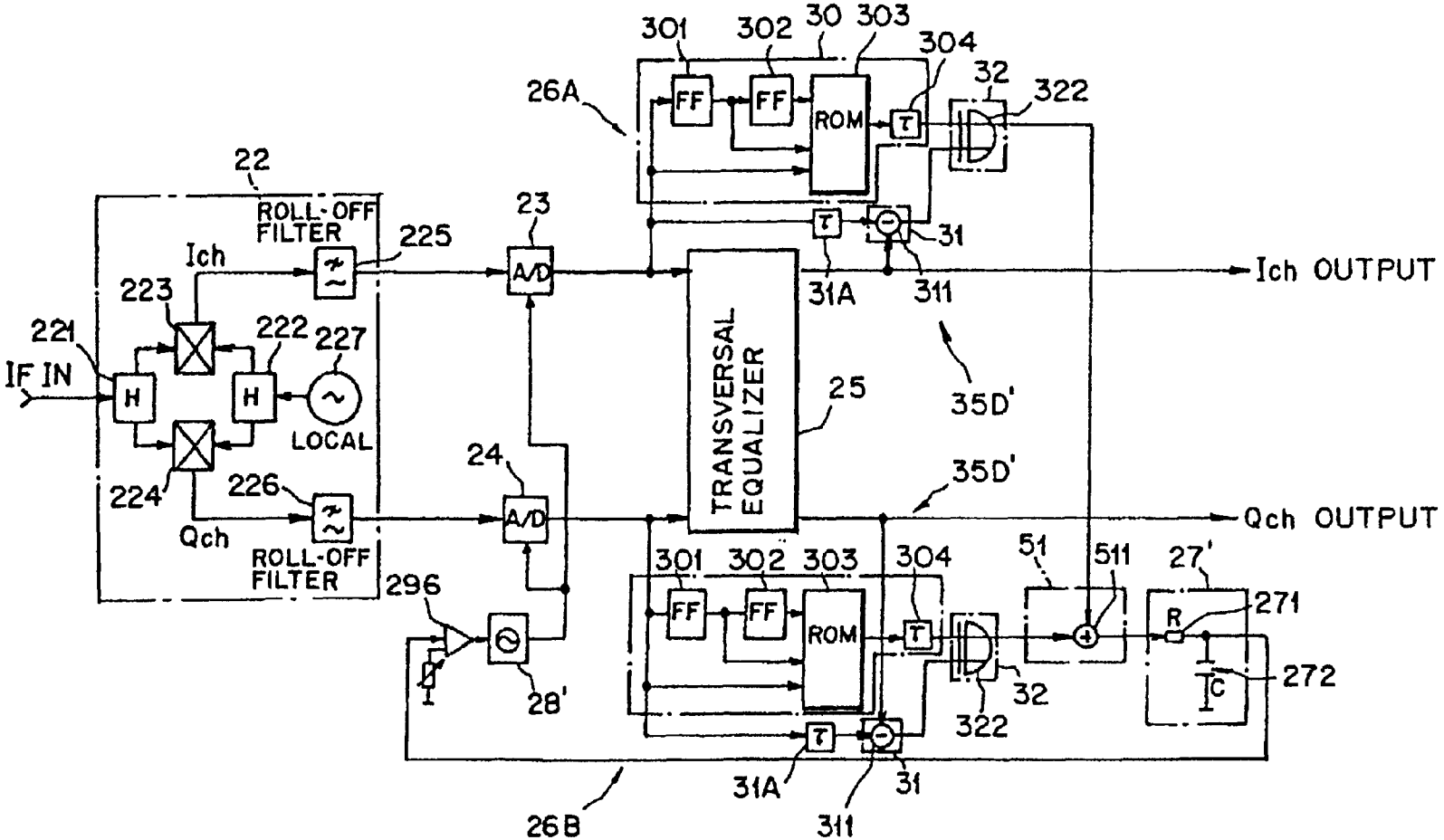
FIG. 35 is a block diagram showing the detail configuration of each of a clock regenerating circuit and the peripheral circuits according to the second embodiment.

FIG. 34 is a block diagram illustrating another configuration of the clock regenerating circuit 35' shown in FIG. 28. FIG. 35 is a block diagram illustrating another configuration of the clock regenerating circuit 35' shown in FIG. 29. The clock regenerating circuit 35D', shown in FIGS. 34 and 35, includes a composing unit 51 formed of a multiplier 511, in addition to the orthogonal detecting unit 22, the identifying units (A/ID converters) 23 and 24, the equalizer (transversal equalizer) 25, phase component detecting units (clock phase detecting units) 26A and 26B, the integrator (loop filter unit) 27', and the oscillating unit 28' shown in FIGS. 28 and 29.

In this case, the phase component detecting unit 26A is arranged corresponding to the A/D converter 23 while the phase component detecting unit 26B is arranged corresponding to the A/D converter 24. The oscillating unit 28' and the integrator 27' are used in common to the identifying units 23 and 24. The composing unit 51 is arranged to compose the output of the phase component detecting unit 26A with the output of the phase component detecting unit 26B. The output of the composing unit 51 is input to the integrator 27'.

In the clock regenerating circuit 35D', the phase component detecting unit 26A corresponding to the A/D converter 23 detects the phase shift of an A/D conversion clock (signal identification clock) for the A/D converter 23 while the phase component detecting unit 26B corresponding to the A/D converter 24 detects the phase shift of an A/D conversion clock (signal identification clock) for the A/D converter 24. The multiplier 511 in the composing unit 51 multiplies the output of the phase component detecting unit 26A by the output of the phase component detecting unit 26B to supply as an input to the integrator 27' and the oscillating unit 28' which are arranged in common to the A/D converters 23 and 24.

Figure 36:
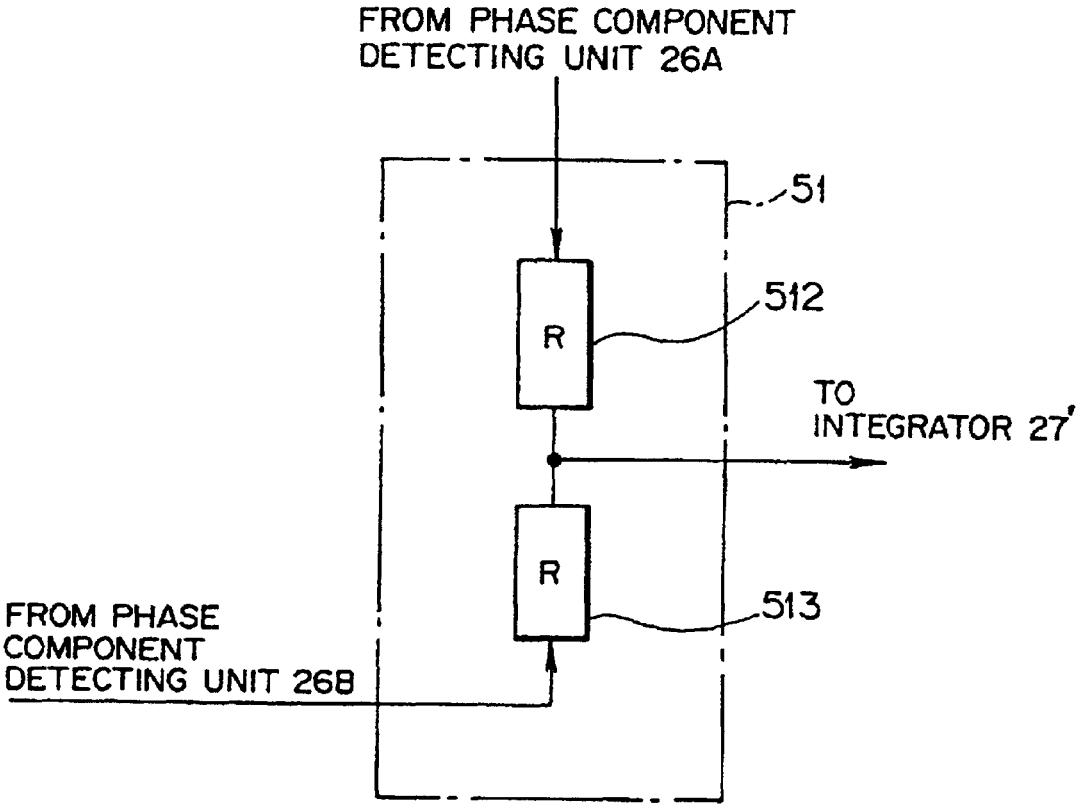
FIG. 36 is a block diagram showing another configuration of a composing unit arranged in a clock regenerating circuit according to the second embodiment.

Hence the phase shift of the A/D conversion clock supplied from the oscillating unit 28' to the A/D converters 23 and 24 can be adjusted automatically and with high accuracy so that the phase of the A/D conversion clock can be agreed more accurately to the phase in which the opening portion of the eye pattern of a signal is opened to its maximum at the optimum A/D conversion timing. The composing unit 51 may be formed in an analog circuit configuration including resistors 512 and 513 as shown in FIG. 36.

Figure 37:
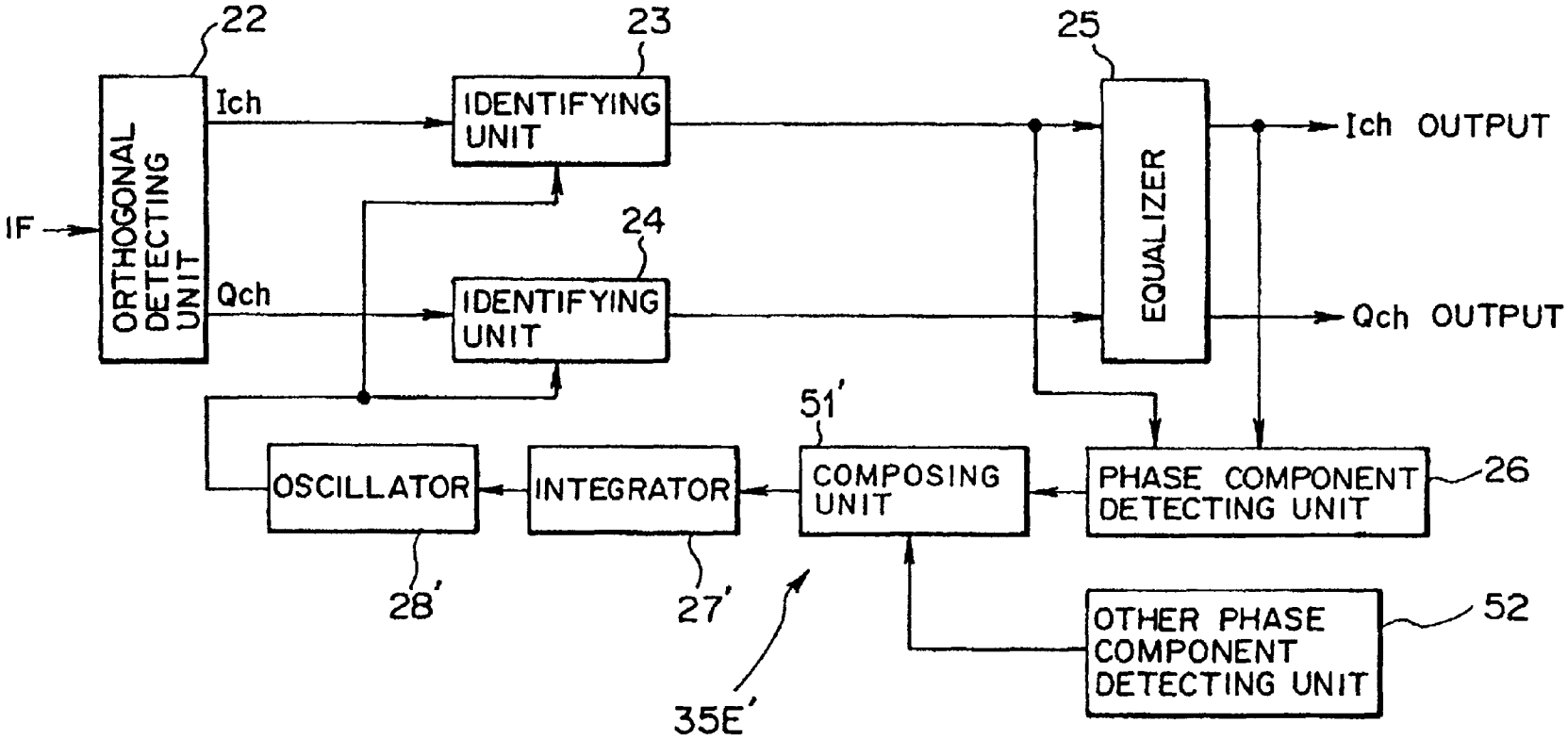
FIG. 37 is a block diagram showing another configuration of a clock regenerating circuit according to the second embodiment.
Figure 38:
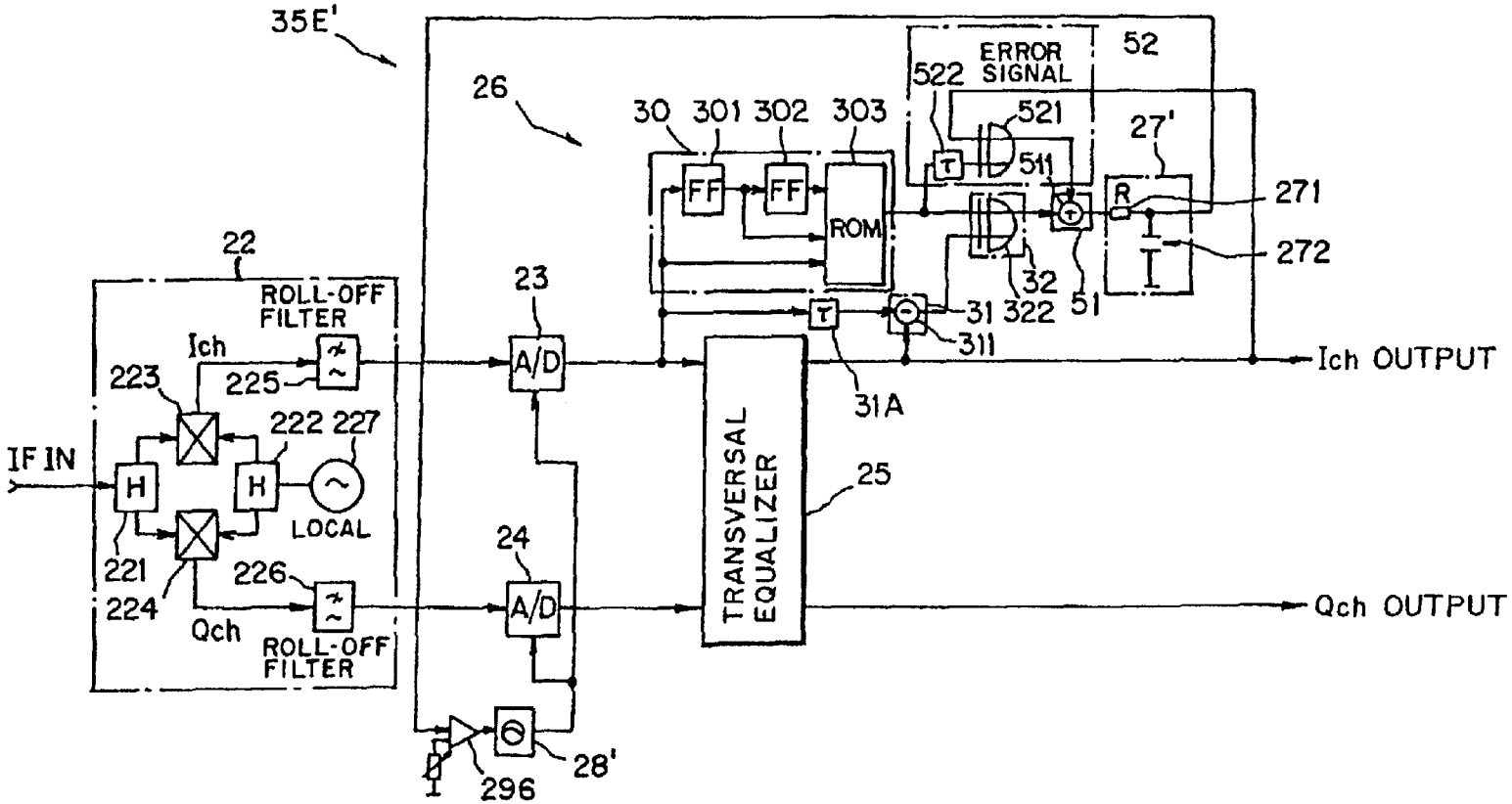
FIG. 38 is a block diagram showing the detail configuration of each of a clock regenerating circuit and the peripheral circuits according to the second embodiment.

FIG. 37 is a block diagram illustrating another configuration of the clock regenerating circuit 35' shown in FIG. 28. FIG. 38 is a block diagram illustrating another configuration of the clock regenerating circuit 35' shown in FIG. 29. In FIGS. 37 and 38, like numerals represent like elements shown in FIGS. 28 and 29.

The clock regenerating circuit 38E' shown in FIGS. 37 and 38 includes another phase component detecting unit 52 and a composing unit 51' in addition to the phase component detecting unit 26 shown in FIGS. 28 and 29.

Another phase component detecting unit (second clock phase detecting unit) 52 detects the phase shift (phase component) of an A/D conversion clock to the identifying units (A/D converters) 23 and 24 in a method different from the phase component detecting unit 26. In this case, as shown in FIG. 38, the phase component detecting unit 52 includes an EX-OR gate 521 that subjects both an error signal of an Ich signal which has been equalized by the transversal equalizer 25 and the inclination of an Ich signal obtained by the inclination judging unit 30 to an exclusive OR operation. Numeral 522 represents a time adjusting unit ($\tau$) that matches the input timing of two kinds of signals to be calculated by the EX-OR gate 521.

The composing unit 51' composes the output of the phase component detecting unit 26 with the output of another phase component detecting unit 52 and then outputs the result to the integrator 27' as an input. In this case, as shown in FIG. 38, the composing unit 51' is formed of the multiplier 511. As shown in FIGS. 37 and 38, the integrator 27' and the oscillating unit 28' are used in common to the A/D converters 23 and 24.

In the clock regenerating circuit 35E', another phase component detecting unit 52 detects the phase shift of an A/D conversion clock to the A/D converters 23 and 24 in a method different from the phase component detecting unit 26. Then the multiplier 511 in the composing unit 51' multiplies (composes) information regarding the phase shift of an A/D conversion clock by information regarding the phase shift of an A/D conversion clock detected by the phase component detecting unit 26 as described in the first embodiment and then supplies as an input the result of the integrator 27'.

In such a manner, the phase shift information (phase component information) of an A/D conversion clock can be output with higher accuracy to the oscillating unit 28' supplying A/D conversion clocks to the A/D converters 23 and 24 via the integrator 27'. Hence the phase shift of an A/D conversion clock can be adjusted automatically and accurately so that the A/D converters 23 and 24 can greatly improve the accuracy of the A/D conversion process.

Figure 39:
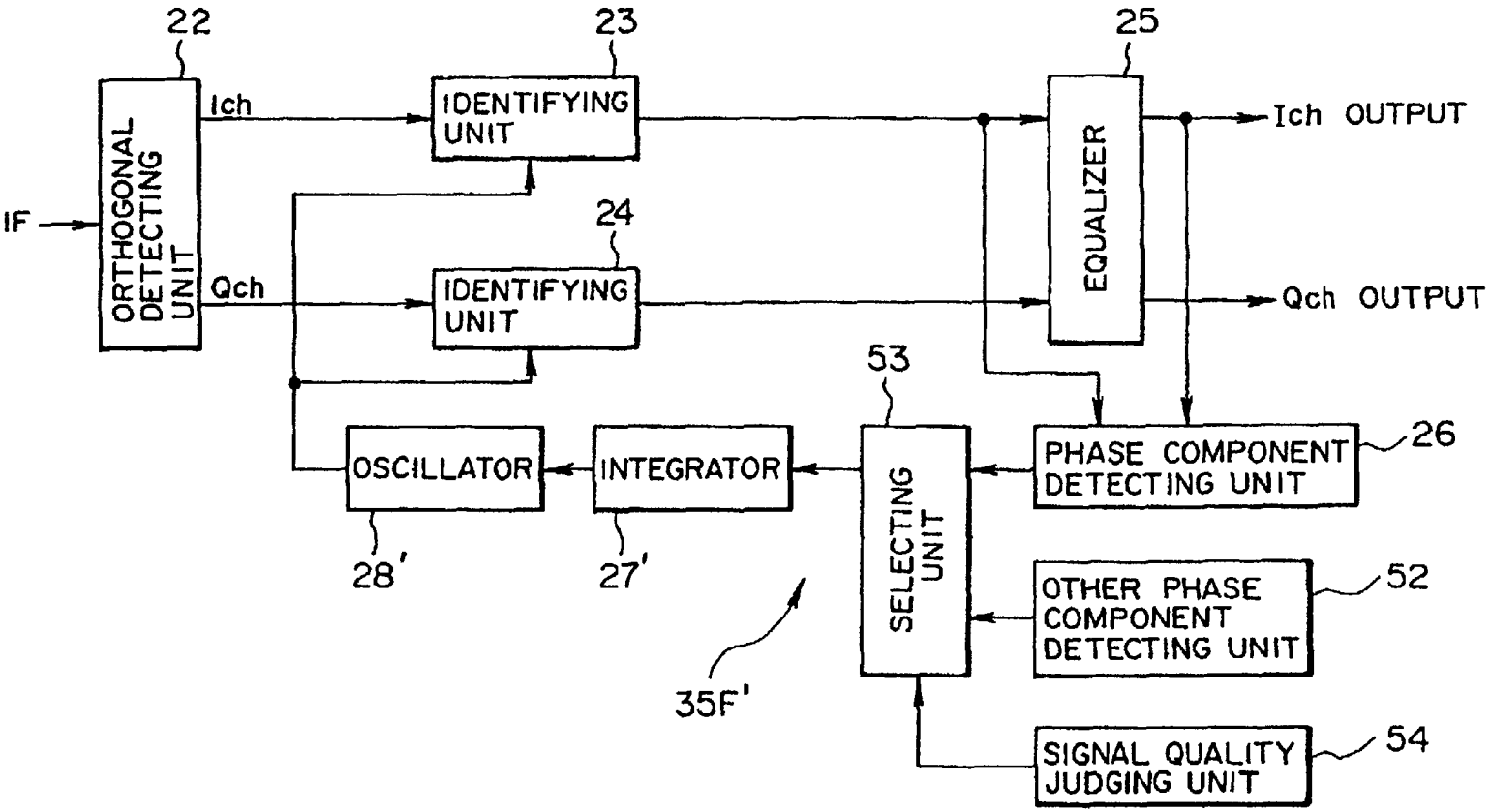
FIG. 39 is a block diagram showing another configuration of a clock regenerating circuit according to the second embodiment.
Figure 40:
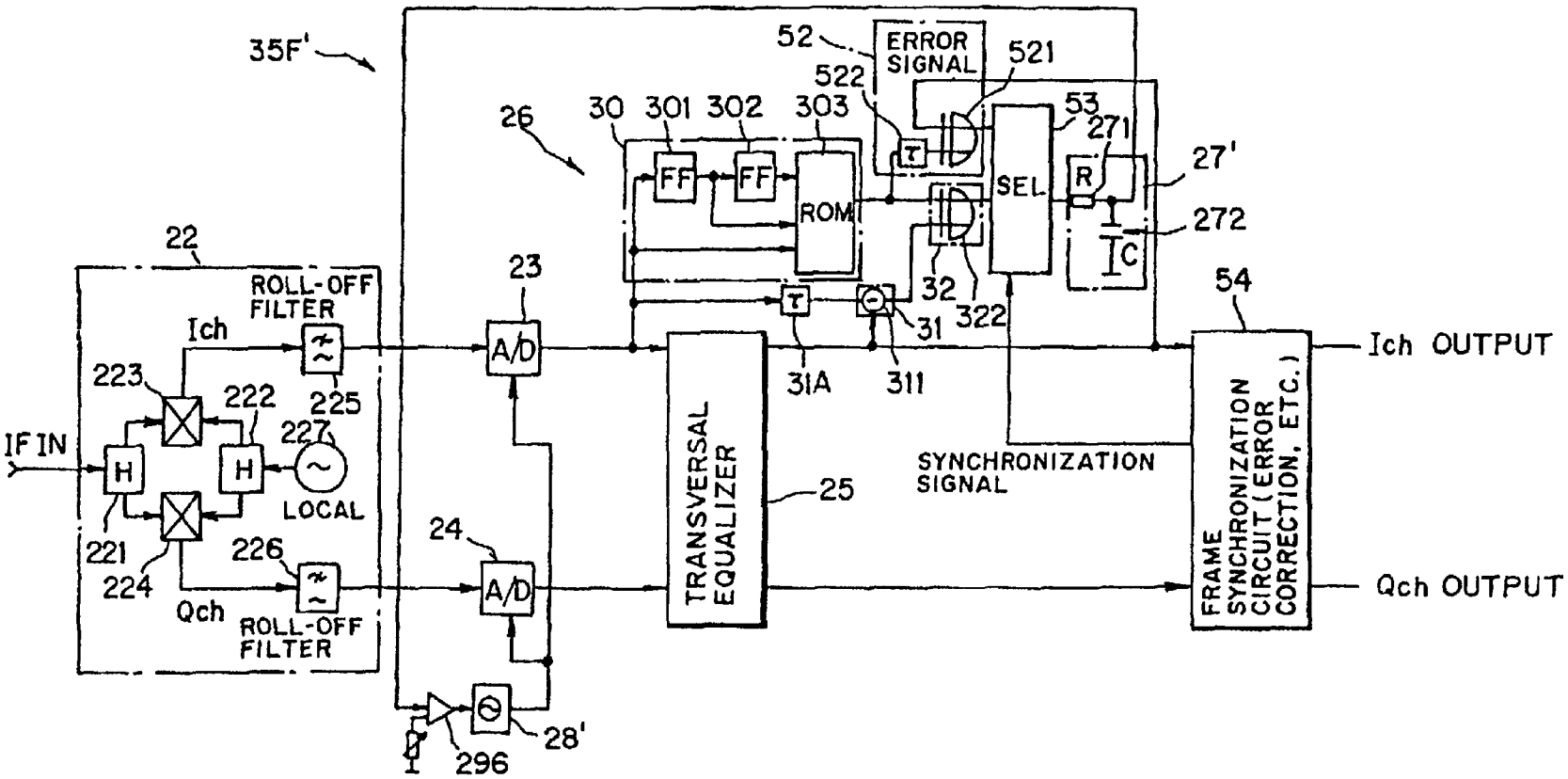
FIG. 40 is a block diagram showing the detail configuration of each of a clock regenerating circuit and the peripheral circuits according to the second embodiment.

FIG. 39 is a block diagram illustrating another configuration of the clock regenerating circuit 35' shown in FIG. 28. FIG. 40 is a block diagram illustrating another configuration of the clock regenerating circuit 35' shown in FIG. 29. In FIGS. 39 and 40, like numerals represent like elements shown in FIGS. 28 and 29.

The clock regenerating circuit 35F' shown in FIGS. 39 and 40 includes another phase component detecting unit 52, a selecting unit 53, and a signal quality judging unit 54, in addition to the orthogonal detecting unit 22, the identifying units (A/D converters) 23 and 24, the equalizer (transversal equalizer) 25, the phase component detecting unit 26, the integrator 27' and the oscillating unit 28', previously described with FIGS. 28 and 29.

Another phase component detecting unit (second clock phase detecting unit) 52 corresponding to that shown in FIGS. 37 and 38 detects the phase shift of an A/D conversion clock in a method different from the phase component detecting unit 26. The phase component detecting unit 52, as shown in FIG. 40, includes an EX-OR gate 521 that subjects the error signal of an Ich signal equalized by the transversal equalizer 25 and the inclination of an Ich signal obtained by the inclination judging unit 30 to an exclusive OR operation.

The selecting unit 53 outputs selectively as an input the output from the phase component detecting unit 26 and the output from another phase component detecting unit 52 to the integrator 27', according to the control signal from the signal quality judging unit 54 (to be described later). In this case, the selecting unit 53 is formed as a selector (SEL) as shown in FIG. 40.

The signal quality judging unit 54 supplies a signal which controls selectively the output signal of the selecting unit 53. In this case, the signal quality judging unit 54, as shown in FIG. 40, is formed as a frame synchronizing circuit that judges a signal quality through an error correction to output a frame synchronization signal as a control signal.

In the clock regenerating circuit 3SF', another phase component detecting unit 52 detects the phase shift of an A/D conversion clock to the A/D converters 23 and 24 in a method different from the phase component detecting unit 26. The SEL 53 supplies selectively, as an input, information regarding the phase shift of an A/D conversion clock obtained by another phase component detecting unit 52 and information regarding the phase shift of an A/D conversion clock detected by the phase component detecting unit 26 described in the first embodiment to the integrator 27' according to the control signal from the frame synchronizing circuit 54.

In this case, information regarding the phase shift of an A/D conversion clock (phase component information) is output with higher accuracy to the oscillating unit 28' supplying A/D conversion clocks to the A/D converters 23 and 24 via the integrator 27'. Thus the phase shift of an A/D conversion clock is adjusted automatically and accurately so that the A/D converters 23 and 24 can greatly improve the accuracy in the A/D conversion process.

Figure 41:
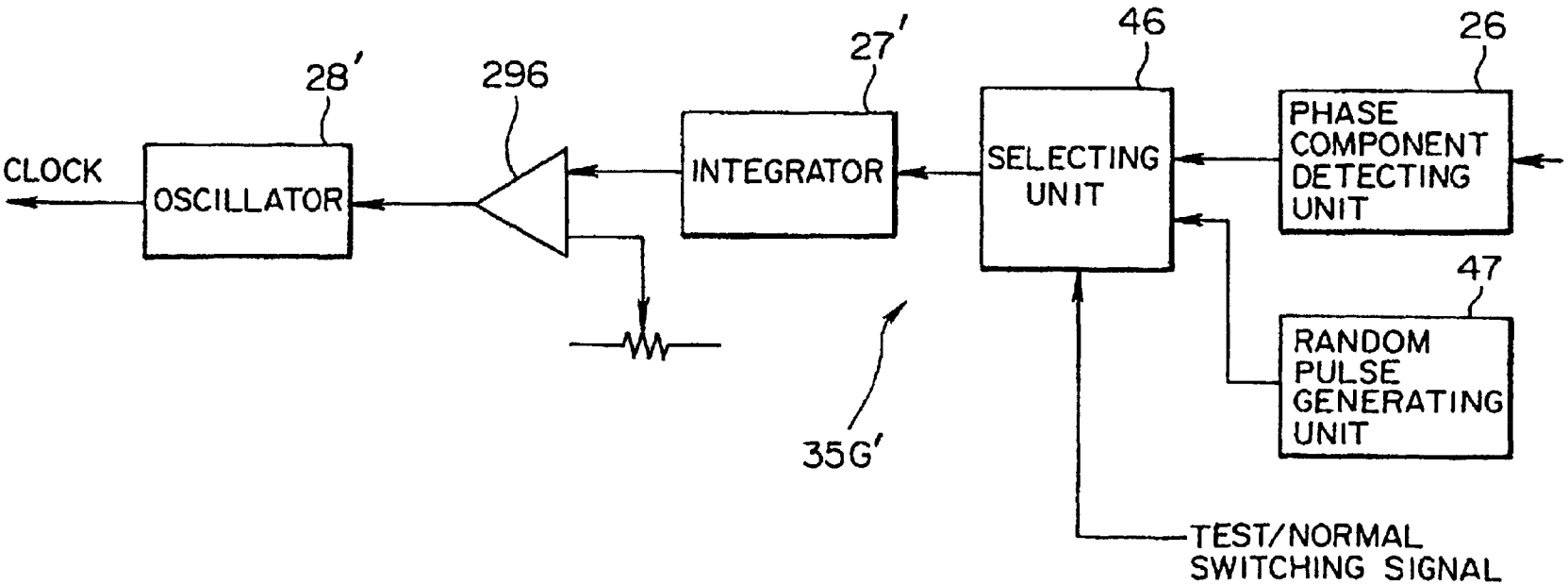
FIG. 41 is a block diagram showing another configuration of a clock regenerating circuit according to the second embodiment.
Figure 42:
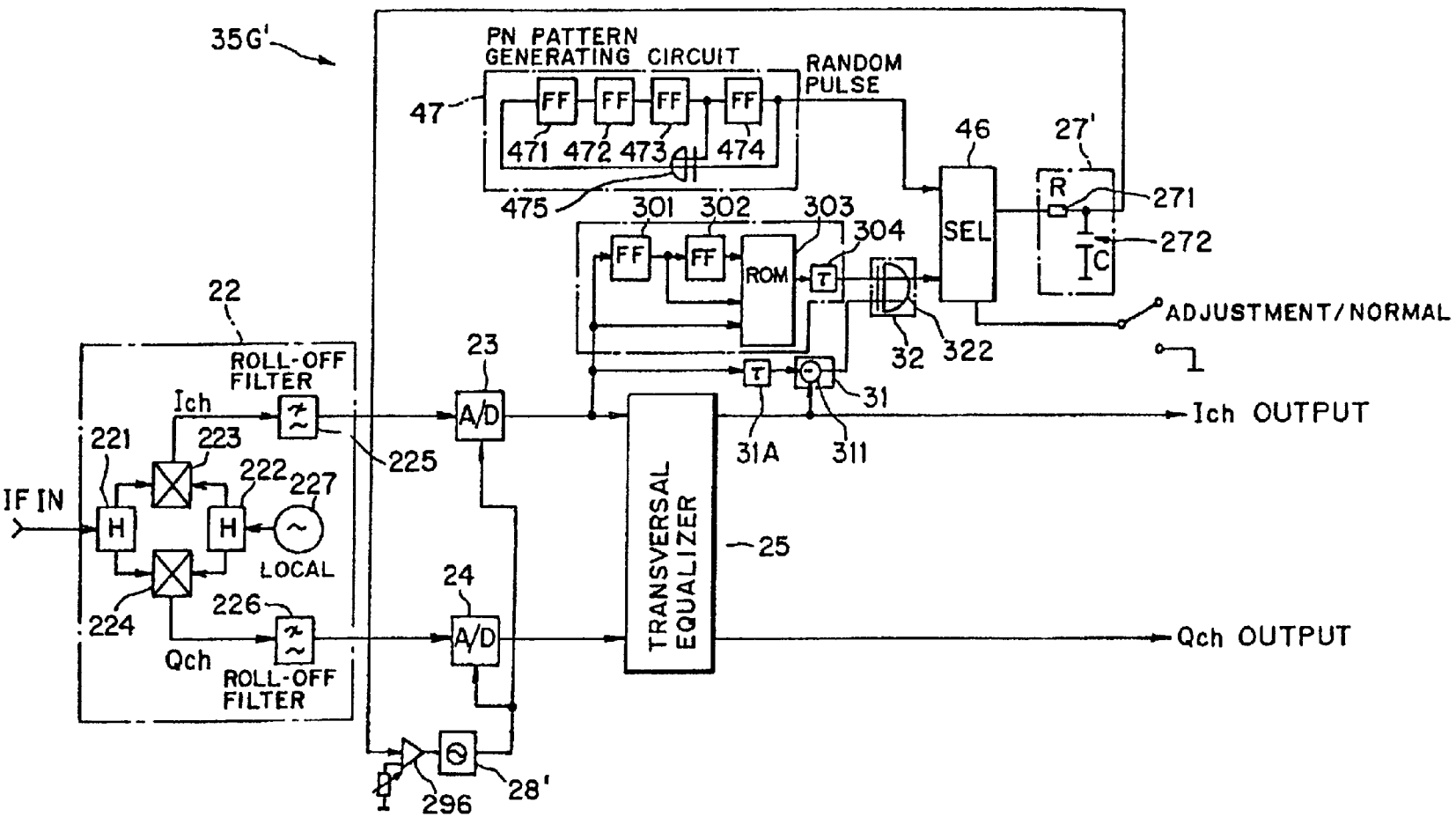
FIG. 42 is a block diagram showing the detail configuration of each of a clock regenerating circuit and the peripheral circuits according to the second embodiment.

FIG. 41 is a block diagram illustrating another configuration of the clock regenerating circuit 35G' shown in FIG. 28. FIG. 42 is a block diagram illustrating another configuration of the clock regenerating circuit 35G' shown in FIG. 29. The clock regenerating circuit 35G' shown in FIGS. 41 and 42 includes a selecting unit 46 and a random pulse generating unit 47, in addition to the phase component detecting unit 26, the oscillating unit 28' and the amplifier 296, and the integrator 27' shown in FIGS. 28 and 29.

The selecting unit 46 corresponds to that in the first embodiment shown in FIGS. 26 and 27. The random pulse generating unit (test signal generating unit) 47 corresponds to that in the first embodiment shown in FIGS. 26 and 27. In this case, the selecting unit 46 formed as a selector (SEL) outputs selectively the output of the phase component detecting unit 26 and the output of the random pulse generating unit 47 in response to the test (adjustment) / normal switching signal to the integrator 27'. The random pulse generating unit 47 is formed of four flip-flop (FF) circuits 471 to 474 and an EX-OR gate 475. The random pulse generating unit 47 creates a chain of pulses at the middle value of the phase shift of an A/D conversion clock detected by the phase component detecting unit 26.

In brief, the clock regenerating circuit 35G' is formed as a digital circuit form, instead of the analog clock regenerating circuit shown in FIGS. 26 and 27.

The clock regenerating circuit 35G' can supply selectively as an input the test signal of the random pulse generating unit 47 and the output of the phase component detecting unit 26 to the integrator (loop filter unit) 27', according to a test (adjustment) / normal switching signal.

Hence, the phase shift of an A/D conversion clock to the A/D converters 23 and 24 can be tested and adjusted very easily.

Figure 43:
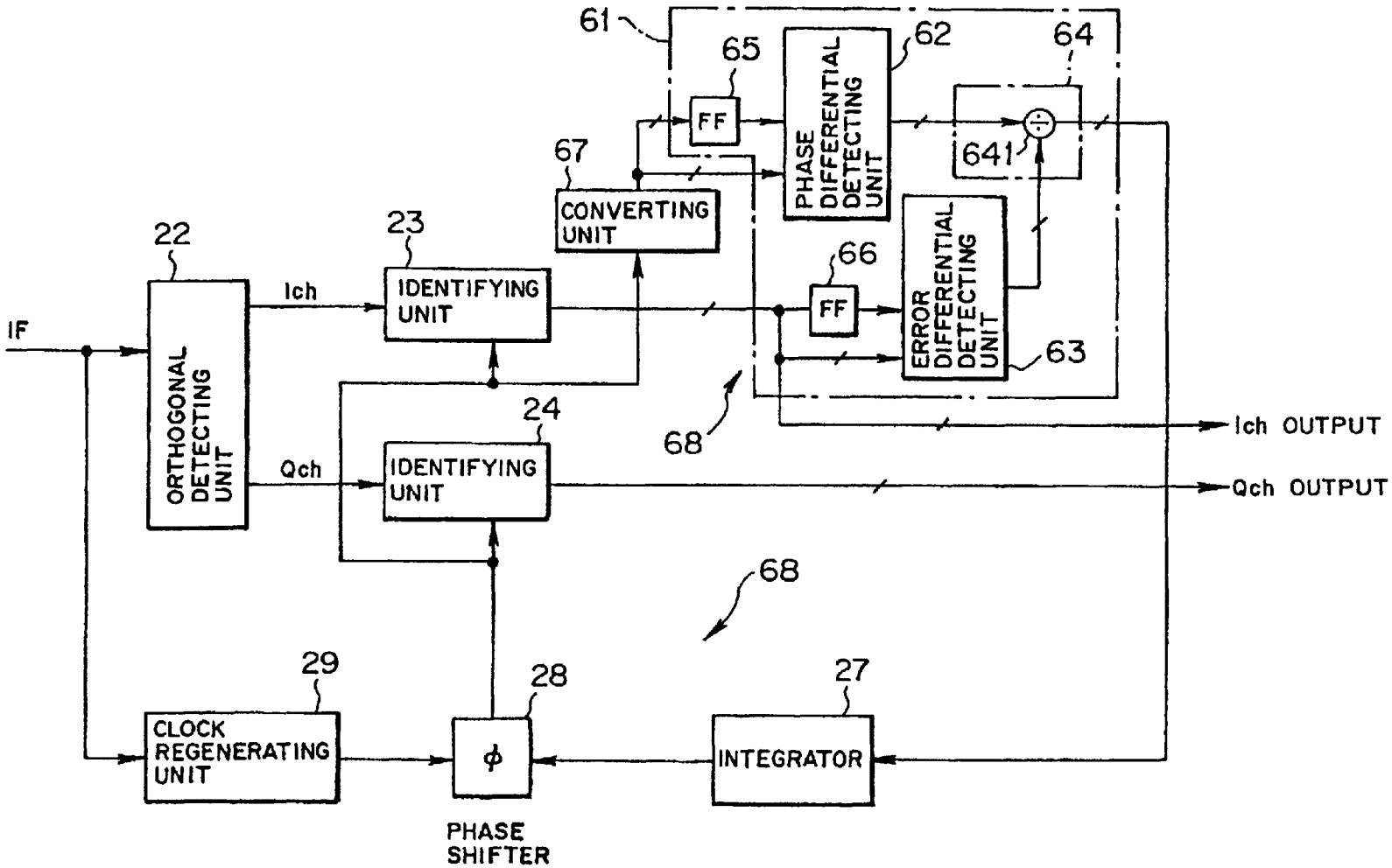
FIG. 43 is a block diagram showing the configuration of each of a clock phase detecting circuit and a clock regenerating circuit according to the third embodiment of the present invention.

(d) Third Embodiment of the Present Invention:

FIG. 43 is a block diagram illustrating the configuration of each of the clock phase detecting circuit and the clock regenerating circuit arranged in multiplex radio equipment shown in the third embodiment according to the present invention. Referring to FIG. 43, numeral 22 represents an orthogonal detecting unit; 23 and 24 represent identifying units; 27 represents an integrator; 28 represents a phase shifter; 29 represents a clock regenerating unit; and 61 represents a phase component detecting unit. In this embodiment, the clock regenerating circuit 68 is basically formed of the phase component detecting unit 61, the integrator 27, the phase shifter 28, and the clock regenerating unit 29.

The orthogonal detecting unit 22, the identifying units 23 and 24, the integrator 27, the phase shifter 28, and the clock regenerating unit 29 correspond respectively to those with the same numerals shown in the first embodiment. The orthogonal detecting unit 22 detects an IF band signal and outputs two kinds of signals including an Ich signal and a Qch signal different in phase by 90° (perpendicular to) from each other. In this embodiment, each of the identifying units 23 and 24 formed as an A/D converter (to be described later) A/D-converts (identifies) the output of the orthogonal detecting unit 22 (or a signal obtained by demodulating a multilevel orthogonal modulation signal) at a predetermined level.

Figure 44:
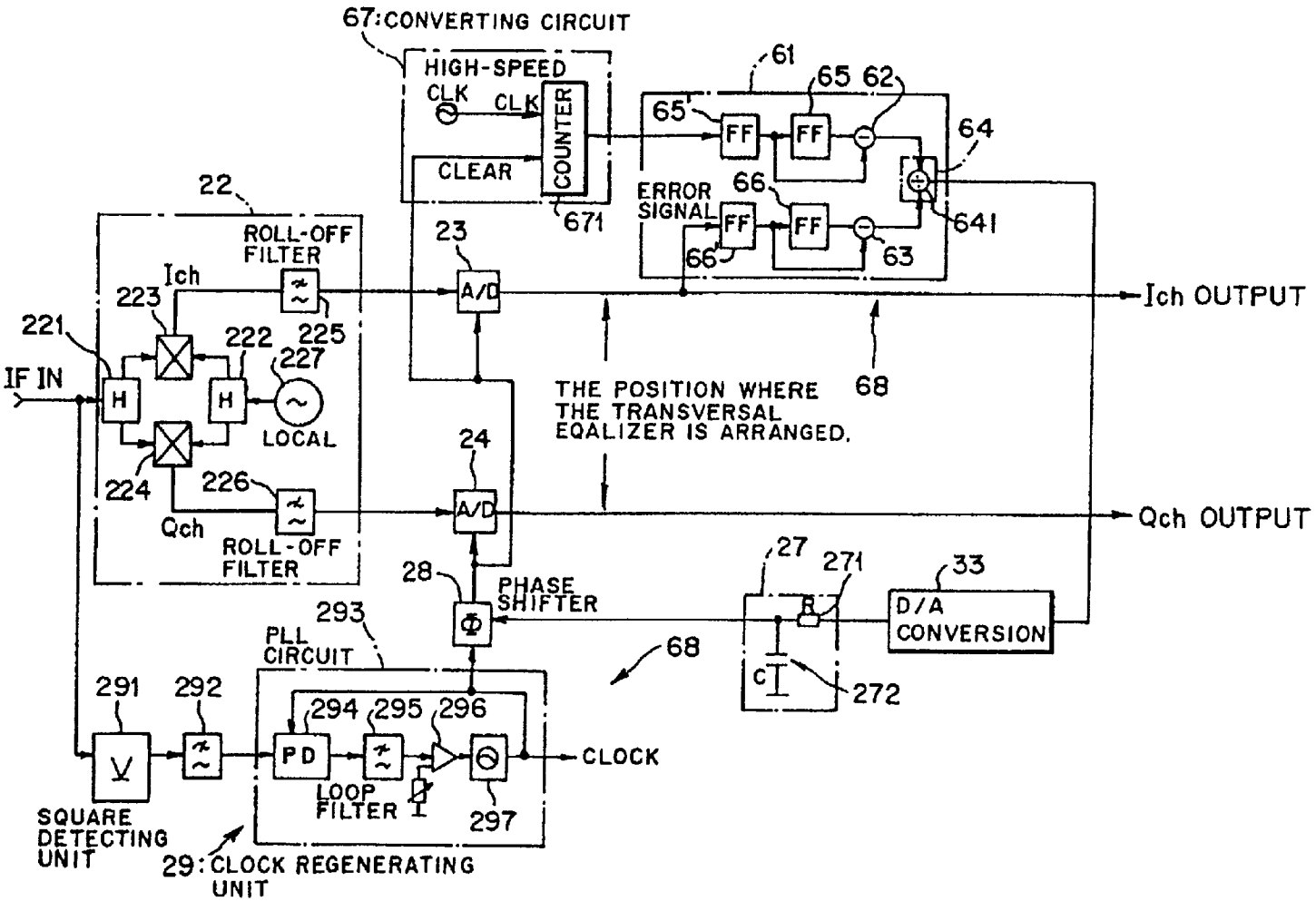
FIG. 44 is a block diagram showing the detail configuration of each of a clock regenerating circuit and the peripheral circuits according to the third embodiment.

In this embodiment, as shown in FIG. 44, the orthogonal detecting unit 22 includes hybrid circuits (H) 221 and 222, phase detectors 223 and 224, roll-off filters 225 and 226, and a local oscillating unit 227. The identifying units 23 and 24 are respectively arranged as two A/D converters corresponding to two kinds of (plural) signals (an Ich signal and a Qch signal) obtained by demodulating a multilevel orthogonal modulation signal.

The integrator (averaging unit) 27 which is arranged between the phase component detecting unit 61 and the phase shifter 28 (to be described later) averages the output of the phase component detecting unit 61. In this case, as shown in FIG. 44, the integrator 27 is formed of a resistor (R) 271 and a capacitor (C) 272.

The phase shifter (phase adjusting unit) 28 adjusts the phase of the A/D conversion clock (signal identification clock) to the identifying units (A/D converters) 23 and 24 regenerated by the clock regenerating unit 29 to supply to the identifying units 23 and 24. The clock regenerating unit 29 regenerates an A/D conversion clock for the identifying units 23 and 24 from an IF signal (multilevel orthogonal modulated signal) to be detected by the orthogonal detecting unit 22 and then supplies it to the identifying units 23 and 24. In this case, as shown in the first embodiment, the clock regenerating unit 29 is formed of a PLL circuit 293 including a square detecting unit 291, a filter 292, a phase detector (PD) 294, a loop filter 295, an amplifier 296, and an oscillating unit 297.

The phase component detecting unit (clock pulse detecting circuit (unit)) 61 detects the phase shift (phase component) of an A/D conversion clock based on information regarding the phase difference of an A/D conversion clock supplied to the identifying units 23 and 24 and information regarding the signal error differential obtained by the identifying unit 23 and then supplies the result to the integrator 27 being a constituent element of the clock regenerating circuit 68. The phase component detecting unit 61 is formed of a phase differential detecting unit 62, an error differential detecting unit 63, a clock phase calculating unit 64, and flip-flop (FF) circuits 65 and 66.

The phase differential detecting unit 62 detects information regarding the phase difference of an A/D conversion clock supplied to the identifying units 23 and 24. The error differential detecting unit 63 detects information regarding the signal error differential of an Ich signal obtained by the identifying unit 23. In this embodiment, as shown in FIG. 44, each of the phase differential detecting unit 62 and the error differential detecting unit 63 is formed as a subtracter. The FF circuits 65, 65', and 66, 66' are used to delay input signals by a predetermined delay amount.

The clock phase calculating unit 64 calculates the output of the phase differential detecting unit 62 and the output of the error differential detecting unit 63 to detect the phase shift of an A/D conversion clock. In concrete, the clock phase calculating unit 64 is formed as a divider (dividing unit) 641 that subjects the output of the phase differential detecting unit 62 and the output of the error differential detecting unit 63 to a dividing process.

The D/A converter 33 converts information regarding the phase shift of an A/D conversion clock detected by the phase component detecting unit 61 from a digital signal to an analog signal. The converting circuit 67 converts the phase difference information of an A/D conversion clock supplied to the identifying units 23 and 24 into a predetermined signal. In this case, the converting circuit 67, as shown in FIG. 44, is formed of a counter 671 operating with high speed clocks (CLK). In this embodiment, the phase component detecting unit 61, the integrator 27, the phase shifter 28, and the clock regenerating unit 29 are used in common to the identifying units 23 and 24.

Next, the operation of the above-mentioned clock regenerating circuit 68 being the main portion of the present invention will be explained below in detail with reference to FIG. 44.

In the phase component detecting unit 61, the FF circuit 65' receives a predetermined signal obtained by converting the phase error of an A/D conversion clock to be supplied to the A/D converters 23 and 24 by the converting circuit 67. The FF circuit 66' receives the signal error (signal error information) of an Ich signal A/D-converted by A/D converter 23.

The FF circuits 65, 65' and 66, 66' delay the above signals by a predetermined amount and then input the results to the subtracters 62 and 63. At this time, the subtracter 62 receives the current phase information $\phi(t2)$ (e.g. at the time t2) and the past phase information $\phi(t1)$ (e.g. at the time t1) delayed by the FF circuit 65. The subtracter 63 receives the error signal e(t2) of a current Ich signal (e.g. at the time t2) and the error signal e(t1) of a past Ich signal (e.g. that the time t1) delayed by the FF circuit 66.

Each of the subtracters 62 and 63 performs a subtracting process of an input signal. The subtracter 62 produces the phase difference information $[\phi(t2)-\phi(t1)]$ of an A/D conversion clock and the subtracter 63 produces the signal error differential information $[(e(t2)-e(t1)]$ of the Ich signal. The divider (clock phase calculating unit 64) 641 subjects the phase difference information [$\phi(t2)-\phi(t1)$] and the signal error differential information [$(e(t2)-e(t1)$] to a division process.

As a result, the phase component detecting unit 61 produces information At regarding the phase shift of an A/D conversion clock expressed by the following formula:

$$\Delta t=[e(t2)-e(t1)]/[(\phi t2)-(\phi t1)]$$

Figure 45:
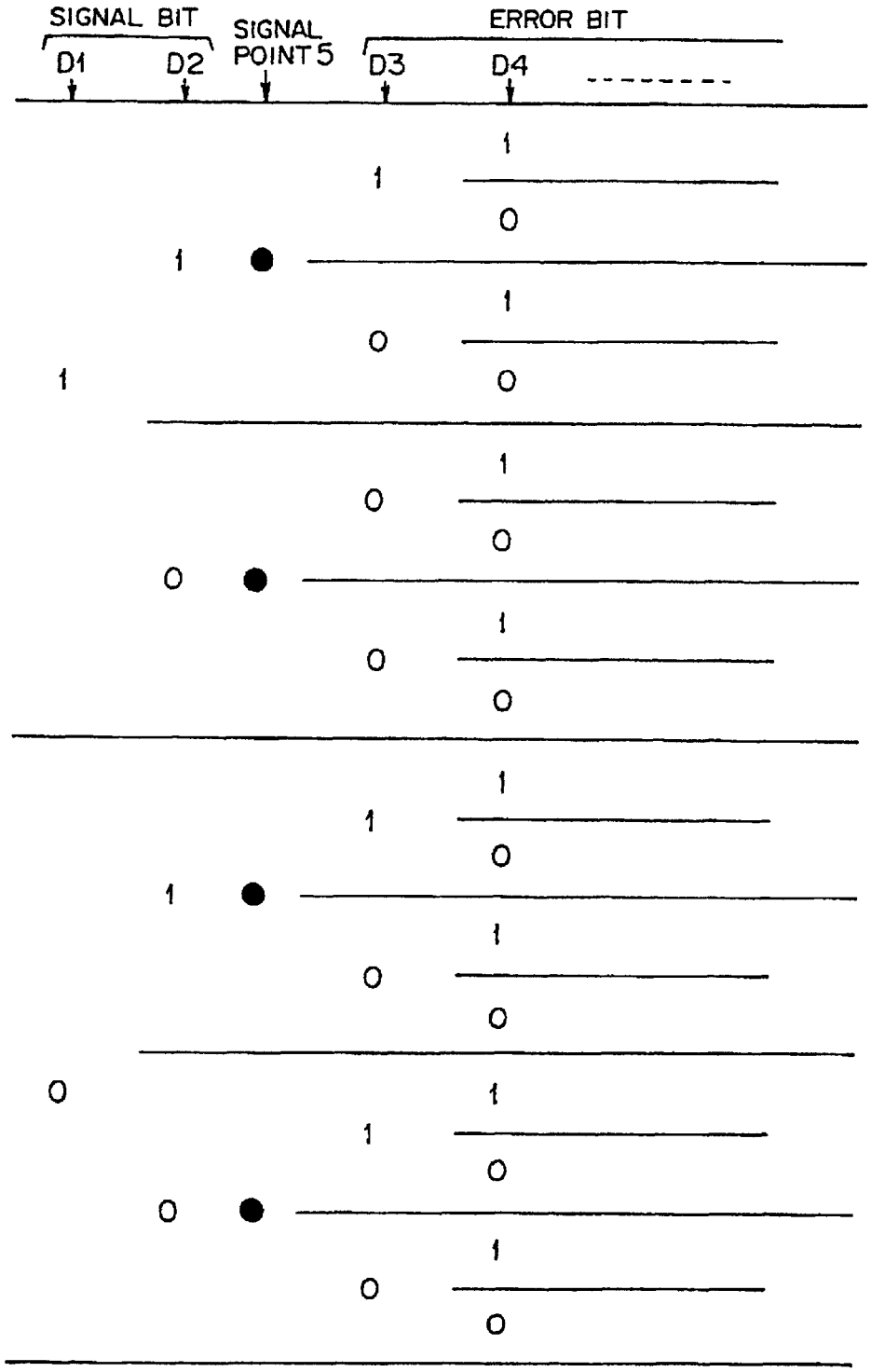
FIG. 45 is a diagram used for explaining the operation of a clock regenerating circuit according to the third embodiment.
Figure 46:
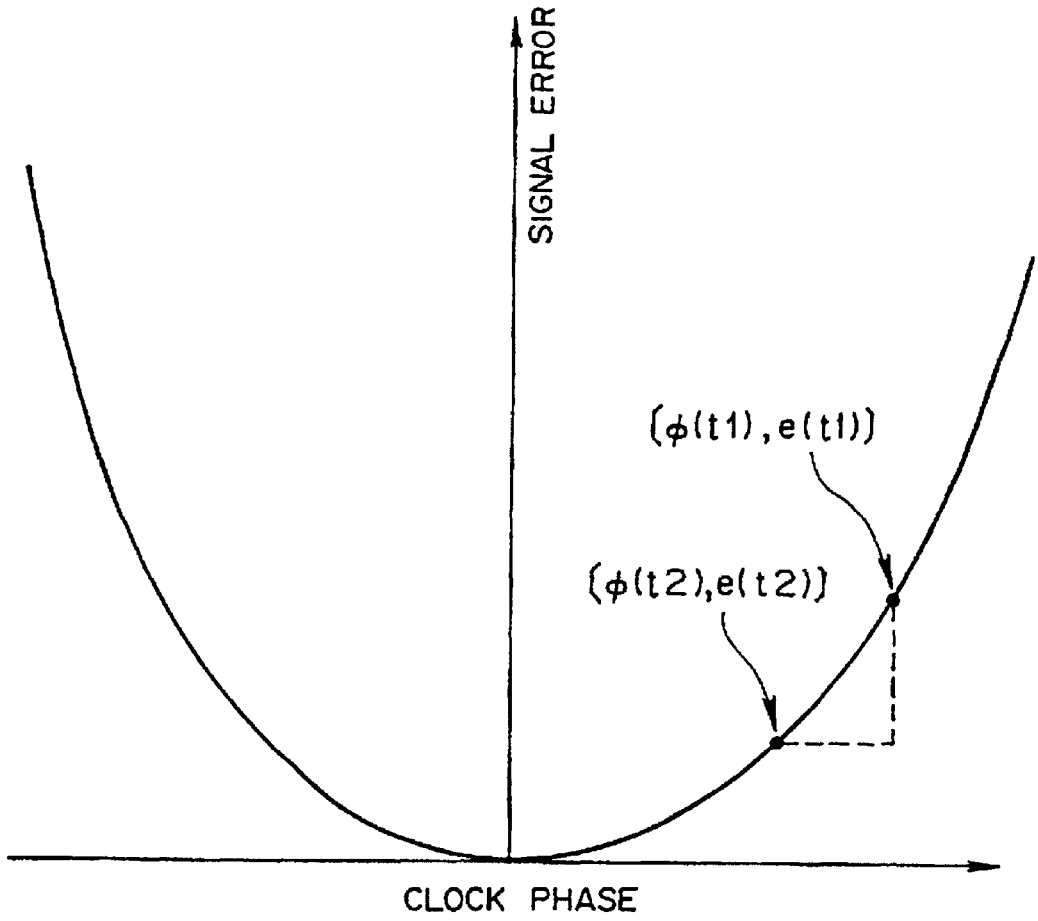
FIG. 46 is a diagram used for explaining the operation of a clock regenerating circuit according to the third embodiment.

In other words, where the phase of an A/D conversion clock shifts from the position of a signal point on the eye pattern in the above-mentioned process, bits lower than the signal bit (D1, D2) of a base band signal which is obtained by demodulating a multilevel orthogonal modulated signal called 16 QAM error bits (D3, D4, . . . ) shown in FIG. 45 increase as shown in FIG. 46. Hence the direction (phase shift $\Delta t$) in which the phase of an A/D conversion clock is adjusted is obtained by differentiating the curve between [phase error $\phi(t1)$, signal error $e(t1)$] at the time t1 and [phase error $\phi(t2)$, signal error $e(t2)$] at the time t2 on the clock phase to signal error curve shown in FIG. 46.

Thereafter the information ($\Delta t$) regarding the phase shift of an A/D conversion clock detected above is averaged by the integrator 27. Then the averaged information is supplied as a phase adjustment and control signal to the phase shifter 28 to adjust the phase shift of an A/D conversion clock regenerated by the clock regenerating unit 29.

Hence since the phase shifter 28 can adjust automatically and with higher accuracy the phase shift of an A/D conversion clock to the A/D converters 23 and 24, the accuracy of an A/D conversion process by the A/D converters 23 and 24 can be greatly improved.

The equalizer (transversal equalizer) 25 described in the first and second embodiments is arranged on the rear stage of each of the A/D converters 23 and 24, as shown in FIG. 44.

Figure 47:
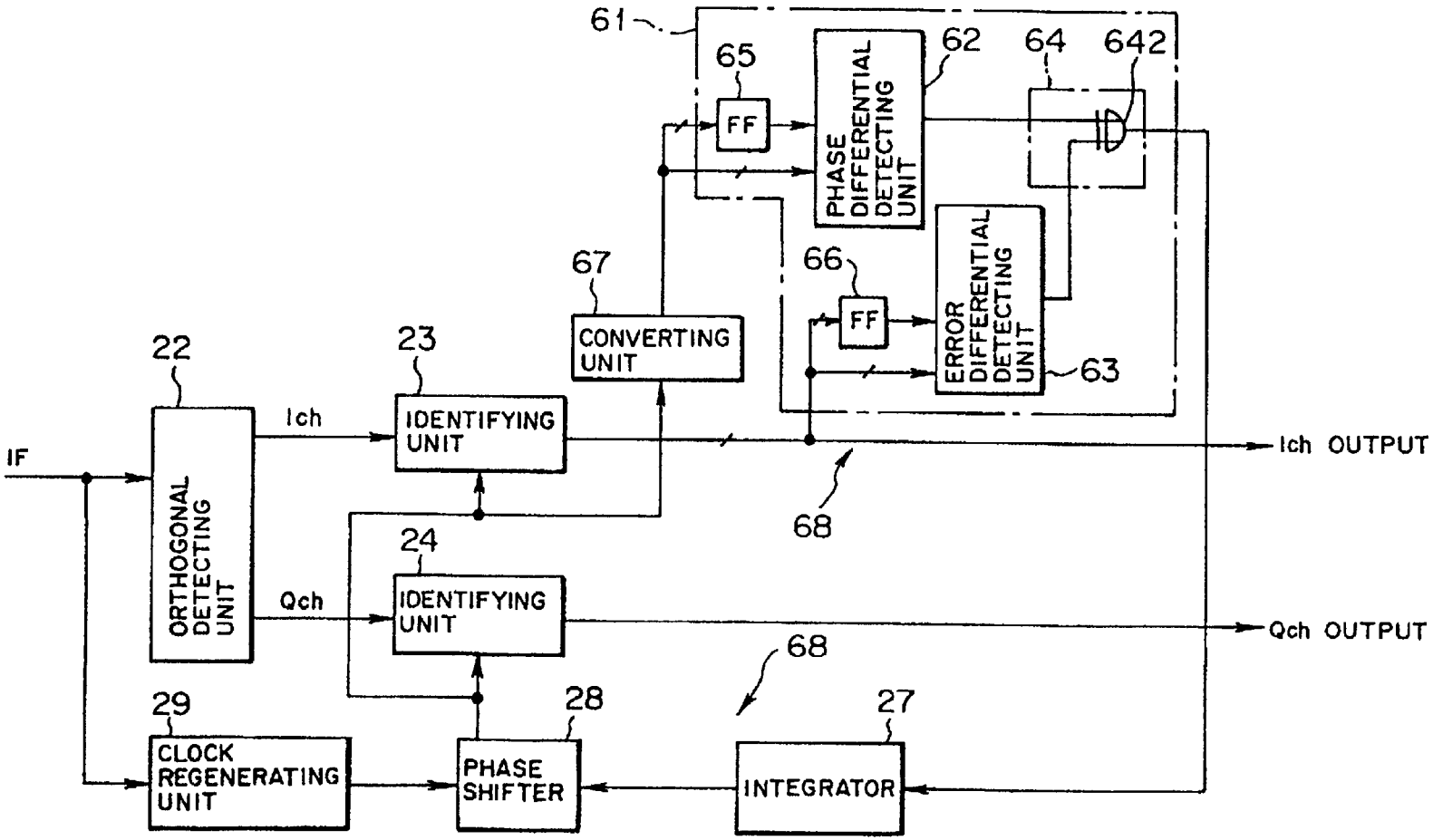
FIG. 47 is a block diagram showing another configuration of a clock regenerating circuit according to the third embodiment.
Figure 48:
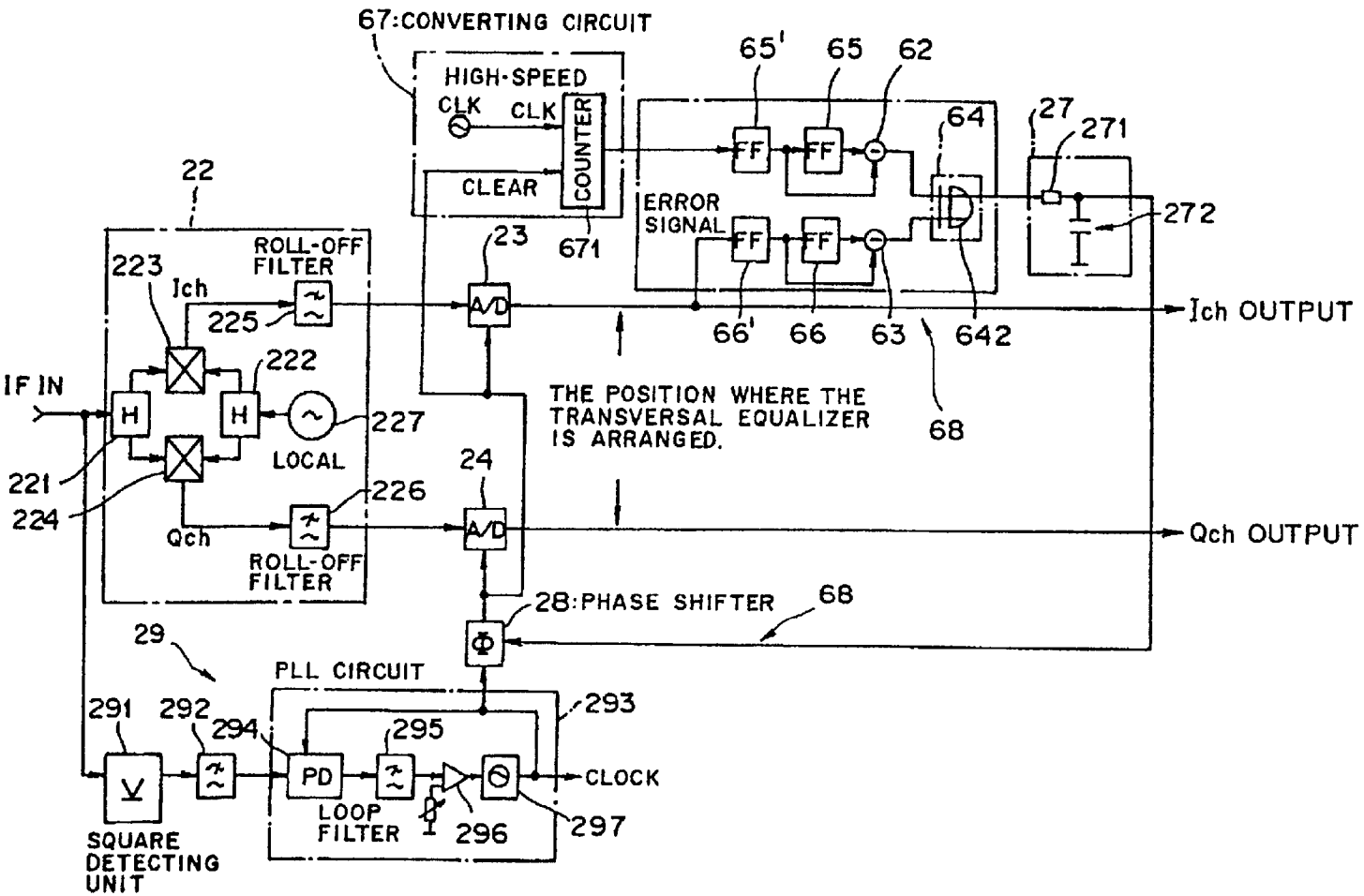
FIG. 48 is a block diagram showing the detail configuration of each of a clock regenerating circuit and the peripheral circuits according to the third embodiment.

In the clock regenerating circuit 68 in this embodiment, if the phase differential information of the phase differential detecting unit 62 and the signal error information of the error differential detecting unit 63 are expressed only by polarities as described in the first embodiment, the clock phase calculating unit 64, as shown in FIGS. 47 and 48, can be formed as the EX-OR gate (exclusive OR element) 642 instead of the divider 641. Hence the phase shift (phase component) of an A/D conversion clock can be detected by a more-simplified configuration. In FIGS. 47 and 48, the same numerals as those in FIGS. 43 and 44 represent the same elements.

Figure 49:
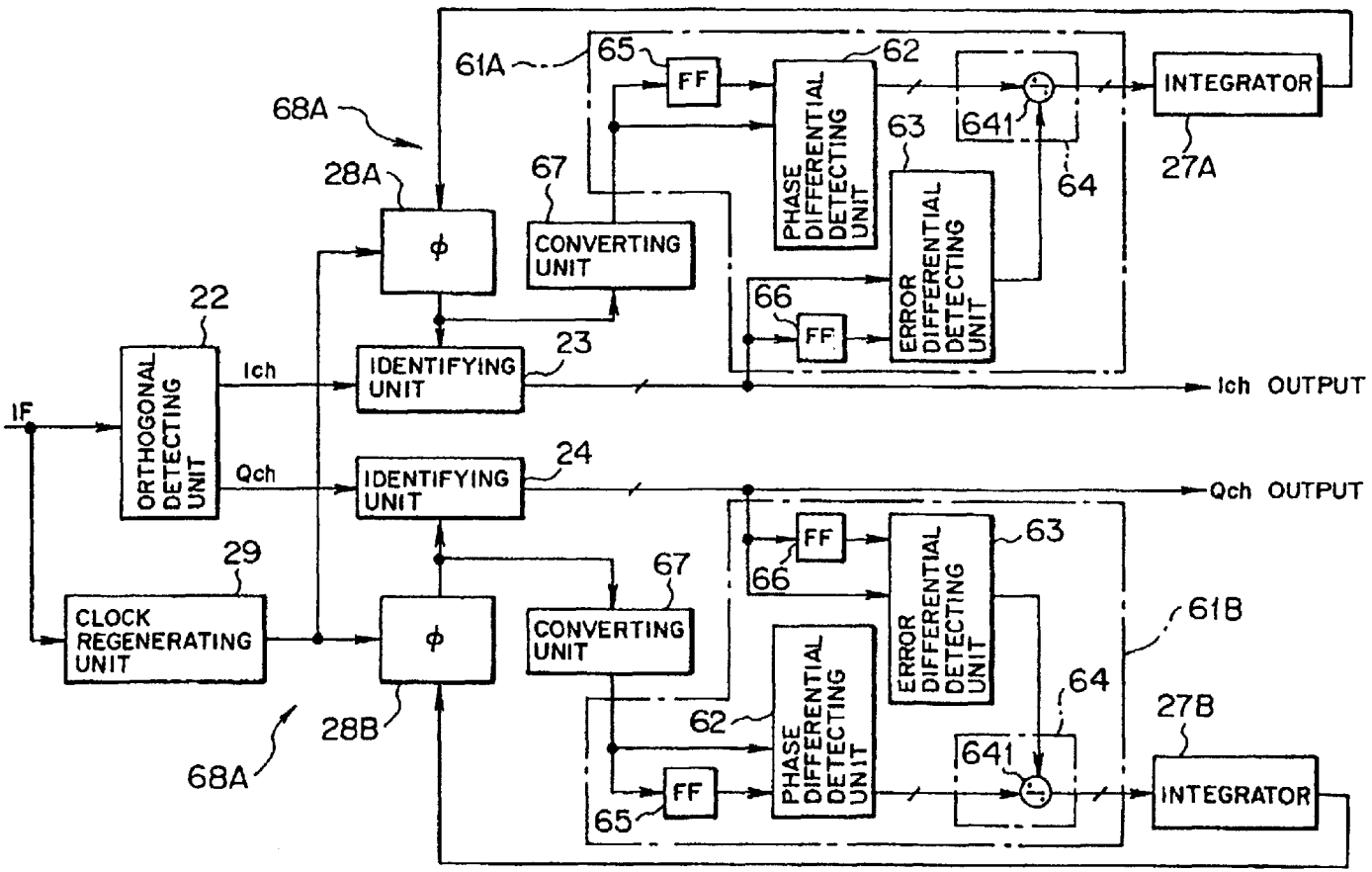
FIG. 49 is a block diagram showing another configuration of a clock regenerating circuit according to the third embodiment.

FIG. 49 is a block diagram illustrating another configuration of the clock regenerating circuit 68 shown in FIGS. 43 and 44. In the clock regenerating circuit 68A shown in FIG. 49, the clock regenerating unit 29 is arranged in common to the identifying units 23 and 24. Like the phase shifter 28, the integrator 27, and the phase component detecting unit 61 shown in FIGS. 43 and 44, the phase shifter 28A, the integrator 27A, and the phase component detecting unit 61A are arranged to the A/D converter 23 while the phase shifter 28B, the integrator 27B, and the phase component detecting unit 61B are arranged to the A/D converter 24.

In the clock regenerating circuit 68A shown in FIG. 49, as described with FIGS. 43 and 44, the phase component detecting unit 61A arranged to the identifying unit 23 detects the phase shift (phase component) of a signal identification clock (A/D conversion clock) to the identifying unit 23 based on phase difference information of a signal identification clock (A/D conversion clock) supplied to the identifying unit 23 and signal error differential information output from the identifying unit 23. The phase component detecting unit 61B arranged to the identifying unit 24 detects the phase shift (phase component) of a signal identification clock (A/D conversion clock) to the identifying unit 24 based on phase difference information of a signal identification clock (A/D conversion clock) supplied to the identifying unit 24 and signal error differential information output from the identifying unit 24.

The integrator 27A receives and averages information regarding the clock phase shift detected by the phase component detecting unit 61A. The integrator 27B receives and averages information regarding the clock phase shift detected by the phase component detecting unit 61B. Then each of the phase shifters 28A and 28B receives the averaged result as a phase adjustment and control signal to adjust the phase shift of a signal identification clock which is regenerated from the IF signal to be detected by the orthogonal detecting unit 22 by the clock regenerating unit 29 used in common to the identifying units 23 and 24.

Thus, the phase shifter 28A can adjust the clock phase shift to the identifying unit 23 and the phase shifter 28B can adjust the clock phase shift to the identifying unit 24. Hence the accuracy of the signal identifying process in the identifying units 23 and 24 can be greatly improved.

Figure 50:
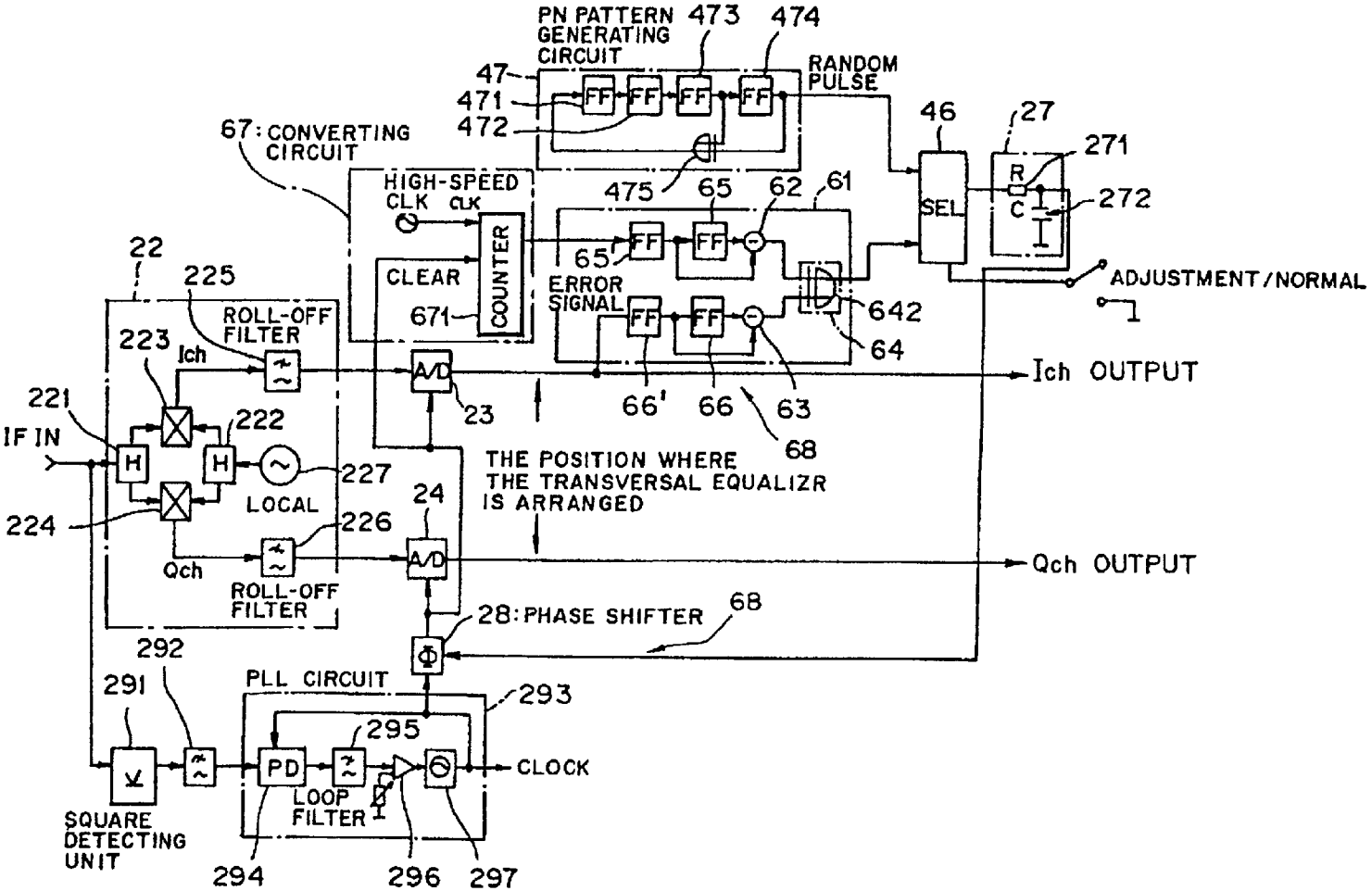
FIG. 50 is a block diagram showing the detail configuration of each of a clock regenerating circuit and the peripheral circuits according to the third embodiment.

Like the first embodiment described with FIGS. 26 and 27, the clock regenerating circuit 68 (or 68A), as shown in FIG. 50, can include a PN pattern generating circuit (random pulse generating unit: a test signal generating unit) 47 and a selector (SEL: selecting unit) 46 to input the output of the SEL 46 to the phase shifter 28 via the integrator 27.

In this case, the PN pattern generating circuit 47 is formed of four flip-flop (FF) circuits 471 to 474 and an EX-OR gate 475. The PN pattern generating circuit 47 generates a test random pulse to set the phase shift of an A/D conversion clock by the phase component detecting unit 61 (or 61A, 61B) to the center value of a detection result. The SEL 46 outputs selectively the output of the phase component detecting unit 61 (or 61A, 61B) and the output of the PN pattern generating circuit 47 in response to a test/normal switching signal. In FIG. 49, the same numerals as those shown in FIG. 44 represent the same elements.

When the clock regenerating circuit 68 with the above-mentioned structure as shown in FIG. 50 is adjusted and tested, the adjustment signal is input to the SEL 46. Instead of the phase shift (phase component) of an A/D conversion clock to the A/D converters 23 and 24 to be detected by the phase component detecting unit 61 as described with FIGS. 43 to 46, the SEL 46 outputs selectively the random pulse (test signal) generated from the PN pattern generating circuit 47. Then the integrator 27 averages the selected output to supply the result as a phase adjustment and control signal for the phase shifter 28 to the phase shifter 28.

Hence the phase shifter 28 can adjust and test very easily the phase shift of an A/D conversion clock sent to the A/D converters 23 and 24.

Figure 51:
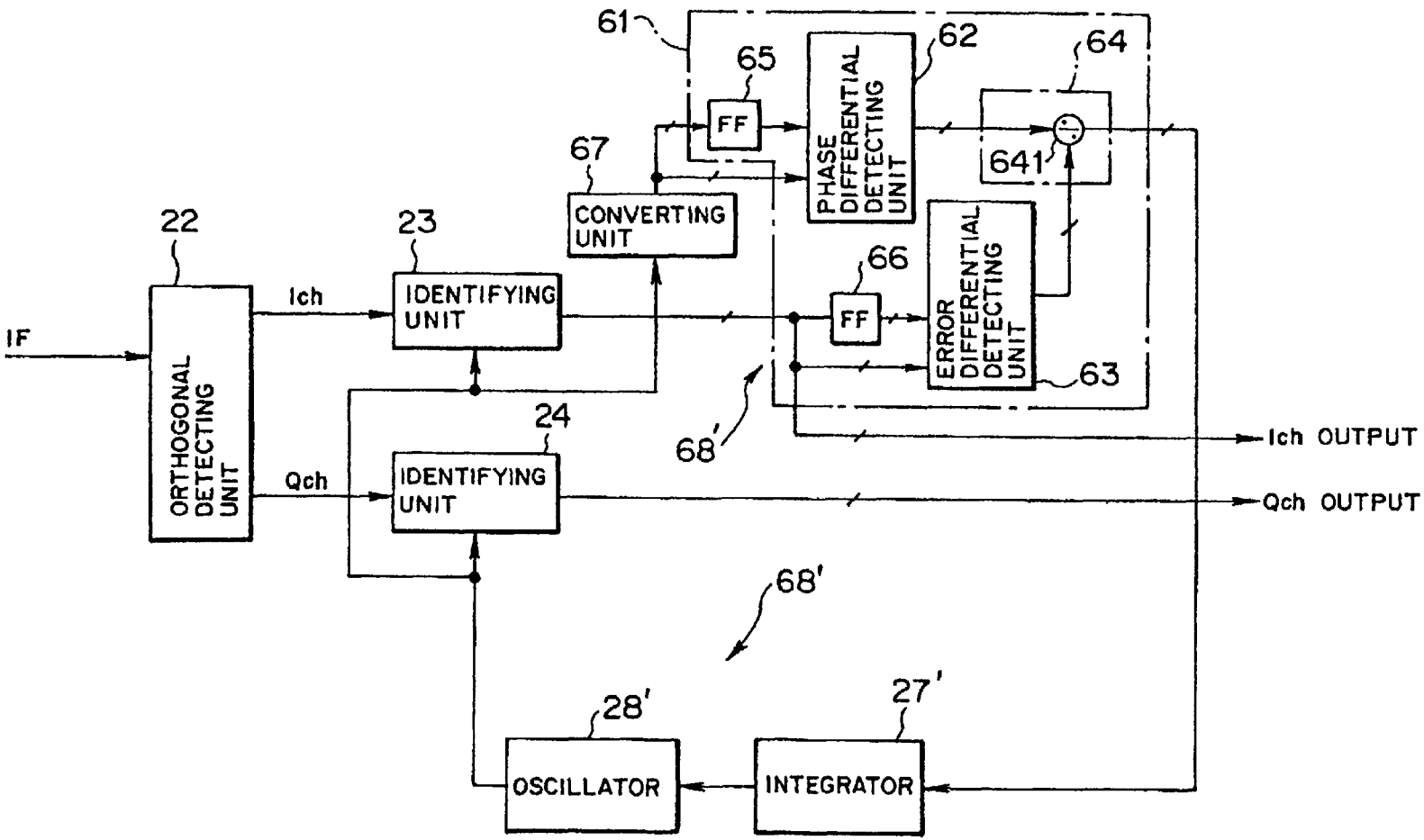
FIG. 51 is a block diagram showing the configuration of each of a clock phase detecting circuit and a clock regenerating circuit according to the fourth embodiment of the present invention.

(e) Fourth Embodiment of the Present Invention:

FIG. 51 is a block diagram illustrating the configuration of each of the clock phase detecting unit and the clock regenerating circuit arranged in multiplex radio equipment according to the fourth embodiment of the present invention. Referring to FIG. 51, numeral 22 represents an orthogonal detecting unit; 23 and 24 represent identifying units; and 61 represents a phase component detecting unit. These elements correspond to those shown in the third embodiment. Numeral 27' represents an integrator and 28' represents an oscillating unit. In this embodiment, the phase component detecting unit 61, the integrator 27' and the oscillating unit 28' provide the clock regenerating circuit 68'.

Figure 52:
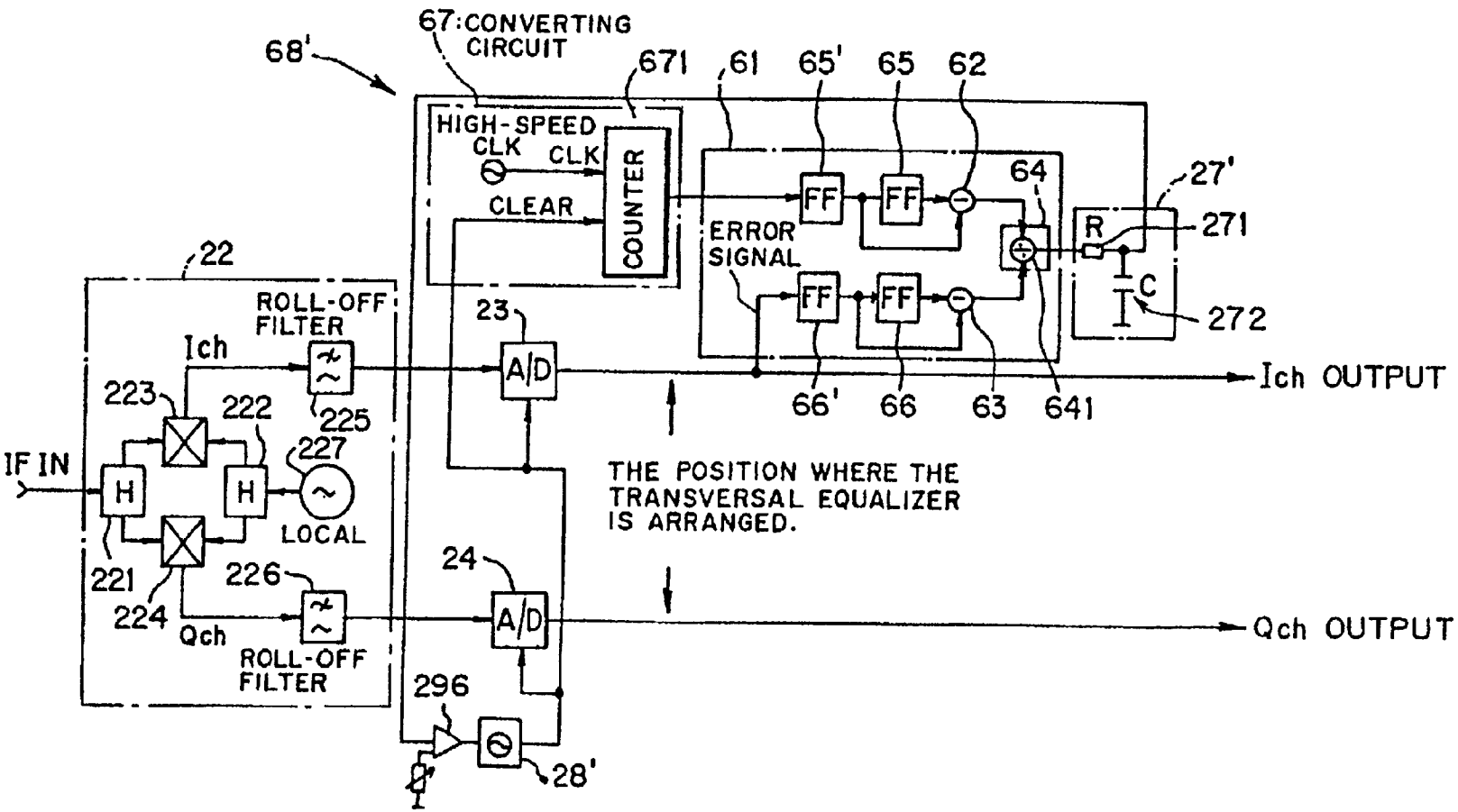
FIG. 52 is a block diagram showing the detail configuration of each of a clock regenerating circuit and the peripheral circuits according to the fourth embodiment.

The orthogonal detecting unit 22, the identifying units 23 and 24, the integrator 27' and the oscillating unit 28' correspond to elements with the same numerals described in the second embodiment, respectively. The orthogonal detecting unit 22 outputs two kinds of signals including an Ich signal and a Qch signal which are different in phase (perpendicular to each other) by 90° from each other by detecting an IF band signal. As shown in FIG. 52, the orthogonal detecting unit 22 is formed of hybrid circuits (H) 221 and 222, phase detectors 223 and 224, roll-off filters 225 and 226, and a local oscillating unit 227. Each of the identifying units 23 and 24 is formed as an A/D converter that A/D-converts (identifies) the output of the orthogonal detecting unit 22 (a signal demodulated by the multilevel orthogonal modulation signal) at a predetermined level.

The integrator (loop filter unit) 27' which integrates the output of the phase component detecting unit 61 (to be described later) is formed of a resistor (R) 271 and a capacitor (C) 272, as shown in FIG. 52. The resistor 271 and the capacitor 272 integrate the phase shift (phase component) information of an A/D conversion clock detected by the phase component detecting unit 61.

The oscillating unit (oscillating unit) 28' receives the output of the integrator 27' as a control input which adjusts the phase shift of an A/D conversion clock and then outputs a signal identification clock (A/D conversion clock) to the identifying units (A/D converters) 23 and 24.

The phase component detecting unit (clock phase detecting circuit (unit)) 61 detects the phase shift (phase component) of an A/D conversion clock in response to the phase difference information of an A/D conversion clock supplied to the A/D converters 23 and 24 and signal error differential information obtained by the A/D converter 23 and then supplies it to the integrator 27' being a constituent element of the clock regenerating circuit 68'. The phase component detecting unit 61 is formed of a phase differential detecting unit 62, an error differential detecting unit 63, a clock phase calculating unit 64, flip-flop (FF) circuits 65 and 66.

The phase differential detecting unit 62 detects the phase difference information of an A/D conversion clock supplied to the A/D converters 23 and 24. The error differential detecting unit 63 detects the signal error differential information of an Ich signal obtained by the identifying unit 23. Each of the phase differential detecting unit 62 and the error differential detecting unit 63 is formed as a subtracter in this embodiment, as shown in FIG. 52. Each of the FF circuits 65 and 65' delay its input signal by a predetermined amount and each of the FF circuits 66 and 66' delay its input signal by a predetermined shift.

The clock phase calculating unit 64 calculates the output of the phase differential detecting unit 62 and the output of the error differential detecting unit 63 to detect the phase shift of an A/D conversion clock. In concrete, the clock phase calculating unit 64, which is formed of a divider (dividing unit) 641, subjects the output of the phase differential detecting unit 62 and the output of the error differential detecting unit 63 to a division process.

Referring to FIG. 52, numeral 67 represents a converting circuit that converts phase difference information of an A/D conversion clock supplied to the A/D converters 23 and 24 into a predetermined signal. The converting circuit 67 includes a counter 671 operating with high speed clocks (CLK). The amplifier 296 amplifies information regarding the phase shift of an A/D conversion clock detected by the phase component detecting unit 61 to a predetermined signal level. In this embodiment, the phase component detecting unit 61, the integrator 27, the phase shifter 28, and the clock regenerating unit 29 are used in common to the identifying units (A/D converters) 23 and 24.

In the clock regenerating circuit 68' with the above-mentioned configuration, the converting circuit 67 converts the phase error of an A/D conversion clock to be supplied to the A/D converters 23 and 24 into a predetermined signal and then inputs the converted signal to the FF circuit 65' in the phase component detecting unit 61. At the same time, the FF circuit 66' receives the signal error (signal error information) of an Ich signal A/D converted by the A/D converter 23.

The FF circuits 65 and 65' delays the converted signal by a predetermined shift to input to the subtracter 62. The FF circuits 66 and 66' delays the signal error by a predetermined amount to input to the subtracter 63. Each of the subtracters 62 and 63 subjects its input to a subtraction process. The subtracter 62 obtains the phase difference information of an A/D conversion clock while the subtracter 63 obtains the signal error differential information of an Ich signal.

The divider 641 (clock phase calculating unit 64) 641 subjects the phase difference information and signal error differential information to an division process. As a result, the phase shift information of an A/D conversion clock can be obtained.

Thereafter, the phase shift information of the above-detected A/D conversion clock is not converted from the digital signal form to an analog signal form as described in the third embodiment, but integrated by the integrator 27' as it is in a digital signal form. The result is amplified by the amplifier 296 to a predetermined signal level. Then the oscillating unit 28' receives the amplified signal as a control signal to adjust the phase shift on an A/D conversion clock.

In other words, like the third embodiment, the clock regenerating circuit 68' does not convert the phase shift information of an A/D conversion clock to the A/D converters 23 and 24 to be detected by the phase component detecting unit 61 from a digital signal to an analog signal to adjust the phase shift of an A/D conversion clock using the analog signal. Instead, the clock regenerating circuit 68' outputs the phase shift information of an A/D conversion clock in a digital signal form as a control input to the oscillating unit 28' and then adjusts the a/D conversion clock using the digital signal.

Consequently, even if the clock regenerating unit 29 and the phase shifter 28 are not arranged like the third embodiment, the very-simplified configuration can adjust automatically the phase shift of an A/D conversion clock to the A/D converters 23 and 24. Thus the A/D converters 23 and 24 can greatly improve the accuracy of an A/D conversion process.

Figure 53:
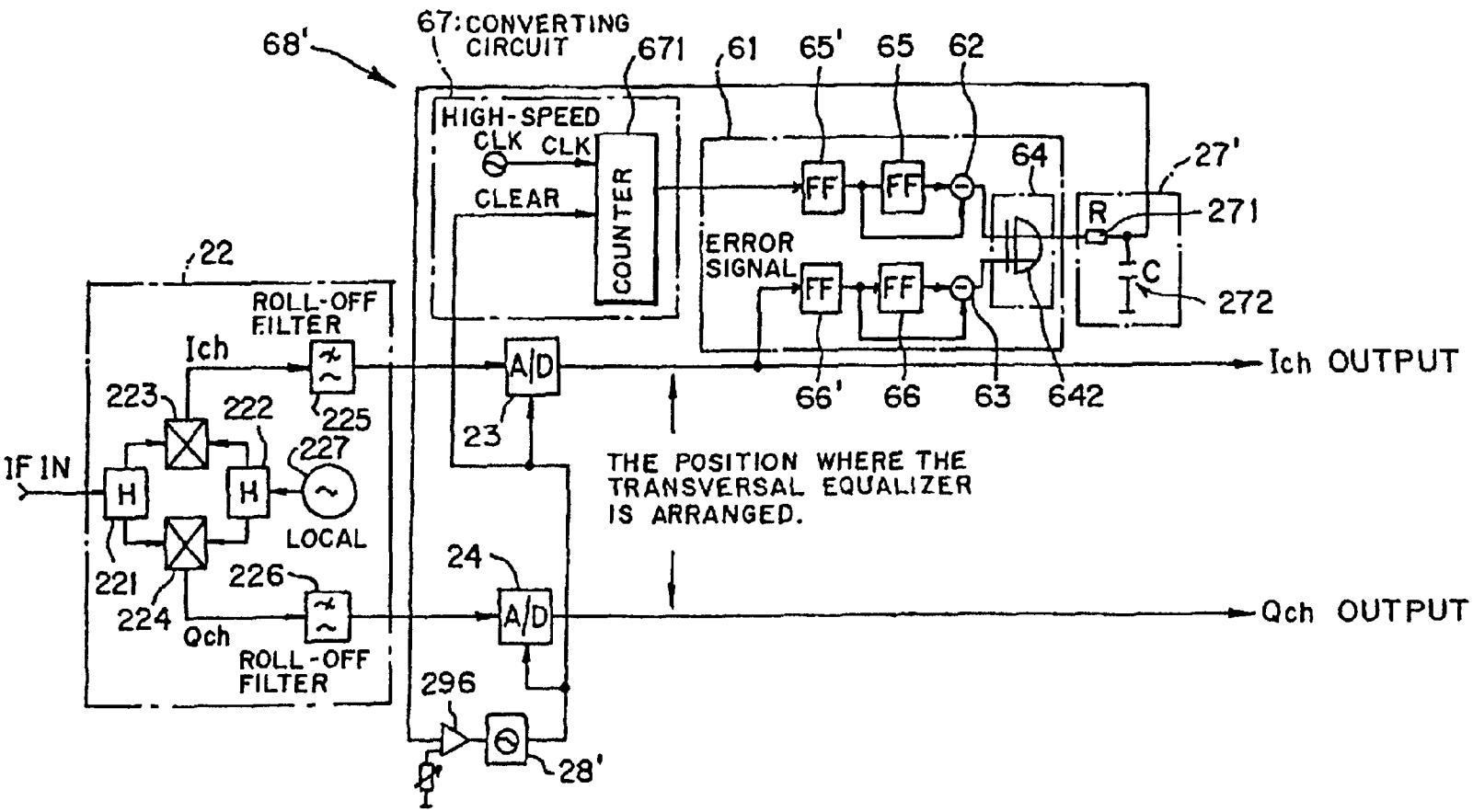
FIG. 53 is a block diagram showing the detail configuration of each of a clock regenerating circuit and the peripheral circuits according to the fourth embodiment.

In the clock phase calculating unit 64 in the phase component detecting unit 61 in this embodiment, if the phase differential information from the phase differential detecting unit 62 and the signal error information from the error differential detecting unit 63 are simply expressed with polarities, an EX-OR gate (exclusive OR element) 642, as shown in FIG. 53, can be arranged instead of the divider 641. The more-simplified configuration can detect the phase shift (phase component) of an A/D conversion clock. Other constituent elements correspond to those described with FIG. 52.

Figure 54:
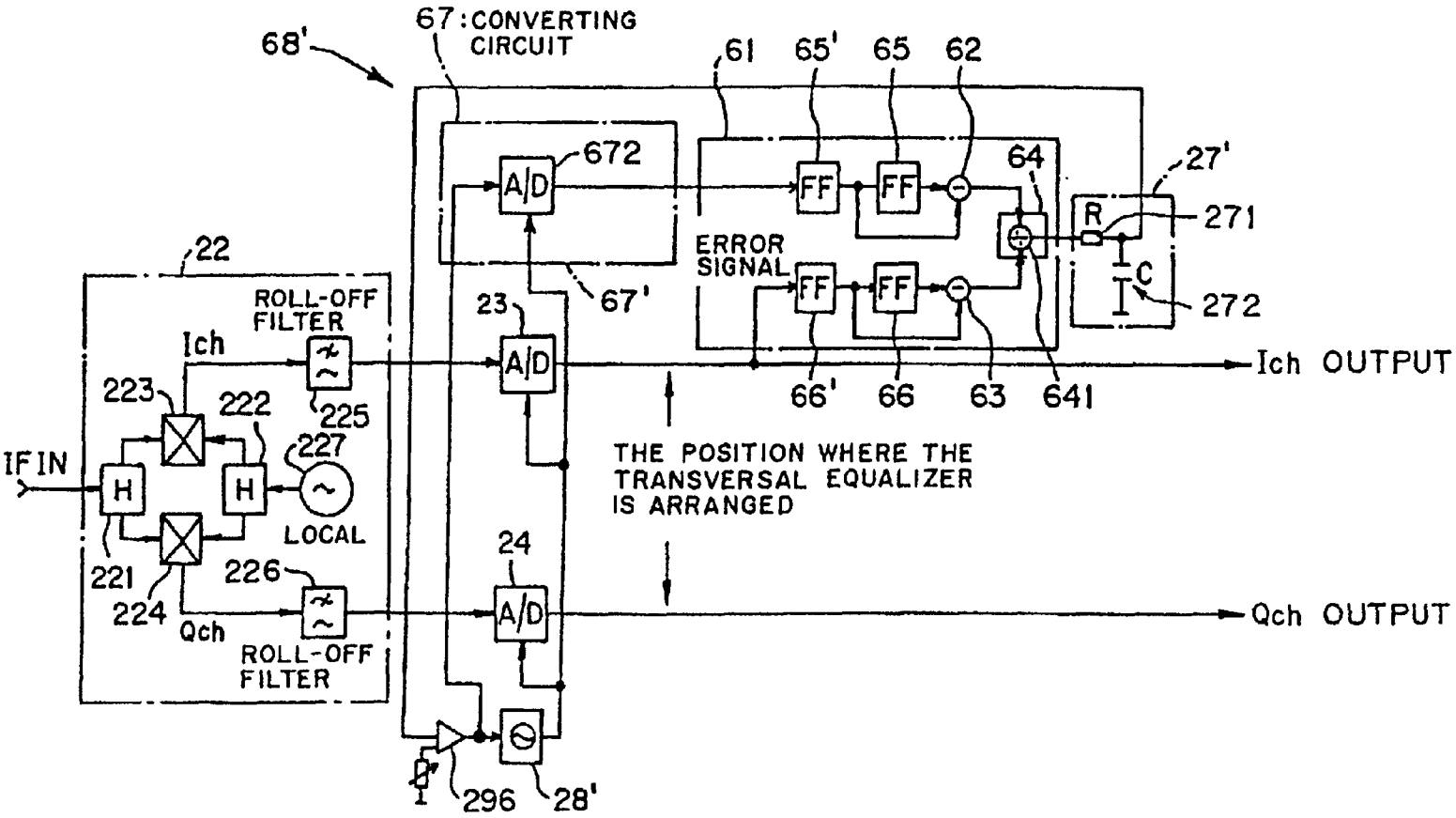
FIG. 54 is a block diagram showing the detail configuration of each of a clock regenerating circuit and the peripheral circuits according to the fourth embodiment.

The clock regenerating circuit 68', shown in FIGS. 52 and 53, can be constituted more simply by using the converting circuit 67' formed as the A/D converter 672 as shown in FIG. 54, instead of the converting circuit 67.

Figure 55:
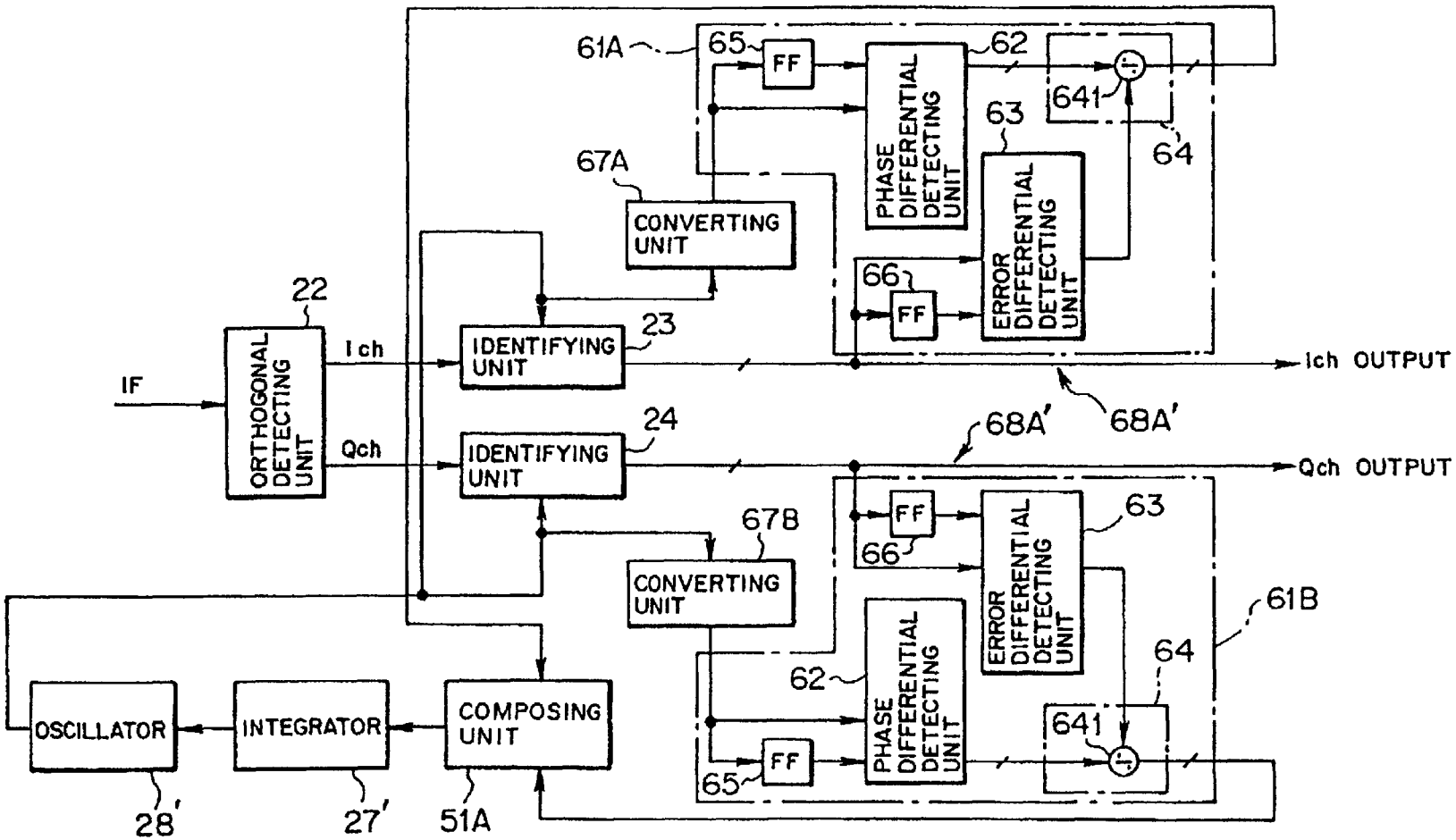
FIG. 55 is a block diagram showing another configuration of a clock regenerating circuit according to the fourth embodiment.

Next, FIG. 55 is a block diagram showing another configuration of the clock regenerating circuit 68' shown in FIGS. 51 to 54. The clock regenerating circuit 68A' shown in FIG. 55 includes a composing unit 51A formed of a multiplier 511, in addition to the orthogonal detecting unit 22, the identifying units 23 and 24, the phase component detecting units (clock phase detecting units) 61A and 61B, the integrator (loop filter unit) 27', and the oscillating unit 28' corresponding to those shown in FIGS. 51 to 54.

In this case, the phase component detecting unit 61A is arranged corresponding to the A/D converter 23 and the phase component detecting unit 61B is arranged corresponding to the A/D converter 24. The oscillating unit 28' and the integrator 27' are used in common to the identifying units 23 and 24. The composing unit 51A is arranged to compose the output of the phase component detecting unit 61A with the output of the phase component detecting unit 61B. The output of the composing unit 51A is input to the integrator 27'.

In the clock regenerating circuits 68A', the phase component detecting unit 61 corresponding to the A/D converter 23 detects the phase shift information of a signal identification clock for the A/D converter 23 and the phase component detecting unit 61 corresponding to the A/D converter 24 detects the phase shift information of a signal identification clock for the A/D converter 24. The multiplier 511 in the composing unit 51A multiplies the output from the phase component detecting unit 61A by the output of the phase component detecting unit 61B and then supplies the result as an input to the integrator 27' and the oscillating unit 28' used in common to the identifying units 61A and 61B.

Hence the phase shift of a signal identification clock supplied from the oscillating unit 28' to the identifying units 23 and 24 can be adjusted independently and with higher accuracy to the identifying units 23 and 24. The composing unit 51A can be constituted in an analog circuit form or a digital circuit form. The detail configuration of each element is similar to that described with FIGS. 52 to 54. Hence the duplicate explanation will be omitted here.

Figure 56:
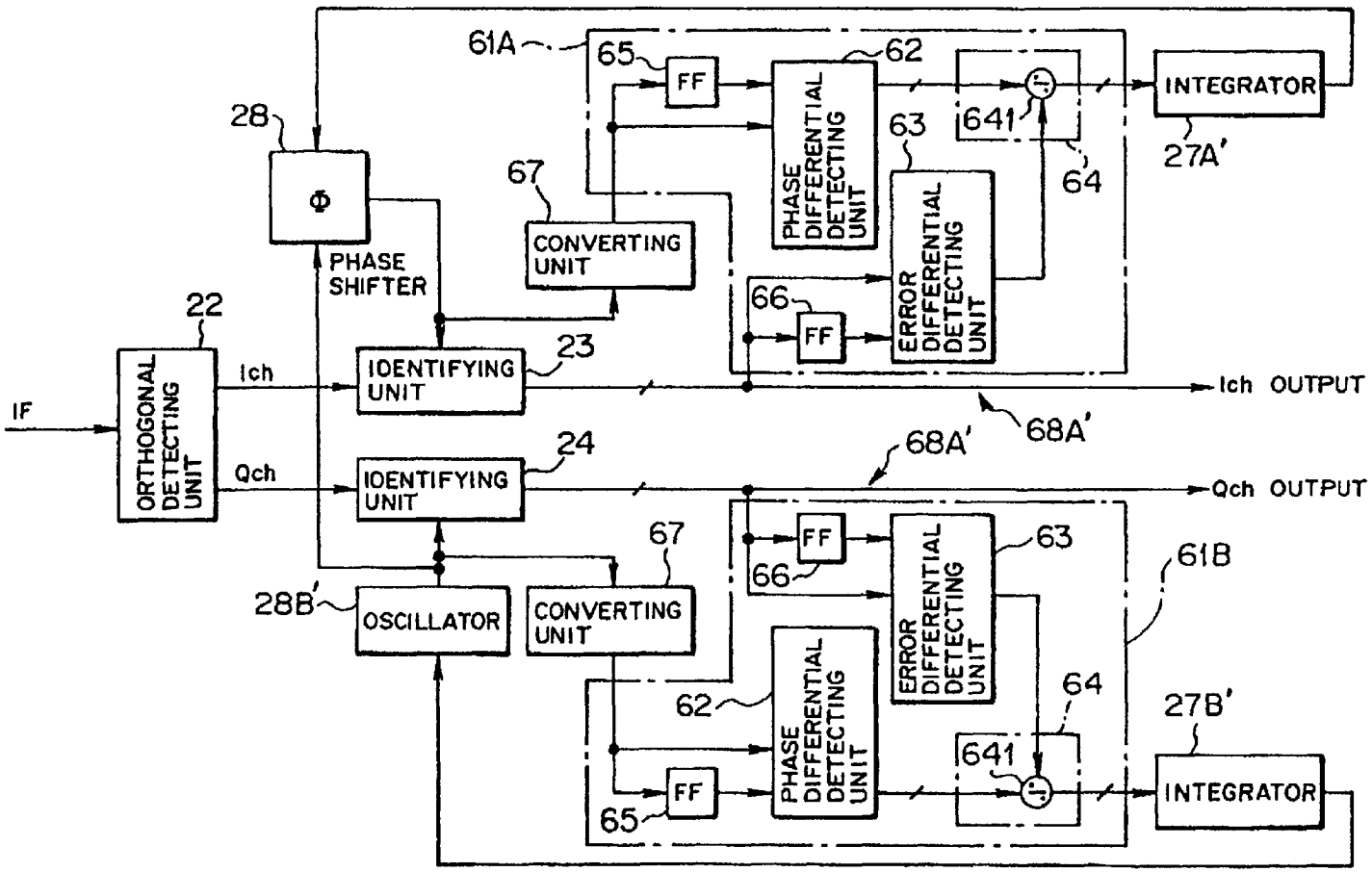
FIG. 56 is a block diagram showing another configuration of a clock regenerating circuit according to the fourth embodiment.

FIG. 56 is a block diagram illustrating another configuration of the clock regenerating circuit 68' shown in FIGS. 51 to 54. In the clock regenerating circuits 68'B shown in FIG. 56, the phase component detecting unit (clock phase detecting unit) 61A and the integrator (loop filter unit) 27A' are arranged to the identifying unit 23, whereas the phase component detecting unit, the clock phase detecting unit 61B and the integrator (loop filter unit) 27B' are arranged to the identifying unit 24. The oscillating unit (oscillating unit) 28B' is used in common to the identifying units (A/D converters) 23 and 24. The identifying unit 23 is connected to the oscillating unit 28B' via the phase shifter 28 similar to that described in the third embodiment. The output of the integrator 27A' is supplied as a control input to the phase shifter 28 or the oscillating unit 28B', whereas the output of the integrator 27B' is supplied as a control input to the phase shifter 28 or the oscillating unit 28B'. Numeral 296 represents an amplifier which amplifies the phase shift information of a signal identification clock for the identifying units 23 and 24 detected by the phase component detecting unit 61B to a predetermined signal level.

In the clock regenerating circuit 68B', like the third embodiment, the phase component detecting unit 61A detects information regarding the phase shift of a signal identification clock to the identifying unit 23 and the integrator 27A' integrates the detected information. On the other hand, the phase component detecting unit 61B detects information regarding the phase shift of a signal identification clock to the identifying unit 24 and the integrator 27B' integrates the detected information. Then the result is supplied as a control input to the phase shifter 28 or the oscillating unit 28B'.

The oscillating unit 28B' adjusts automatically its oscillation frequency and the clock phase shift, based on information regarding the phase shift of a signal identification clock and supplies the result to the identifying unit 24. The phase shifter 28 adjusts the phase of a piece of the phase shift information supplied to the oscillating unit 28B' and then supplies the result to the identifying unit 23.

As described above, according to the clock regenerating circuit 68A', the phase component detecting unit 61A arranged corresponding to the identifying unit 23 detects the phase shift of a signal identification clock to the identifying unit 23 to supply the result as a control signal for the oscillator 28B' or the phase shifter 28 to the oscillating unit 28B' via the integrator 27A' while the phase component detecting unit 61B arranged corresponding to the identifying unit 24 detects the phase shift of a signal identification clock to the identifying unit 24 to supply the result as a control signal for oscillator 28B' or the phase shifter 28 to the oscillating unit 28B' via the integrator 27B'. Hence the accuracy of the signal identifying process in the identifying units 23 and 24 can be further improved.

Figure 57:
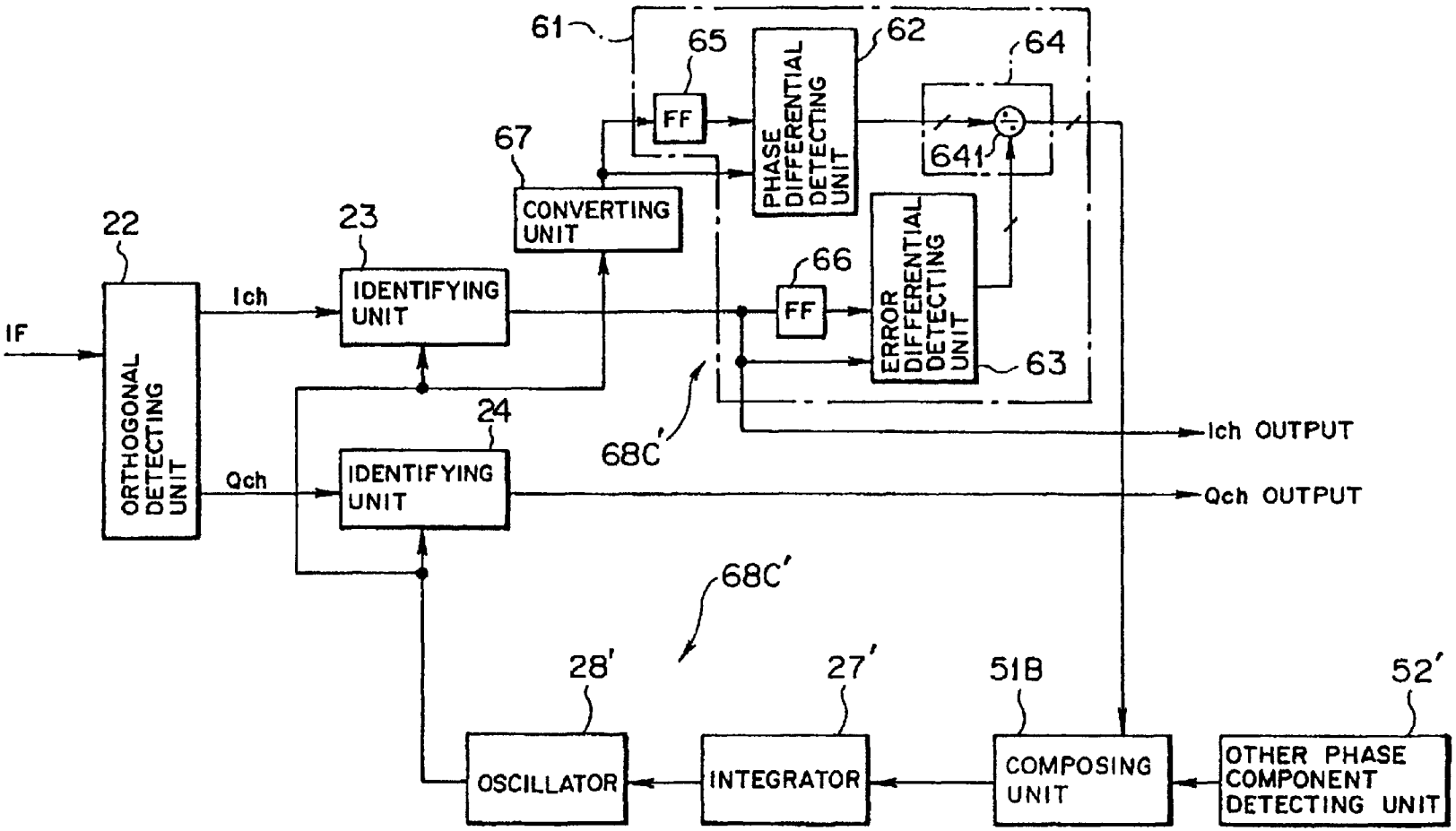
FIG. 57 is a block diagram showing another configuration of a clock regenerating circuit according to the fourth embodiment.

FIG. 57 is a block diagram illustrating another configuration of the clock regenerating circuit 68' shown in FIGS. 51 to 54. The clock regenerating circuit 68C' shown in FIG. 57 additionally includes another phase component detecting unit 52'. The integrator (loop filter unit) 27' and the oscillating unit (oscillating unit) 28', similar to those shown in FIGS. 51 to 54, are used in common to the identifying units 23 and 24. A composing unit 51B is arranged in the clock regenerating circuit 68° C.

Another phase component detecting unit (second clock phase detecting unit) 52' is identical to another phase component detecting unit 52 shown in FIGS. 37 and 38 in the second embodiment. In this embodiment, information regarding the phase shift of a signal identification clock can be detected in a method different from that by the phase component detecting unit 61. The composing unit 51B composes the output of another phase component detecting unit 52' with the output of the phase component detecting unit 52.

In such a manner, in the clock regenerating circuit 68C', another phase component detecting unit 52 detects information regarding the phase shift of a signal information clock to the identifying units 23 and 24 in a method different from the phase component detecting unit 61. Then the multiplier 511 in the composing unit 51B multiplies (composes) the information regarding the signal identification clock by the information regarding the phase shift of a signal identification clock, based on the phase difference information and the signal error differential information detected by the phase component detecting unit 26 described in the third embodiment, and then supply the result to the integrator 27'.

The information regarding the phase shift of an A/D conversion clock (phase component information) can be output with higher accuracy to the oscillating unit 28' which supplies signal identification clocks to the identifying units 23 and 24 via the integrator 27'. Hence the phase shift of a signal identification clock sent to the identifying units 23 and 24 can be adjusted automatically and with high accuracy so that the identifying units 23 and 24 can greatly improve the accuracy in the signal identifying (A/D conversion) process.

Figure 58:
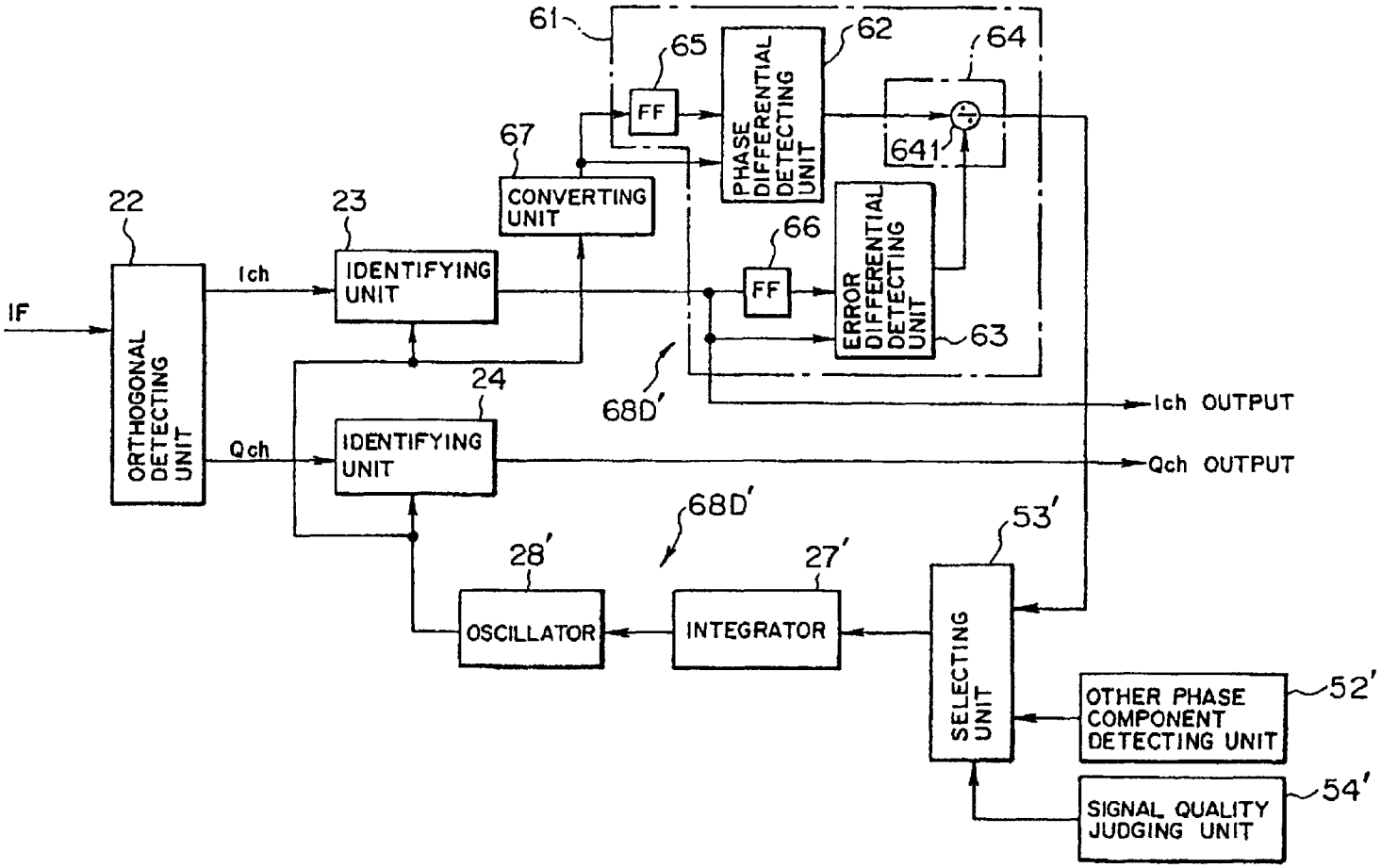
FIG. 58 is a block diagram showing another configuration of a clock regenerating circuit according to the fourth embodiment.

FIG. 58 is a block diagram illustrating another configuration of the clock regenerating circuit 68' described with FIGS. 51 to 54. The clock regenerating circuit 68D' shown in FIG. 58 includes another phase component detecting unit (second clock phase detecting unit) 52' described with FIG. 57. The integrator (loop filter unit) 27' and the oscillating unit (oscillating unit) 28' similar to those shown in FIGS. 51 to 54 are used in common to the identifying units 23 and 24. The clock regenerating circuit 68D' also includes a selecting unit 53'. The signal quality judging unit 54' supplies a control signal to select the output from the selecting unit 53'. In concrete, the signal quality judging unit 54' is formed as a frame synchronizing circuit that judges the signal quality through an error correction process as described with FIG. 40 and then outputs the frame synchronization signal as a control signal.

The selecting unit 53' selectively outputs the output of the phase component detecting unit 61 and the output of another phase component detecting unit 52' to the integrator 27' according to the control signal (e.g. a frame synchronization signal) from the signal quality judging unit 54'.

In the clock regenerating circuit 68D' with the above-mentioned configuration, another phase component detecting unit 52' detects the phase shift of an A/D conversion clock to the A/D converters 23 and 24 in a method different from that of the phase component detecting unit 61. The selecting unit 53' selectively inputs the information regarding the phase shift of an A/D conversion clock detected by another phase component detecting unit 52' and the information regarding the phase shift of an A/D conversion clock detected by the phase component detecting unit 61 described in the first embodiment to the integrator 27' according to the control signal from the signal quality judging unit 54'.

In this case, the information regarding the phase shift of an A/D conversion clock (phase component information) can be supplied with higher accuracy to the oscillating unit 28' which supplies signal identification clocks to the identifying units 23 and 24 via the integrator 27', the accuracy of the signal identification process in the identifying units 23 and 24 can be greatly improved by adjusting automatically and accurately the phase shift of a signal identification clock.

Figure 59:
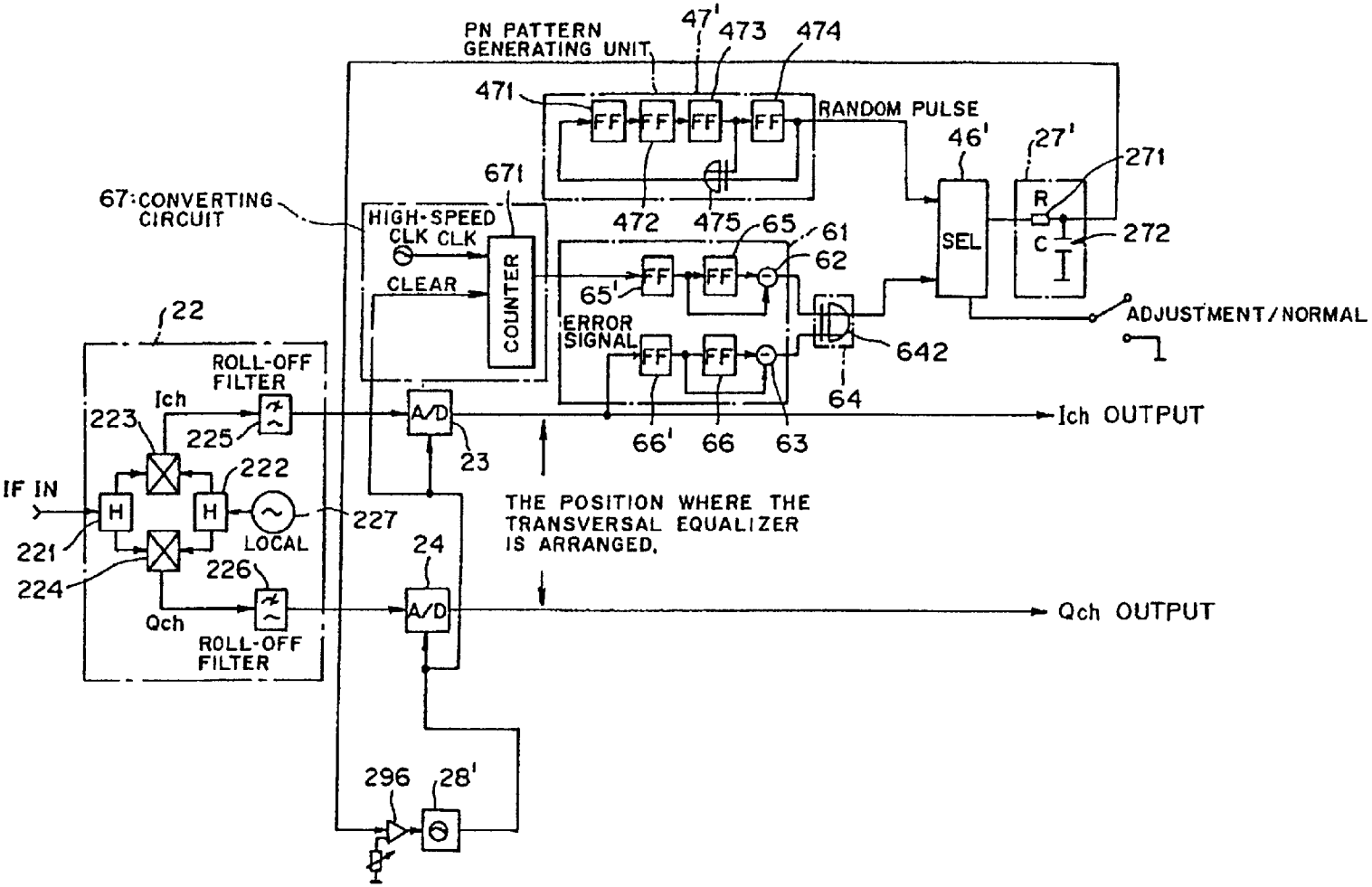
FIG. 59 is a block diagram showing the detail configuration of each of a clock regenerating circuit and the peripheral circuits according to the fourth embodiment.
Figure 60:
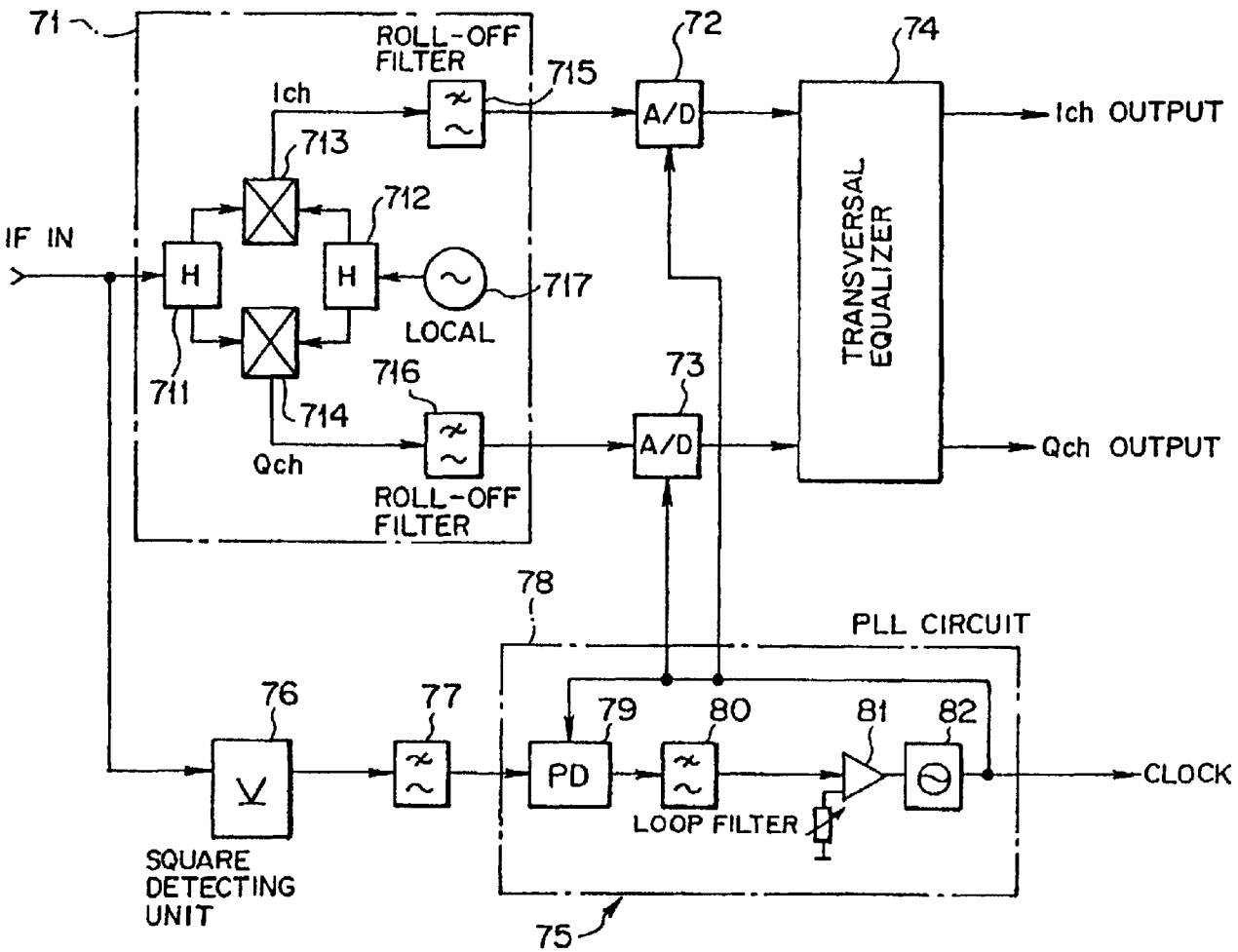
FIG. 60 PRIOR ART
FIG. 60 is a block diagram showing the configuration of a clock regenerating circuit arranged in the receiving unit of general multiplex radio equipment.
Figure 61:
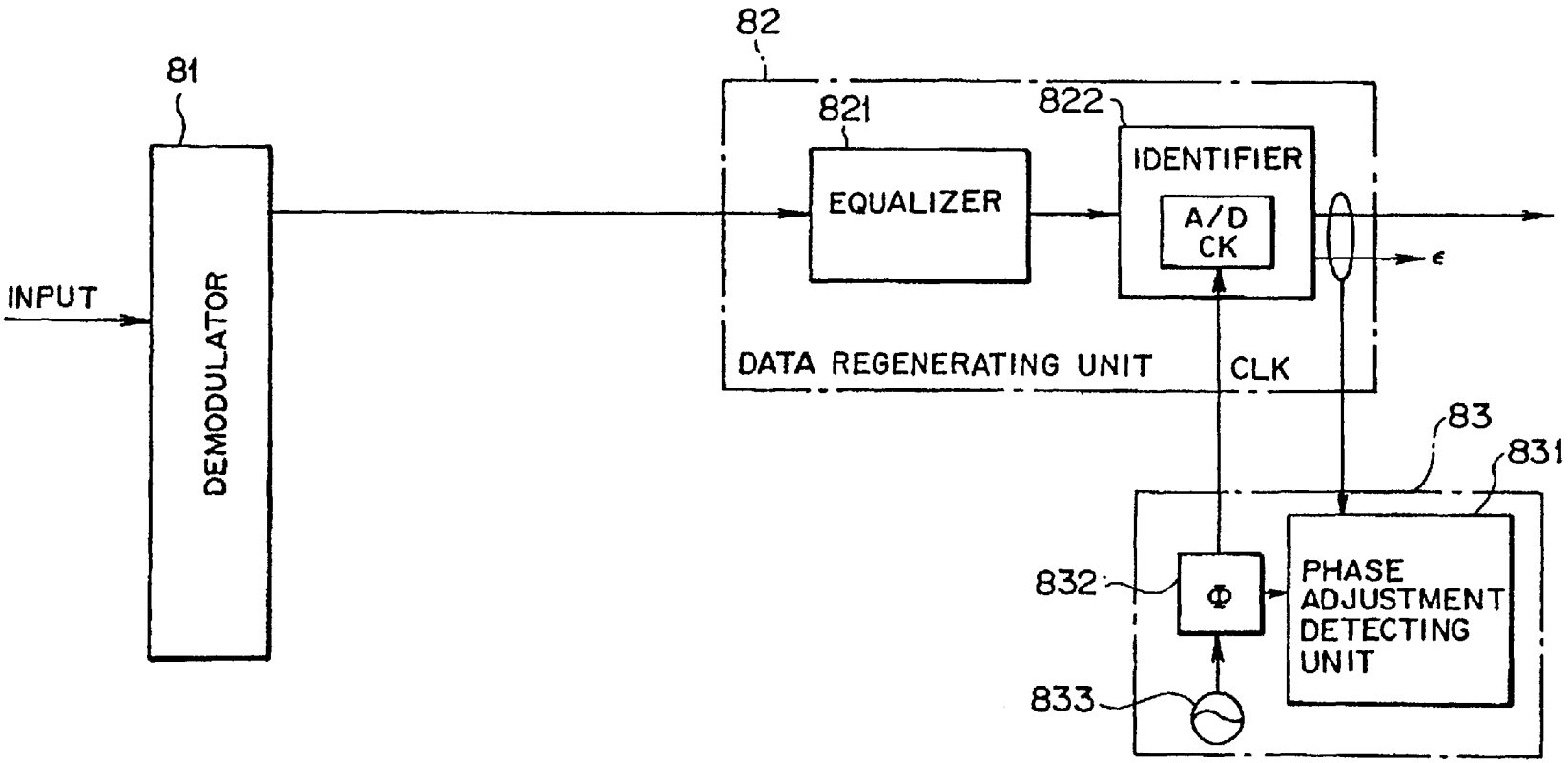
FIG. 61 PRIOR ART
FIG. 61 is a block diagram showing the configuration of a clock regenerating circuit arranged in the receiving unit of general multiplex radio equipment.

FIG. 59 is a block diagram illustrating another configuration of the clock regenerating circuit 68' shown in FIGS. 51 to 54. The clock regenerating circuit 68E' shown in FIG. 59 includes the selector (SEL: selecting unit) 46' and the PN pattern generating circuit 47', in addition to the phase component detecting unit 61, the oscillating unit 28', the amplifier 296, and the integrator 27' similar to those shown in FIG. 53. The selector 46' corresponds to the selector (SEL) 46 shown in FIG. 49 in the third embodiment and the PN pattern generating circuit 47' corresponds to the PN pattern generating circuit 47 shown in FIG. 49 in the third embodiment.

In brief, the clock regenerating circuit 68E' is obtained by converting the clock regenerating circuit 68 in an analog circuit form described with FIG. 53 into a digital circuit form. In FIG. 59, the numerals as those shown in FIG. 50 represent like elements.

Thus the clock regenerating circuit 68E' supplies selectively the test signal from the PN pattern generating circuit 47' and the output from the phase component detecting unit 61 to the integrator (loop filter unit) 27', according to a test (adjustment) / normal switching signal.

Therefore, the phase shift of an A/D conversion clock (signal identification clock) to the A/D converters (identifying units) 23 and 24 can be tested and adjusted very easily.

What is claimed is:

[1. A clock phase detecting circuit arranged in a receiving unit of multiplex radio equipment, comprising:

an identifying circuit for identifying a signal at a predetermined identification level, said signal being obtained by demodulating a multilevel orthogonal modulated signal;

a clock regenerating circuit for regenerating a signal identification clock for said identifying circuit to supply said clock to said identifying circuit;

an equalizing circuit for subjecting said signal obtained by demodulating the multilevel orthogonal modulated signal to an equalizing process; and a clock phase detecting unit for detecting a phase component of said signal identification clock based on errors between input and output signals of said equalizing circuit and then for supplying said phase component to said clock regenerating circuit;

wherein said clock phase detecting unit includes:

an error detecting unit for detecting a signal error between said input and output signals of said equalizing circuit: and a clock phase calculating unit for detecting the phase component of said signal identification clock by calculating the detection outputs from said error detecting unit.]

2. [A clock phase detecting circuit arranged in a receiving] *A receiver circuit arranged in a receiving* unit of multiplex radio equipment, comprising:

an identifying circuit for identifying a *demodulated* signal at a predetermined identification level, said *demodulated* signal being obtained by demodulating a multilevel orthogonal modulated signal;

a clock regenerating circuit for regenerating a signal identification clock for said identifying circuit to supply said *signal identification* clock to said identifying circuit;

an equalizing circuit for subjecting said *demodulated* signal obtained by demodulating the multilevel orthogonal modulated signal to an equalizing process; and a clock phase detecting unit for detecting a phase component of said signal identification clock based on input and output signals of said equalizing circuit and then for supplying said phase component to said clock regenerating circuit;

wherein said clock phase detecting unit comprising:

an error detecting unit for detecting a signal error between said input and output signals of said [equilizing] *equalizing* circuit;

a signal inclination detecting unit for detecting the inclination of said demodulated signal; and a clock phase calculating unit for operating the phase component of said signal identification clock by calculating based on respective outputs from said error detecting unit and said signal inclination detecting unit.

3. [The clock phase detecting circuit arranged in the receiving] *A receiver circuit arranged in a receiving* unit of multiplex radio equipment, according to claim 2, wherein said signal inclination detecting unit comprising:

a delaying unit for delaying the output from said identifying circuit; and a comparing unit for comparing the output from said identifying circuit with the output from said delaying unit to detect the inclination of said demodulated signal.

4. [The clock phase detecting circuit arranged in the receiving] *A receiver circuit arranged in a receiving* unit of multiplex radio equipment, according to claim 2, wherein said identifying circuit is operated with high speed clocks; and wherein said signal inclination detecting unit comprising:

a delaying unit for delaying the output from said identifying circuit, said delaying unit being operated with said high speed clocks;

a latching unit for holding the output from said identifying circuit and the output from said delaying unit with clocks slower than said high speed clocks; and a comparing unit for comparing the output of said identifying circuit held in said latching unit with the output from said delaying unit to detect the inclination of said demodulated signal.

5. [The clock phase detecting circuit arranged in the receiving] *A receiver circuit arranged in a receiving* unit of multiplex radio equipment, according to claim 2, wherein said identifying circuit comprises plural identifying units corresponding to the number of plural demodulated signals obtained by demodulating said multilevel orthogonal modulated signal; and wherein said signal inclination detecting unit includes a comparing unit that compares outputs of said plural identifying units with each other to detect the inclination of the demodulated signal when clocks with different predetermined phase shift between said *plural* identifying units are supplied to said plural identifying units.

6. [The clock phase detecting circuit arranged in the receiving] *A receiver circuit arranged in a receiving* unit of multiplex radio equipment, according to claim 2, wherein said clock phase calculating unit is formed as a multiplying unit that subjects the output of said error detecting unit and the output of said signal inclination detecting unit to a multiplying calculating process.

7. [The clock phase detecting circuit arranged in the receiving] *A receiver circuit arranged in a receiving* unit of multiplex radio equipment, according to claim 2, wherein said clock phase calculating unit is formed as an exclusive OR calculating unit that subjects the output of said error detecting unit and the output of said signal inclination detecting unit to an exclusive OR calculation process.

8. [A clock phase detecting circuit arranged in a receiving] *A receiver circuit arranged in a receiving* unit of multiplex radio equipment, comprising:

an identifying circuit for identifying a *demodulated* signal at a predetermined identification level, said *demodulated* signal being obtained by demodulating a multilevel orthogonal modulated signal;

a clock regenerating circuit for regenerating a signal identification clock for said identifying circuit to supply said *signal identification* clock to said identifying circuit;

an equalizing circuit for subjecting said *demodulated* signal obtained by demodulating the multilevel orthogonal modulated signal to an equalizing process; and a clock phase detecting unit for detecting a phase component of said signal identification clock based on input and output signals of said equalizing circuit and then for supplying said phase component to said clock regenerating circuit;

wherein said clock phase detecting unit comprises:

an error detecting unit for detecting [an] *the* input [signal to output signal error] *and output signals* of said [equilizing] *equalizing* circuit;

a signal inclination detecting unit for detecting the inclination of said demodulated signal;

a clock phase calculating unit for detecting the phase component of said signal identification clock by calculating based on the respective outputs from said error detecting unit and said signal inclination detecting unit;

a specific signal judging unit for judging whether a specific signal exists; and a gating unit for [producting] *producing* the phase component of said signal identification clock obtained by said clock phase calculating unit when said specific signal judging unit judges that said specific signal exists.

9. [The clock phase detecting circuit arranged in the receiving] *A receiver circuit arranged in a receiving* unit of multiplex radio equipment, according to claim 8, wherein said signal inclination detecting unit comprising:

a delaying unit for delaying the output from said identifying circuit; and a comparing unit for comparing the output from said identifying circuit with the output from said delaying unit to detect the inclination of said demodulated signal.

10. [The clock phase detecting circuit arranged in the receiving] *A receiver circuit arranged in a receiving* unit of multiplex radio equipment, according to claim 8, wherein said identifying circuit is operated with high speed clocks; and wherein said signal inclination detecting unit comprising:

a delaying unit for delaying the output from said identifying circuit, said delaying unit being operated with said high speed clocks;

a latching unit for holding the output from said identifying circuit and the output from said delaying unit with clocks slower than said high speed clocks; and a comparing unit for comparing the output of said identifying circuit held in said latching unit with the output from said delaying unit to detect the inclination of said demodulated signal.

11. [The clock phase detecting circuit arranged in the receiving] *A receiver circuit arranged in a receiving* unit of multiplex radio equipment, according to claim 8, wherein said identifying circuit comprises plural identifying units corresponding to the number of plural demodulated signals obtained by demodulating said multilevel orthogonal modulation signal; and wherein said signal inclination detecting unit includes a comparing unit that compares outputs of said plural identifying units with each other to detect the inclination of the demodulated signal when clocks with different predetermined phase amount between said *plural* identifying units are supplied to said plural identifying units.

12. [The clock phase detecting circuit arranged in the receiving] *A receiver circuit arranged in a receiving* unit of multiplex radio equipment, according to claim 8, wherein said clock phase calculating unit is formed as a multiplying unit that subjects the output of said error detecting unit and the output of said signal inclination detecting unit to a multiplying calculating process.

13. [The clock phase detecting circuit arranged in the receiving] *A receiver circuit arranged in a receiving* unit of multiplex radio equipment, according to claim 8, wherein said clock phase calculating unit is formed as an exclusive OR calculating unit that subjects the output of said error detecting unit and the output of said signal inclination detecting unit to an exclusive OR calculation process.

14. [The clock phase detecting circuit arranged in the receiving] *A receiver circuit arranged in a receiving* unit of multiplex radio equipment, according to claim 8, wherein said specific signal judging unit includes plural signal judging units that judge plural kinds of specific signals, and further comprising a selecting unit arranged between said [specific signal judging unit] *plural signal judging units* and said [gate] *gating* unit, for selecting decision results from said plural signal judging units.

* * * * *